United States Patent [19]
Kondo et al.

[11] Patent Number: 5,618,243
[45] Date of Patent: Apr. 8, 1997

[54] SPEED CHANGE CONTROL METHOD FOR AN AUTOMOTIVE AUTOMATIC TRANSMISSION

[75] Inventors: Kaoru Kondo, Kyoto; Kenjiro Fujita, Kusatsu; Shinji Watanabe, Himeji, all of Japan

[73] Assignees: Mitsubisi Jidosha Kogyo Kabushiki Kaisha; Mitsubishi Denki Kabushiki Kaisha, Tokyo, Japan

[21] Appl. No.: 277,029

[22] Filed: Jul. 19, 1994

[30] Foreign Application Priority Data

| Jul. 20, 1993 | [JP] | Japan | 5-179026 |
| Sep. 9, 1993 | [JP] | Japan | 5-224695 |
| Dec. 16, 1993 | [JP] | Japan | 5-316613 |
| Apr. 5, 1994 | [JP] | Japan | 6-067361 |

[51] Int. Cl.$^6$ ............................. F16H 61/02
[52] U.S. Cl. ................ 477/118; 477/94; 477/144; 477/901
[58] Field of Search ..................... 477/118, 901, 477/94, 144

[56] References Cited

U.S. PATENT DOCUMENTS

| 3,776,048 | 12/1973 | Enomoto et al. | |
| 4,561,327 | 12/1985 | Niwa et al. | 477/118 |
| 5,054,336 | 10/1991 | Takizawa | 477/118 |
| 5,231,897 | 8/1993 | Morita | |
| 5,289,740 | 3/1994 | Milunas et al. | 477/901 |
| 5,389,050 | 2/1995 | Sakai et al. | 477/901 |
| 5,410,477 | 5/1995 | Ishii et al. | |
| 5,428,531 | 6/1995 | Hayafune | 477/901 |

FOREIGN PATENT DOCUMENTS

| 03948A2 | 3/1992 | European Pat. Off. |
| 4112577A1 | 10/1991 | Germany |
| 4209150A1 | 9/1992 | Germany |
| 5220630 | 6/1977 | Japan |
| 2275174 | 11/1990 | Japan |

Primary Examiner—Charles A. Marmor
Assistant Examiner—Sherry Lynn Estremsky

[57] ABSTRACT

A control section for controlling a gearshift position changeover mechanism of an automatic transmission includes a downshift determination section for determining whether or not a downshift on descending roads is required, and a downshift command section for outputting a downshift command signal when it is determined that downshift is necessary. The downshift determination section is provided with a learning correction section for effecting a learning correction of a determination reference based on a manipulation characteristic of a driver immediately after completion of downshift each time a downshift takes place.

19 Claims, 37 Drawing Sheets

F I G. 32
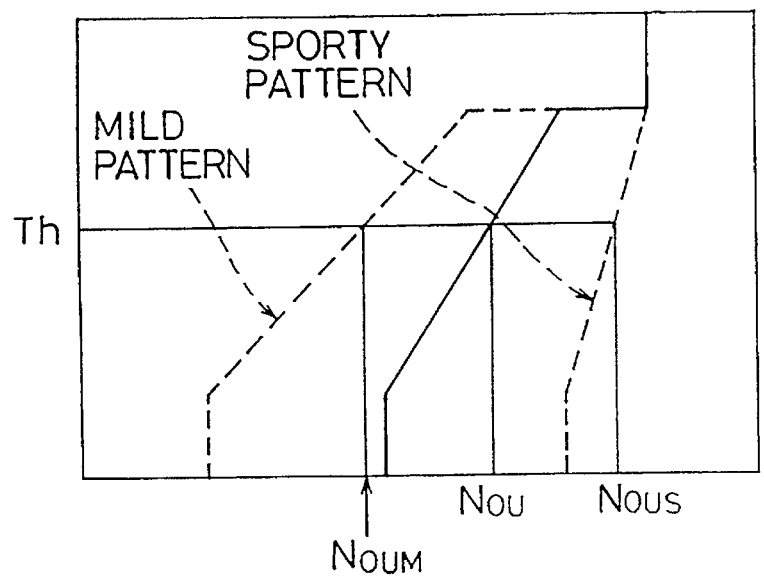
F I G. 33
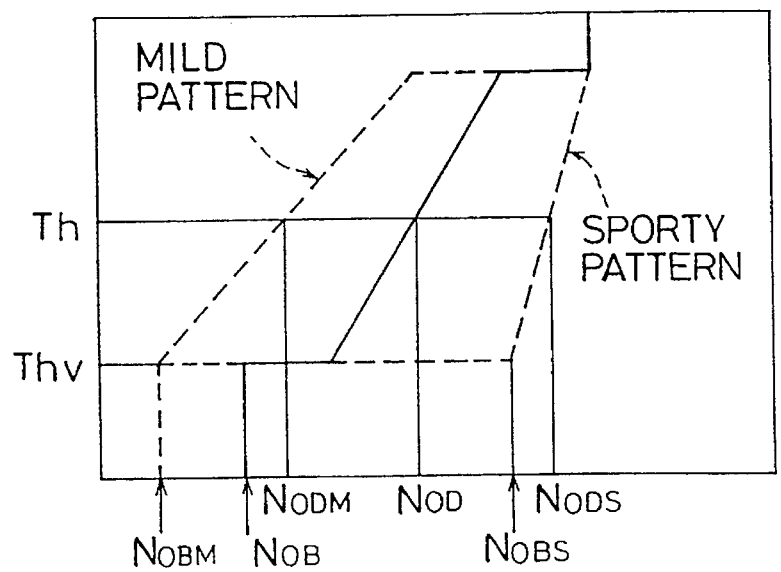

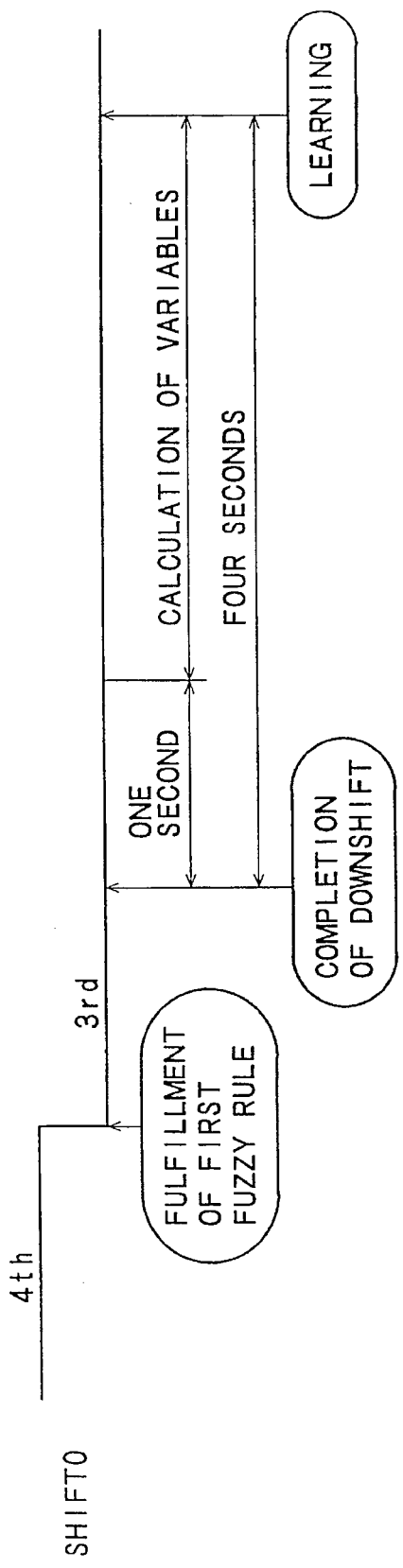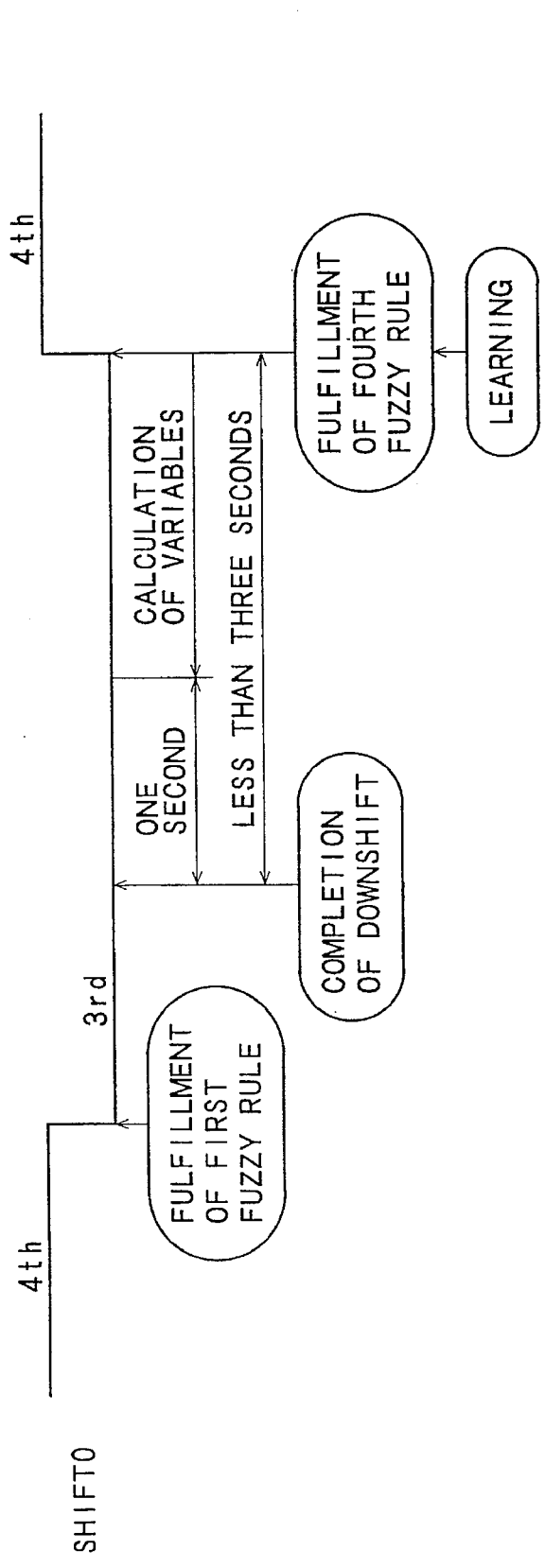
FIG. 41
FIG. 42

F I G. 45A 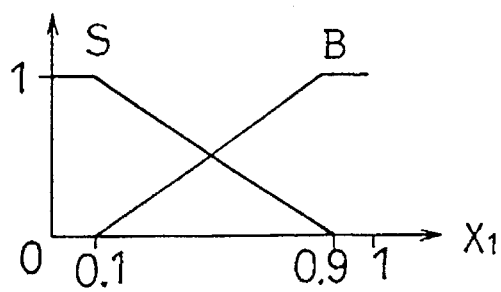
F I G. 45B 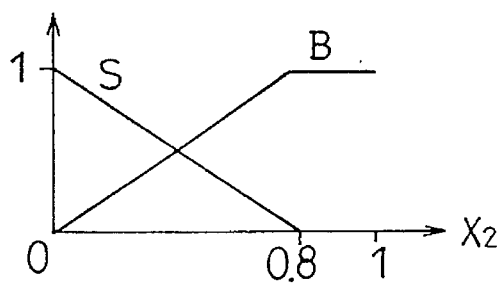
F I G. 45C 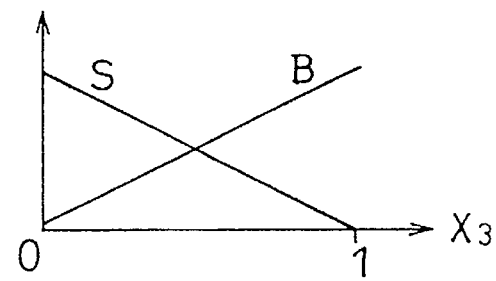
F I G. 45D 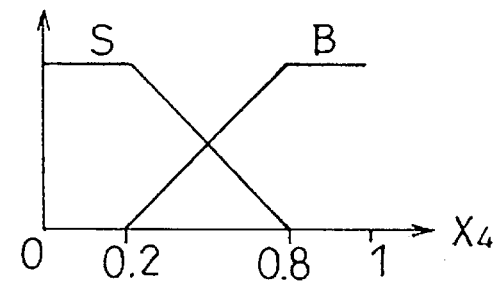
F I G. 45E 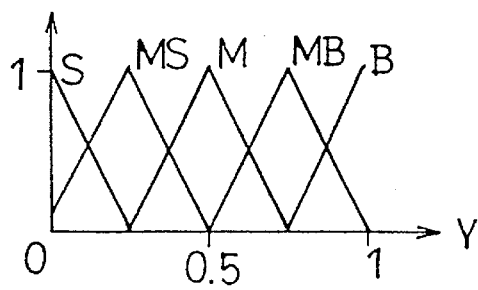

SPEED CHANGE CONTROL METHOD FOR AN AUTOMOTIVE AUTOMATIC TRANSMISSION

BACKGROUND OF THE INVENTION

1. Field of the Invention

The present invention relates to a speed change control method for an automotive automatic transmission.

2. Description of the Prior Art

An automotive automatic transmission is generally provided with a controller for determining, in accordance with a shift pattern set beforehand, a gearshift position suitable to a running condition of a vehicle, based on detected pieces of information such as throttle opening, vehicle speed, and a gearshift position currently established. The transmission is operable to automatically establish an optimum gearshift position under the control of the controller. In a typical shift pattern, a group of upshift lines for upshift operations from lower gearshift positions to higher gearshift positions, and a group of downshift lines for downshift operations from higher gearshift positions to lower gearshift positions, are set as a function of throttle opening and vehicle speed, as exemplary shown in FIGS. 1 and 2. When the vehicle running condition changes from a region indicated by numeral "1" in FIG. 1 to a region indicated by numeral "2," for instance, an upshift operation from the first speed to the second speed takes place. Also, a downshift operation from the fifth speed to the fourth speed takes place when the vehicle running condition changes from a region indicated by numeral "5" to a region indicated by numeral "4," for instance. Likewise, an upshift or downshift operation between other regions also takes place.

In this manner, the shift pattern is set such that a gearshift position for higher speed is selected at a lower vehicle speed region if the throttle opening is small, whereas a gearshift position for lower speed is selected in a higher vehicle speed region if the throttle opening is large. Thus, even if a vehicle runs on a descending road, a gearshift position for higher speed by comparison with vehicle speed is selected when the throttle opening is made small, so as to operate an engine in a lower rotational speed region. That is, an upshift can take place when the throttle is restored during the vehicle running on a descending road. Thus, engine braking is sometimes does not work effectively when the vehicle runs on a descending road. In this case, the vehicle speed increases, and hence a braking force is needed, so that a driver is required to operate a foot brake, or operate a select lever for switching drive ranges so as to cause engine braking to exercised.

To obviate such a drawback, an automatic transmission has been proposed, in which a downshift takes place when it is determined that a vehicle runs on a descending road. Such a determination is made by comparing gradient resistance to the vehicle derived from detected information with a determination reference value.

According to the proposed automatic transmission, however, since the determination reference value for the determination of vehicle running on a descending road is fixed, a downshift takes place uniformly when such a descending running determination condition is satisfied. Thus, application of engine braking is always initiated upon fulfillment of the determination condition. On the other hand, a vehicle running condition in which engine braking for vehicle travel on a descending road should be exercised varies depending on drivers. Thus, it is difficult to satisfy a preference of an individual driver by means of such a uniform downshift control.

As another countermeasure for eliminating the need of a foot brake operation or a select lever operation during the vehicle travel on descending roads, a fuzzy speed change control based on vehicle speed, road gradient, etc., indicative of a vehicle travel condition, has been proposed. The fuzzy speed change control makes it possible to automatically effect a downshift so as to exercise engine braking when a vehicle runs on descending roads.

However, according to a conventional fuzzy speed change control designed to conduct fuzzy inference for shift pattern selection directly from variables indicative of a vehicle running condition, such as gradient and vehicle speed, fuzzy rules must be set for all the combinations of the vehicle running condition variables, to make it possible to select an optimum shift pattern even if a vehicle runs in any condition. In addition, optimally setting a large number of fuzzy rules is very difficult. On the other hand, if fuzzy rules solely for typical running conditions are set, a shift pattern selection can be made inappropriately depending on the vehicle running condition.

As mentioned above, a shift pattern includes an upshift line group and a downshift line group which are set as a function of throttle opening and vehicle speed. In this respect, if a speed change control is conducted in accordance with a single shift pattern, then an upshift or a downshift takes place uniformly each time an operating point represented by throttle opening and vehicle speed crosses an upshift line or a downshift line. This sometimes makes it difficult to perform a speed change operation suitable to vehicle driving on ascending roads or a speed change control demanded by a driver.

In order to achieve a speed change control suitable to vehicle driving on ascending roads, a speed change control apparatus has been proposed in which a shift pattern for flat roads and a shift pattern for ascending roads which makes an upshift difficult to take place, are set beforehand. Further, a vehicle running on an ascending road is determined to select the shift pattern for ascending roads, if several variables, such as vehicle speed and gradient, indicative of the vehicle running condition satisfy a particular condition. This thereby effects a speed change operation suitable to the vehicle running on ascending roads, while preventing an unnecessary upshift.

However, in the proposed speed change control apparatus, the same shift pattern for ascending roads is used for both of a steep ascending road and a gentle ascending road. Depending on the gradient or the vehicle speed, this can prevent an upshift even if a driving force is sufficient, and can permit an upshift even if a driving force is deficient, resulting in shift hunting.

Further, to achieve a speed change operation demanded by a driver, a speed change control apparatus has been proposed in Japanese Provisional Patent Publication No. 2-275174, in which an ordinary shift pattern (normal pattern or economy pattern), and a sporty pattern (power pattern) where shift lines are provided on the higher speed side than those of the normal pattern are set beforehand, and in which an arbitrary one of these patterns is selectable manually or automatically. According to a speed change control apparatus of this kind, changeover from the normal pattern to the sporty pattern automatically takes place when an accelerator depression speed exceeds a threshold value, which varies dependent upon the vehicle speed and the throttle opening, under a condition where predetermined requirements such that a select lever is in a D-range are fulfilled.

The threshold value of the accelerator depression speed is set, as exemplary shown in FIG. 3. In the case of this setting example, the entire vehicle running area is divided into sixteen regions by use of throttle opening and vehicle speed as parameters, and threshold values T11 through T44 for the respective regions are set. The threshold values T11 through T44 are set such that one for a higher vehicle speed region has a larger value than one for a lower vehicle speed region (T11<T12<T13<T14, for instance), so that the switching to the sporty pattern is likely to take place at a lower vehicle speed. Further, the threshold values T11 through T44 are set such that one for a larger throttle opening region has a smaller value than one for a smaller throttle opening region (T11>T21>T31>T41, for instance), so that the switching to the sporty pattern is likely to take place at a larger throttle opening. As a consequence, a shift from the normal pattern shown by solid lines in FIGS. 1 and 2 to the sporty pattern shown by doted lines takes place when the accelerator pedal is depressed at a speed higher than an associated threshold value (T11, - - -, or T44).

However, the proposed apparatus, which only permits selection of either one of the two shift patterns, cannot achieve an elaborated speed change operation which fully meets a vehicle running condition or a driver's demand.

As another prior art for shift pattern change, it has been also known to set a plurality of, e.g., five upshift characteristic lines SC1 through SC5 in connection with an upshift from the third speed to the fourth speed, for instance, as exemplary shown in FIG. 4, and select one of these shift characteristics in accordance with a vehicle running condition represented by throttle opening, engine rotational speed, vehicle speed, lateral acceleration, and longitudinal acceleration, for instance.

However, using a large number of shift patterns in this manner requires a lot of labor in setting the shift patterns, and takes a lot of time for determination processing to select an optimum pattern from the shift patterns which is large in number, causing a delay in shift control to a change in the vehicle running condition.

Further, to eliminate drawbacks produced when a speed change control is effected with use of a conventional shift schedule which requires manual speed change from the D-range to the 2nd-range or a brake pedal depressing operation to compensate a deficiency in engine braking performance which occurs when a vehicle runs on descending roads, it has been proposed in Japanese Patent Publication No. 52-20630 to use a particular shift schedule including a specific speed region, corresponding to a nearly fully closed throttle opening, for automatic speed change, the specific speed region being expanded toward a predetermined vehicle speed which is usually included in an adjacent speed region for which a gearshift position which is one level higher than that for the specific speed region is established (see, FIG. 47).

However, In case that a downshift line for a small throttle opening region is set on the higher speed side, as in this proposal, even if a driver wishes to make a coasting vehicle running, a downshift takes place contrary to the driver's intention, to cause engine braking to be exercised. This causes the driver to have a feeling of dissatisfaction or incompatibility.

On the other hand, in case that a downshift line for a small throttle opening region is set on the lower speed side, as distinct from the aforementioned proposed shift schedule, a downshift does not take place as long as the accelerator pedal is not depressed by the driver. Thus, a delay can be caused in downshift, e.g., when the vehicle passes a sharp corner in sporty driving during which the driver makes braking at a location short of the corner and then depresses the accelerator pedal for re-acceleration. That is, the downshift does not take place at the location short of the corner, but takes place when the vehicle reaches the exit of the corner. In this case, acceleration at the exit of the corner is prevented by the downshift effected at the corner exit.

As explained in the above, it is difficult heretofore to achieve an elaborated speed change control with the use of a relatively simplified control system.

SUMMARY OF THE INVENTION

An object of the present invention is to provide a speed change control method for an automatic transmission, which is capable of achieving an elaborated speed change operation which meets vehicle running conditions, or driving characteristics of drivers, or road gradients.

Another object of the present invention is to provide a speed change control method for an automatic transmission, which is capable of rapidly and accurately establishing an optimum gearshift position in various conditions even with use of a relatively simplified control system.

According to a first aspect of the present invention, a speed change control method for controlling changeover between gearshift positions of an automotive automatic transmission is provided. The speed change method comprises the steps of: (a) detecting a value of at least one parameter indicative of a running condition of a vehicle; (b) comparing the thus detected parameter value with a predetermined determination reference value, to thereby determine an excess and deficiency in engine braking; and (c) effecting a learning correction of the predetermined determination reference value based on the detected parameter value.

Preferably, the speed change control method further includes the step (d) of outputting a speed change command based on the vehicle running condition, or the step (e) of determining necessity and unnecessariness of the learning correction of the predetermined determination reference value.

Preferably, the step (a) includes detecting a state of a road on which the vehicle runs, or includes detecting a braking manipulation state or an engine load after completion of a downshift conducted in the automatic transmission in response to the speed change command, or includes detecting deceleration of the vehicle or a frequency of braking manipulation after completion of a downshift.

Preferably, the step (b) includes using predetermined determination reference values which are set so as to respectively correspond to kinds of downshift conducted in the automatic transmission. Alternatively, the step (b) includes the sub-steps of: (b1) setting membership functions beforehand so as to respectively correspond to parameters indicative of the vehicle running condition; (b2) setting a predetermined control rule beforehand; and (b3) performing, in accordance with the predetermined control rule, fuzzy inference based on the parameter values detected in the step (a) and the membership functions, to thereby determine the excess and deficiency in engine braking.

Preferably, the step (c) includes effecting the learning correction of the predetermined determination reference value based on at least one of the detected braking manipulation state and the detected engine load. More preferably, the learning correction of the predetermined determination reference value is effected such that, when it is determined based on at least one of the braking manipulation state and the engine load that further deceleration or acceleration is demanded by a driver after completion of a downshift, a subsequent downshift is promoted or suppressed. Alternatively, the step (c) includes using, in the learning correction of the predetermined determination reference value, a correction amount for which a predetermined limit is set. Preferably, the step (c) is carried out after an upshift or a downshift effected in response to the speed change command is completed, or each time a predetermined time period elapses without the speed change command being output.

Preferably, the step (e) includes the sub-steps of: (e1) setting membership functions beforehand so as to respectively correspond to parameters indicative of the vehicle running condition; (e2) setting a predetermined control rule beforehand; and (e3) effecting, in accordance with the predetermined control rule, fuzzy inference based on the parameter values detected in the step (a) and the membership functions, to thereby determine necessity and unnecessariness of the learning correction.

The speed change control method according to the first aspect of the present invention is advantageous in that a preference of an individual driver can be appropriately reflected on a downshift control especially at the time of vehicle running on descending roads. Thus, the downshift control for the vehicle running on descending roads can be conducted with a control characteristic which meets the preference of the driver. This makes it possible to exercise engine braking when the vehicle runs on a descending road, without giving the driver a feeling of dissatisfaction, whereby a driving operation can be conducted more easily with a better feeling.

According to a preferred embodiment in which the learning correction is made in accordance with the driver's deceleration or acceleration demand, a deficiency or excess in engine braking which the driver feels during the vehicle running on descending roads can be determined appropriately, making it possible to change a downshift control characteristic properly. Further, according to a preferred embodiment effecting the learning correction with use of a limited correction amount, the reference for downshift determination never changes abruptly. Thus, the control characteristic can be changed without causing a feeling of incompatibility. Moreover, according to a preferred embodiment which carries out the learning correction at predetermined timing, e.g., at timing at which an upshift is completed, the learning correction can made more frequently to thereby cause the learning correction to be converged earlier. This makes it possible to rapidly achieve a downshift control which meets a desire of an individual driver.

According to a second aspect of the present invention, a speed change control method comprises the steps of: (a) setting a shift pattern beforehand in accordance with vehicle speed and engine load; (b) detecting a vehicle speed; (c) detecting an engine load; (d) detecting a driving characteristic of a driver; and (e) continuously changing the shift pattern in accordance with the driving characteristic detected in the step (d).

Preferably, the speed change control method further includes the step (f) of detecting a gradient or the step (g) of detecting deceleration of a vehicle. More preferably, the step (g) includes detecting at least one of braking manipulation and longitudinal acceleration of the vehicle.

Preferably, the step (a) includes setting beforehand a first shift pattern attaching importance to vehicle drivability and a second shift pattern attaching importance to economical vehicle running ability.

Preferably, the step (d) includes the sub-steps of: (d1) detecting a usage degree of engine performance; (d2) detecting a usage degree of tire performance; and (d3) detecting a degree of sporty driving made by a driver, based on the detected usage degree of engine performance and the detected usage degree of tire performance.

Preferably, the step (e) includes the sub-step (e1) of setting a third shift pattern between the first and second shift patterns in accordance with the vehicle speed, the engine load, and the driving characteristic detected in the steps (b), (c) and (d), respectively. The sub-step (e1) includes performing interpolation of vehicle speed values on the first and second shift patterns, to thereby set the third shift pattern.

More preferably, the step (e) includes the sub-step (e2) of adjusting a speed of the shift pattern change in accordance with the engine load detected in the step (c). The sub-step (e2) includes adjusting the speed of the shift pattern change when an abrupt increase or a gentle decrease in the engine load is detected. Preferably, an amount of adjustment of the shift pattern change speed at the time of detecting the abrupt increase in the engine load is greater than that at the time of detecting the gentle decrease thereof.

The step (e) includes continuously modifying an upshift line of the shift pattern in accordance with the gradient detected in the step (f), or continuously modifying a downshift line of the shift pattern in a low engine load region in accordance with the driving characteristic detected in the step (d) and the deceleration detected in the step (g), or continuously modifying a downshift line of the shift pattern toward a higher speed side of the shift pattern.

The speed change control method according to the second aspect of the present invention is advantageous in that an optimum shift pattern corresponding to the driving characteristic of a driver can be set automatically, whereby a vehicle driving feeling can be improved to a great extent. In addition, the shift pattern thus set can be also adjusted continuously, so as to finely. Correspond to individuality. Further, shift patterns to be set beforehand and factors to be set and confirmed through the medium of experiments, etc. can be reduced in number, making it possible to easily construct the system at low costs.

According to a preferred embodiment setting the first and second shift patterns beforehand, a shift line is modified such that a sporty- or mild-oriented speed change control is automatically performed when sporty or mild driving is conducted. According to a preferred embodiment setting the third shift pattern by interpolation, the setting of the third shift pattern can be made with ease. Moreover, according to a preferred embodiment where the sporty degree is detected, the shift pattern which meets the driving characteristic of a driver can be set appropriately.

According to a preferred embodiment where an upshift line of the shift pattern is continuously modified in accordance with a gradient, the upshift line of the shift pattern can be changed in a stepless fashion in accordance with the gradient and from the viewpoint of ensuring a driving force. Thus, an upshift in a condition the driving force is deficient, which results in shift hunting, and an upshift delay in a condition the driving force is sufficient can be prevented. This makes it possible to establish a gearshift position suitable to the gradient of a road on which the vehicle runs.

Furthermore, according to a preferred embodiment where a shift pattern modification speed is adjusted, a shift pattern, suited to a way of driving by a driver and a resultant vehicle running condition, can be set immediately when a vehicle is driven in a manner causing an abrupt change in the engine load, without causing a response delay in shift pattern movement to a change in the driving state, and without causing shift hunting attributable to the response delay, while preventing unnecessary shift pattern movement as long as the vehicle is driven in a manner accompanied with an ordinary change in the engine load. This makes it possible to rapidly achieve an elaborated speed change control which meets the vehicle running condition.

Moreover, according to a preferred embodiment where a downshift line is modified in accordance with deceleration of the vehicle, an elaborated speed change control suited to the vehicle driving condition and the driving characteristic of a driver can be made immediately. In another preferred embodiment, a sporty degree is detected in accordance with usage degrees of engine performance and tire performance. This makes it possible to properly detect the driving characteristic of the driver, especially, the degree of sporty driving, whereby a speed change operation suited to the driving characteristic can be achieved. Further, according to a preferred embodiment where deceleration is detected based on braking manipulation or longitudinal acceleration, the deceleration of the vehicle can be detected properly, resulting in a proper speed change operation. According to a preferred embodiment where a downshift line is modified to a higher speed side of the shift pattern, moreover, a downshift contrary to the driver's intention, especially, in coasting vehicle running can be prevented. Also, a downshift can be conducted immediately at the time when braking is made at a location short of a corner during sporty driving, making it possible to improve re-acceleration performance at the exit of the corner.

A speed change control method according to a third aspect of the present invention comprises the steps of: (a) detecting a value of at least one parameter indicative of a running condition of a vehicle; (b) detecting a degree of necessity of engine braking; and (c) selecting a predetermined shift pattern by fuzzy inference based on the detected parameter value and the detected necessity degree of engine braking.

Preferably, the speed change control method further includes the steps of: (d) setting beforehand a standard shift pattern based on vehicle speed and engine load; and (e) providing a gearshift position fixing pattern by which fixing to a predetermined gearshift position is effected. More preferably, the speed change control method further includes the step (f) of determining a failure of detecting means used for the detection of the parameter value in the step (a). Alternatively, the speed change control method further includes the steps of: (g) detecting a driving characteristic of a driver; and (h) continuously changing the standard shift pattern in accordance with the thus detected operation characteristic.

Preferably, the step (a) includes detecting a vehicle speed and an engine load.

Preferably, the step (b) includes inputting the parameter value detected by the step (a) to a neural network.

Preferably, the step (c) includes selecting the standard pattern or the gearshift position fixing pattern by fuzzy inference. Alternatively, the step (c) includes selecting the standard shift pattern or a second shift pattern when a failure of the detecting means is determined.

Preferably, the step (d) includes setting beforehand a first shift pattern having a speed change characteristic attaching importance to vehicle drivability performance and a second shift pattern having a speed change characteristic attaching importance to economical vehicle running ability.

The speed change control method according to the third aspect of the present invention is advantageous in that an optimum gearshift position for various vehicle running conditions can be set with use of a relatively reduced number of fuzzy rules. This makes it possible to exercise optimum engine braking in various vehicle running conditions. Further, a speed change control apparatus can be relatively simplified. For instance, required performance of a computer, forming the speed change control apparatus, can be moderated.

A speed change control method according to a fourth aspect of the present invention comprises the steps of: (a) setting beforehand a standard shift pattern based on vehicle speed and engine load; (b) providing a gearshift position fixing pattern by which fixing to a predetermined gearshift position is effected; (c) detecting a value of at least one parameter indicative of a vehicle running condition; (d) detecting a driving characteristic of a driver; (e) detecting a degree of necessity of engine braking; (f) selecting either the standard shift patter or the gearshift position fixing pattern by fuzzy inference based on the parameter value detected by the step (c) and the engine braking necessity degree detected by the step (e); and (g) continuously changing the standard shift pattern in accordance with the detected driving characteristic. The step (e) includes the sub-steps of: (e1) comparing the detected driving characteristic with a predetermined determination reference value, to thereby determine an excess and deficiency in the engine braking; and (e2) effecting learning correction of the predetermined determination reference value in accordance with the parameter value detected by the step (c).

The speed change control method according to the fourth aspect of the present invention is advantageous in that corresponding ones of the aforementioned various advantages can be attained. For instance, an elaborated speed change control which makes it possible to exercise optimum engine braking in various vehicle running conditions can be achieved even with use of a relatively simplified control system.

These and other objects and advantages will become more readily apparent from an understanding of the preferred embodiments described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which:

FIG. 32 is a graph for explaining determination of an upshift line based on a mild pattern and a sporty pattern;

FIG. 33 is a graph for explaining determination of a downshift line based on a mild pattern and a sporty pattern;

FIG. 41 is a view showing a learning correction timing determination procedure at the time of a downshift from the fourth speed to the third speed along time axis;

FIG. 42 is a view showing another learning correction timing determination procedure at the time of a downshift from the fourth speed to the third speed;

FIG. 45A is a graph showing a membership function associated with an input X1 and used in a modification of the present invention;

FIG. 45B is a graph showing a membership function associated with an input X2;

FIG. 45C is a graph showing a membership function associated with an input X3;

FIG. 45D is a graph showing a membership function associated with an input X4;

FIG. 45E is a graph showing membership function associated with an output Y;

DETAILED DESCRIPTION

Figure 1:
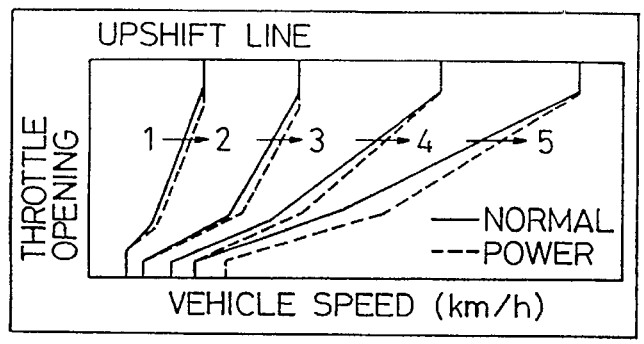
FIG. 1 is a graph exemplarily showing a setting manner of a group of upshift lines in a typical shift pattern.
Figure 2:
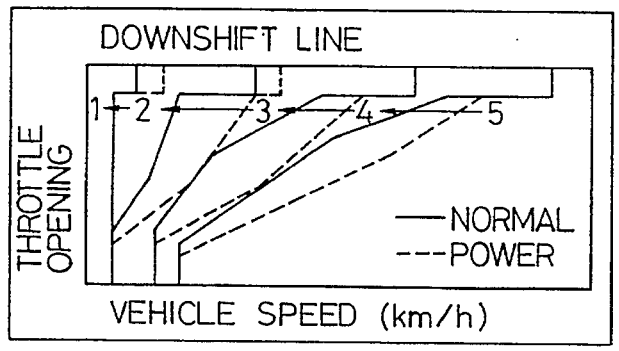
FIG. 2 is a graph exemplarily showing a setting manner of a group of downshift lines in a typical shift pattern.
Figure 3:
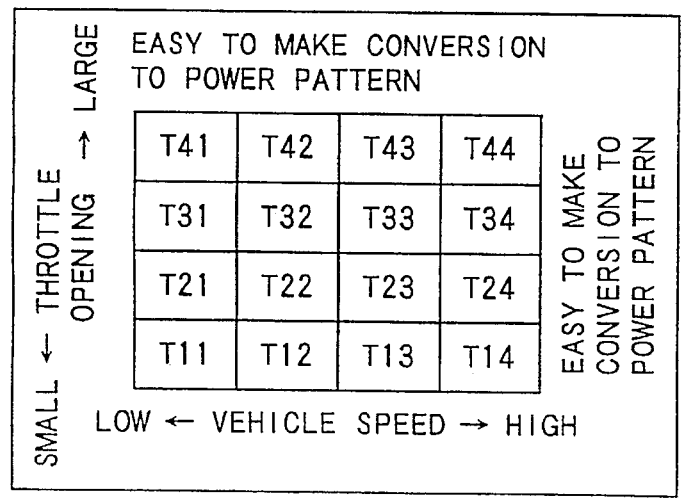
FIG. 3 is a view exemplarily showing a setting manner of threshold values of accelerator depression speed for respective throttle opening and vehicle speed regions used for a conventional control of automatically switching from a normal pattern to a sporty pattern.
Figure 4:
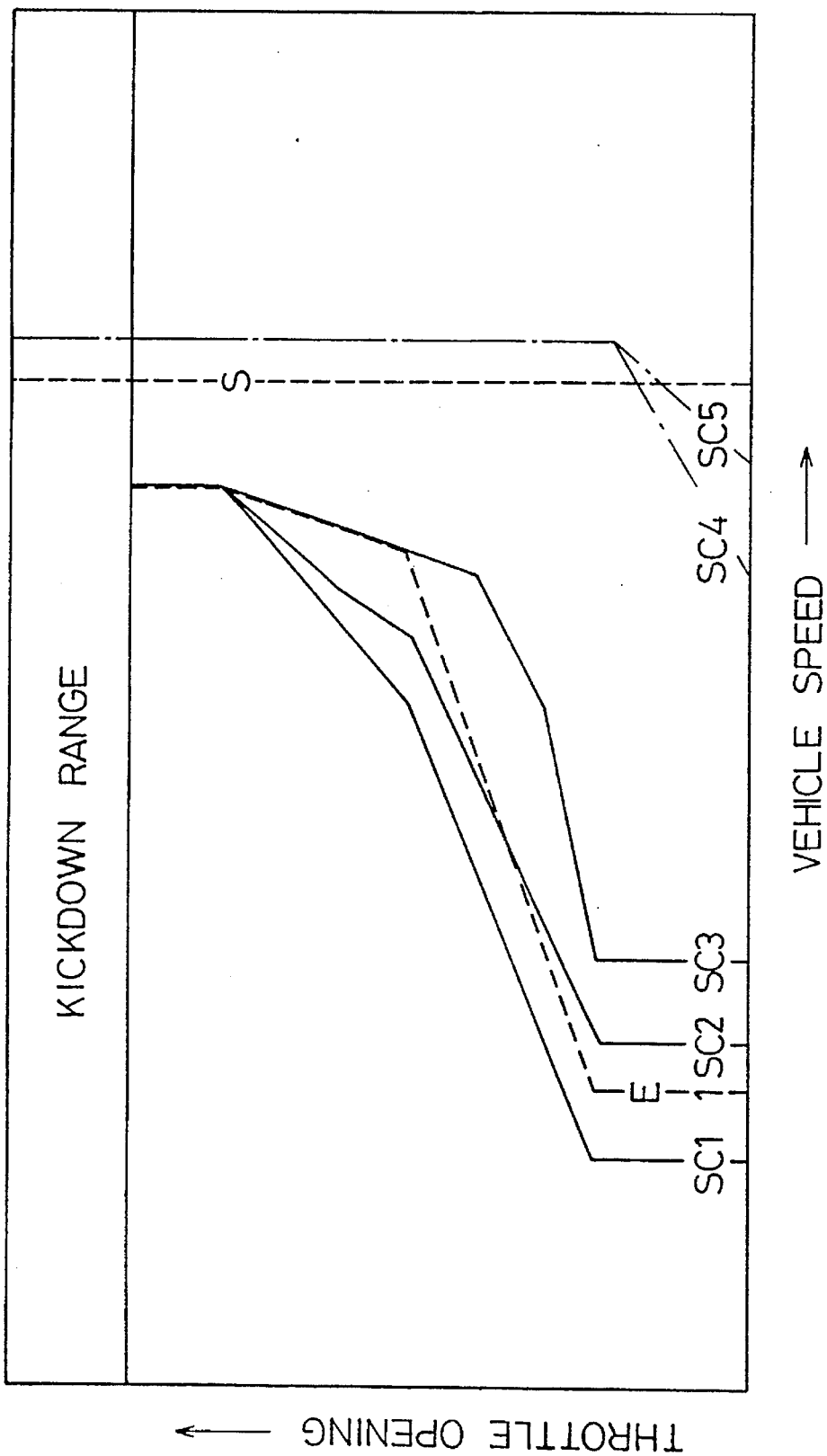
FIG. 4 is a graph exemplarily showing a setting manner of upshift characteristic lines used for a conventional shift pattern changing control in connection with an upshift from the third speed to the fourth speed.
Figure 5:
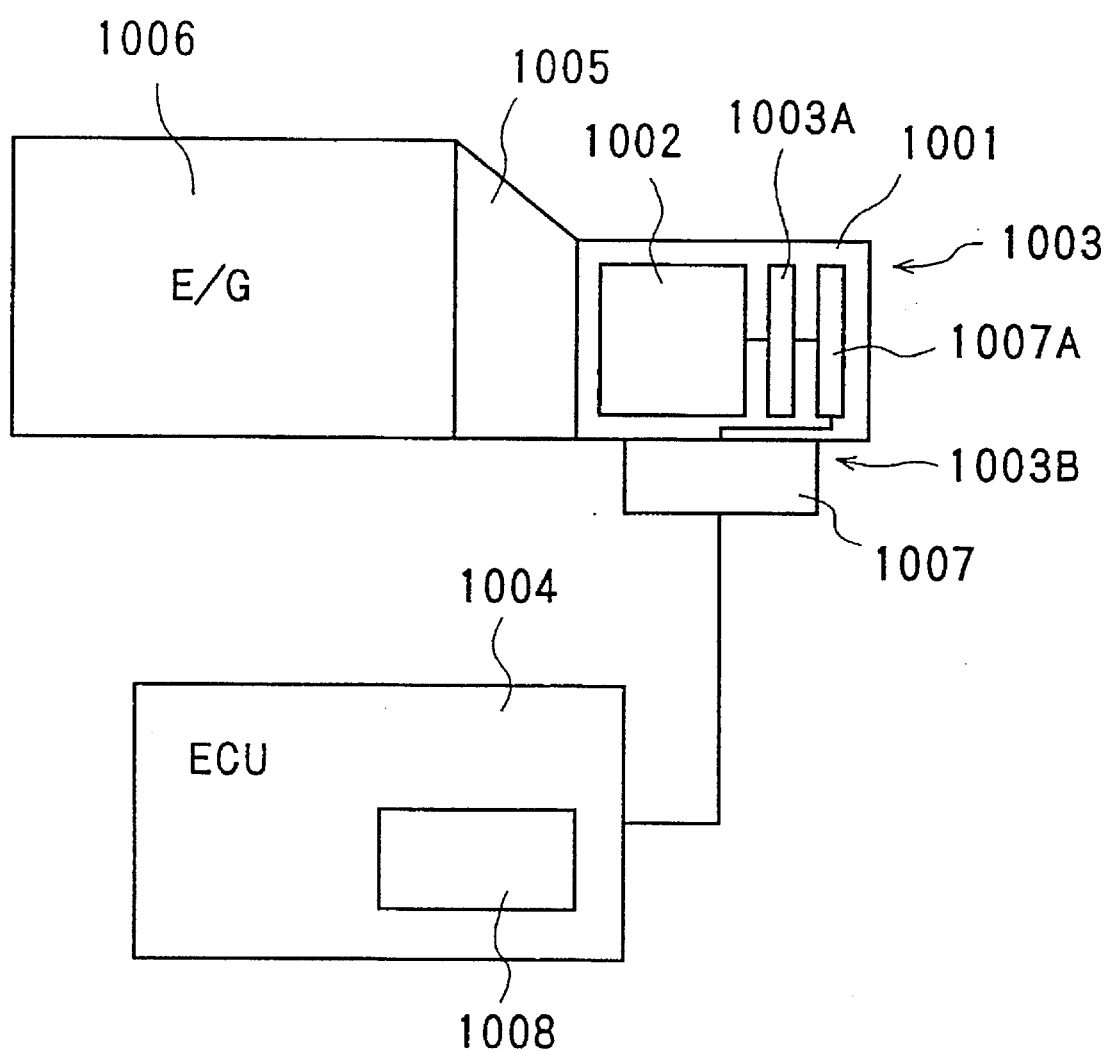
FIG. 5 is a schematic block diagram showing essential part of an automatic transmission with downshift control for descending roads for embodying a speed change control method according to a first embodiment of the present invention.

Referring to FIG. 5, an automatic transmission 1001, to which a speed change control method according to a first embodiment of the present invention is applied, involves gear mechanisms 1002 including a plurality of sets of speed change gears for establishing a plurality of gearshift positions, a gearshift position changeover mechanism 1003 for changing a combination of speed change gears in the gear mechanisms 1002 to thereby switch gearshift positions, and an electronic control unit (ECU) 1004 serving as control means for controlling the gearshift position changeover mechanism 1003.

The gear mechanisms 1002 receive an output from an engine 1006 through a torque converter 1005, etc., and output the engine output to a power transmission system such as a differential (an illustration thereof omitted) coupled to driving wheels, while effecting speed change with a speed change ratio attained by the speed change gears which presently contribute to power transmission.

The gearshift position changeover mechanism 1003, which operates to change the speed change gears which contribute to power transmission in the gear mechanisms 1002, is comprised of, for instance, a plurality of engagement elements 1003A such as clutches, and drive mechanisms 1003B for changing engagement states of the engagement elements 1003A.

The drive mechanisms 1003B, which can be of hydraulic type, are each comprised of a return spring which urges a corresponding one of the engagement elements 1003A in a releasing direction, an oil pressure piston (not shown) for urging the engagement element 1003A against the return spring, an oil pressure chamber 1007A for driving the oil pressure piston. The drive mechanisms 1003B also includes an operating oil pressure control device 1007 for controlling the operating oil pressure in the pressure chamber. The operating oil pressure control device 1007 is provided with electromagnetic switching valves for switching engagement states of the gear mechanisms 1002.

The ECU 1004 is operable to control the operating oil pressure control devices 1007 to thereby conduct an upshift and a downshift. To this end, the ECU ordinarily receives throttle opening information, vehicle speed information, and current gearshift position information. Based on these pieces of information, an upshift or downshift is conducted in accordance with a predetermined shift pattern.

The automatic transmission of the present embodiment includes a descending road downshift control section 1008, attached to the ECU 1004, for effecting a downshift in preference to ordinary shift control when the vehicle runs on a descending road. The descending road downshift control section 1008 is provided with a downshift determination section 1009 and downshift command section 1010, as shown in FIG. 6.

The downshift determination section 1009 operates to determine whether or not a downshift for descending road is required on the basis of a predetermined criterion. The downshift command section 1010 operates to output a downshift command signal when it is determined by the downshift determination section 1009 that a downshift is required.

The downshift determination section 1009 is so constructed as to receive pieces of detection information from gradient detection section 1011 for detecting the gradient of a road on which the vehicle runs, gearshift position detection device (gearshift position sensor) 1012 for detecting a current gearshift position of the automatic transmission 1001, a vehicle speed sensor 1013 for detecting the vehicle speed, and a throttle opening sensor (throttle position sensor) 1014 for detecting the throttle opening TPS of the engine 1006.

Figure 6:
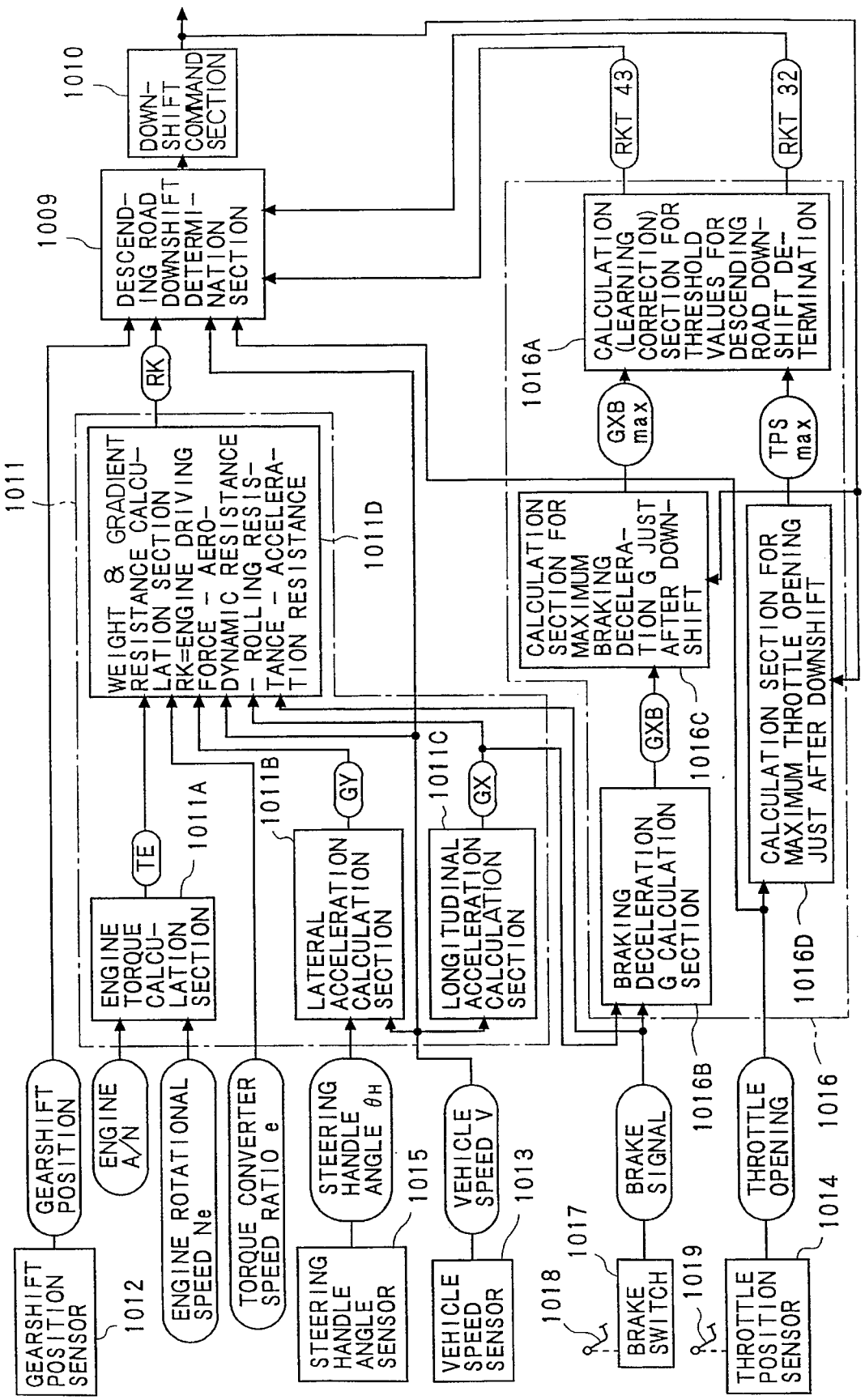
FIG. 6 is a block diagram showing in detail a descending road downshift control section of the automatic transmission shown in FIG. 5.

In the present embodiment, the gradient detection section 1011 is operable to calculate weight and gradient resistance RK by using the various sensor outputs, and to output the value RK as the gradient information, as shown in FIG. 6. The weight and gradient resistance RK is obtained by subtracting aerodynamic resistance, rolling resistance, and acceleration resistance from an engine driving force, as shown in the following formula (1).

$$RK = \text{(Engine driving force)} - \text{(Aerodynamic resistance)} - \text{(Rolling resistance)} - \text{(Acceleration resistance)} \quad (1)$$

The engine driving force (hereinafter referred to as TE) in the formula (1) is calculated in an engine torque calculation section 1011A in accordance with the following formula (2).

$$TE = TE(\eta E) \cdot t(e) \cdot \eta \cdot iT \cdot iF / r \quad (2)$$

where $TE(\eta E)$ is engine torque (kg·m) obtained by subtracting an exhaust loss, $t(e)$ is a torque ratio of the torque converter 1005, $\eta$ is a transmission efficiency of the automatic transmission 1001, iT is a present speed change ratio, iF is a gear ratio of the differential, and r is a dynamic radius of a tire. The engine torque $TE(\eta E)$ is calculated from a charging efficiency "A/N" of the engine 1006 and an engine rotational speed "Ne," and $t(e)$ is read out from a torque ratio table in which the torque ratio is stored beforehand as a function of torque converter speed ratio "e." As $\eta$, iT, iF, and r, predetermined values given as constants are employed.

The aerodynamic resistance in the formula (1) is calculated in accordance with the following formula (3).

$$\begin{aligned}\text{Aerodynamic resistance} &= \rho a \cdot S \cdot Cd \cdot V2/2 \\ &= C2 \cdot V2 \end{aligned} \quad (3)$$

where $\rho a$ is an air density which is given as a constant which is determined by an atmospheric temperature. Symbol S is a projection area of the front of the vehicle, and Cd is a drag coefficient given as a constant. Symbol C2 is a constant which is obtained by calculation based on these constants. The aerodynamic resistance is calculated as a function of vehicle speed "V," as indicated in formula (3).

Further, the rolling resistance in the formula (1) is calculated in accordance with the following formula (4).

$$\text{Rolling resistance} = R0 + (CF2/CP) \quad (4)$$

where R0 is the rolling resistance at the time of free rolling, CF is a cornering force, and CP is cornering power.

The rolling resistance R0 at free rolling is calculated in accordance with the following formula (5).

$$R0 = \mu r \cdot W \quad (5)$$

where $\mu r$ is rolling resistance, and W is weight of the vehicle.

The second term of the right side of the formula (4) is a contribution term of cornering resistance when a lateral slide angle is small. By using a two-wheel model in which a ratio of load distribution on the front wheels to that on the rear wheels is at constant (the front-rear ratio of 0.6:0.4, for instance) and the cornering power at the front and rear wheels are CPf and CPr (constant values), the cornering resistance is calculated in accordance with the following formula (6).

$$\begin{aligned}\text{Cornering Resistance} &= ((0.6W/2) \cdot GY)2 \times 2/CPf + \\ &\quad ((0.6W/2) \cdot GY)2 \times 2/CPr \\ &= C3 \times W2 \times GY2\end{aligned} \quad (6)$$

where C3 is a constant, and GY is lateral acceleration which is calculated in a lateral acceleration calculation section 1011B by using a steering handle angle "θH" detected by the steering handle angle sensor 1015 and a vehicle speed "V" detected by the vehicle speed sensor.

By causing the cornering resistance to be involved in the calculation of rolling resistance, the weight and gradient resistance at the time when the steering handle is turned greatly can be calculated with accuracy. That is, in the case of involving no cornering resistance, the calculated gradient at the time of cornering on descending curved roads becomes smaller than an actual gradient, so that it is sometimes presumed, during turning, that the vehicle runs on an ascending road even when the vehicle runs, in actual, on a flat road. This can be prevented by involving the cornering resistance.

The acceleration resistance in the formula (1) is calculated in accordance with the following formula (7).

$$\text{Acceleration resistance} = (W + \Delta W) \cdot GX \quad (7)$$

where W is the vehicle weight, ΔW is equivalent weight of rotary part, and GX is longitudinal acceleration which is calculated in a longitudinal acceleration calculation section 1011C based on the vehicle speed "V" detected by the vehicle speed sensor. The equivalent weight of the rotary part is calculated in accordance with the following formula (8).

$$\Delta W = W0 + \{Ec + Fc(ir \cdot iF)2\} \quad (8)$$

where W0 is weight of the vehicle which is empty, Ec is an equivalent weight ratio of tire rotary part, and Fc is an equivalent weight ratio of engine rotary part. Symbols ir and iF are the gear ratio of the automatic transmission 1001 and the gear ratio of the differential.

In the gradient detection means 1011, a weight and resistance calculation section 1010D operates to calculates the weight and gradient resistance "RK" in accordance with the formula (1) based on the values respectively calculated in accordance with the formulae (2) through (8).

In the downshift determination section 1009, a comparison is made between the weight and gradient resistance "RK," calculated in the gradient detection section 1011 as mentioned above, and a threshold value RKT. If the calculated value RK is equal to or smaller than the threshold value RKT, it is determined that the vehicle runs, at the present time, on a descending road with a large gradient, and hence a downshift is required so as to exercise engine braking. Whereupon, a downshift command signal is output to the operating oil pressure control device 1007 of the automatic transmission 1001.

However, the threshold value RKT varies depending on gearshift position. The threshold value assumes a smaller value at a higher gearshift position, and assumes a larger value at a lower gearshift position. In this automatic transmission, the threshold value RKT for the downshift from the fourth speed to the third speed is set to RKT43, and that for the downshift from the third speed to the second speed is set to RKT32. These threshold values RKT43 and RKT32 are set to desired values as initial values, and are renewed gradually in term of the below-mentioned learning correction.

A consideration must be made as to whether or not the engine overruns after a downshift. This can be determined based on the vehicle speed. Moreover, even when the vehicle runs on a descending road with a large gradient, the downshift must be prohibited, if acceleration is demanded by the driver. This driver's intention is reflected on the throttle opening TPS. From the above viewpoint, upon downshift determination effected in the downshift determination section 1009, gearshift position information, vehicle speed information, and throttle opening information are involved.

The downshift determination section 1009 of the descending road downshift control section 1008 is additionally provided with a learning correction device 1016 for correcting the downshift determination criterion.

This learning correction device 1016 is operable to detect manipulation characteristics of the driver immediately after a downshift at the time of descending road running is conducted, and to effect learning-correction of values (threshold values) of the downshift determination criterion in a determination criterion value correction section (threshold value correction section) 1016A based on the detected results. The manipulation characteristics of the driver thus detected include a characteristic associated with braking manipulation by the driver and a characteristic associated with accelerator depression by the driver. Based on the detected results, the learning correction device 1016 corrects the determination criterion to the side of promoting downshift or to the side of suppressing downshift depending on whether further deceleration or acceleration is demanded by the driver just after a downshift is conducted.

In this learning correction, if further deceleration is demanded by the driver just after a downshift is made, then it is determined that engine braking is deficient for the driver, and the threshold values are decreasingly corrected to permit the engine braking to exercise immediately so that a subsequent downshift is promoted. On the other hand, if acceleration is demanded by the driver immediately after the execution of a downshift, it is determined that the engine braking is excessive for the driver, and the threshold values are increasingly corrected to make the engine braking to difficult to exercise so that a subsequent downshift is suppressed.

Since the deceleration demand by the driver is reflected on braking manipulation and the acceleration demand by the driver is reflected on accelerator manipulation, the learning correction device 1016 is adapted to receive pieces of information from the brake switch 1017 for detecting a depressed state of the brake pedal 1018 and from the throttle position sensor 1014 for detecting the throttle opening TPS which has an amount corresponding to the depressed state of the accelerator pedal 1019.

The learning correction device 1016 of the present embodiment is adapted to determine whether or not further deceleration is demanded by the driver just after a downshift takes place on the basis of the maximum deceleration "GXBmax" at the time of braking manipulation effected immediately after the downshift (hereinafter referred to as the maximum braking deceleration G). The maximum braking deceleration G "GXBmax" is the maximum value of the deceleration "GXB" of the vehicle at the time of braking manipulation (hereinafter referred to as braking deceleration G).

To this end, the learning correction device 1016 is provided with a braking deceleration G calculation section (section for calculating the deceleration at the time of braking manipulation) 1016B, and a maximum braking deceleration G calculation section (section for calculating the maximum deceleration at the time of braking manipulation) 1016C. The braking deceleration G calculation section 1016B operates to receive information of longitudinal acceleration "GX" calculated by the longitudinal acceleration section 1011C of the gradient detection section 1011, and a brake signal from the brake switch 1017, and is adapted to be triggered by the brake signal, to thereby start the calculation of the braking deceleration G "GXB" which is output to the maximum braking deceleration G calculation section 1016C. The braking deceleration G "GXB," which has a positive sign if it exerts to the direction of deceleration, has an opposite sign from that of the longitudinal acceleration "GX."

The maximum braking deceleration G calculation section 1016D is operable to receive information of braking deceleration G "GXB" from the braking deceleration G calculation section 1016B and downshift command information from the downshift command section 1010, and calculate, based on pieces of information of braking deceleration G "GXB" received during a predetermined time period just after a downshift (for example, one through four seconds from the time when the downshift is completed), the maximum value of the pieces of information, i.e., the maximum braking deceleration G "GXBmax." The maximum braking deceleration G "GXBmax" thus determined is output from the maximum braking deceleration G calculation section 1016c to the determination criterion value correction section 1016A.

The learning correction device 1016 of the present embodiment is operable to determine whether or not acceleration is demanded by the driver just after a downshift is made, on the basis of the maximum throttle opening "TPSmax" at the time just after the downshift is made. To this end, the learning correction device 1016 is provided with a maximum throttle opening calculation section 1016D which receives throttle opening information from the throttle position sensor 1014 and downshift command information from the downshift command section 1010, and which calculates, based on pieces of throttle opening information received during a predetermined time period just after a downshift (for example, one through three seconds just after the downshift is made), the maximum value of the pieces of information, i.e., the maximum throttle opening "TPSmax." The maximum throttle opening "TPSmax" thus determined is output from the maximum throttle opening calculation section 1016D to the determination criterion value correction section 1016A.

The determination criterion value correction section 1016A is operable to receive the maximum braking G "GXBmax" and the maximum throttle opening "TPSmax" and effect learning correction of determination criterion values (threshold values) RKT based thereon. More specifically, the threshold values RKT are corrected with use of learning correction values $-\alpha$ and $-\beta$, if the maximum braking deceleration G "GXBmax" is equal to or larger than a predetermined value and the maximum throttle opening "TPSmax" is smaller than a predetermined value. The threshold values RKT are corrected with use of learning correction values $+\alpha$ and $+\beta$, if the maximum braking deceleration G "GXBmax" is smaller than a predetermined value and the maximum throttle opening "TPSmax" is equal to or larger than a predetermined value. The learning correction values $-\alpha$ and $\alpha$ are associated with a threshold value RKT43 for downshift from the fourth speed to the third speed. The learning correction values $-\beta$ and $\beta$ are associated with a threshold value RKT32 for downshift from the third speed to the second speed. The thus corrected threshold values RKT43 and RKT 32 are represented by the following formulae.

$$RKT43 = RKT43 \pm \alpha$$

$$RKT32 = RKT32 \pm \beta$$

The threshold values RKT43 and RKT32, subjected, if necessary, to the learning correction in the learning correction device 1016 each time a downshift is made are output to the downshift determination means 1009 which determines the necessity of downshift by comparing the weight and gradient resistance RK with the threshold values RKT43 and RKT32 subjected, if necessary, to the learning correction.

Since the automatic transmission with downshift control for descending road of the present embodiment is constructed as mentioned above, the operating oil pressure control device 1007 of the gearshift position changeover mechanism 1003 is controlled by means of the ECU 1004, and a combination of speed change gears in the gear mechanisms 1002 is changed through the medium of the gearshift position changeover mechanism 1003, whereby a shift is made between gearshift positions.

The ECU 1004, which receives the throttle opening information, the vehicle speed information, and the current gearshift position information, normally controls the operating oil pressure control device 1007 in accordance with a predetermined shift pattern, to thereby conduct an upshift or a downshift. When the vehicle runs on a descending road, however, the ECU 1004 conducts downshift control, which is proper to descending roads, in preference to the normal shift control, with use of the descending road downshift control section 1008. Namely, in the descending road downshift control section 1008, the downshift determination section 1009 determines whether or not a downshift is required based on the weight and gradient resistance RK, and, if the necessity of downshift is determined by the downshift determination section 1009, a downshift command signal is output from the downshift command section 1010. The driver's intention is reflected on this downshift determination.

Figure 7:
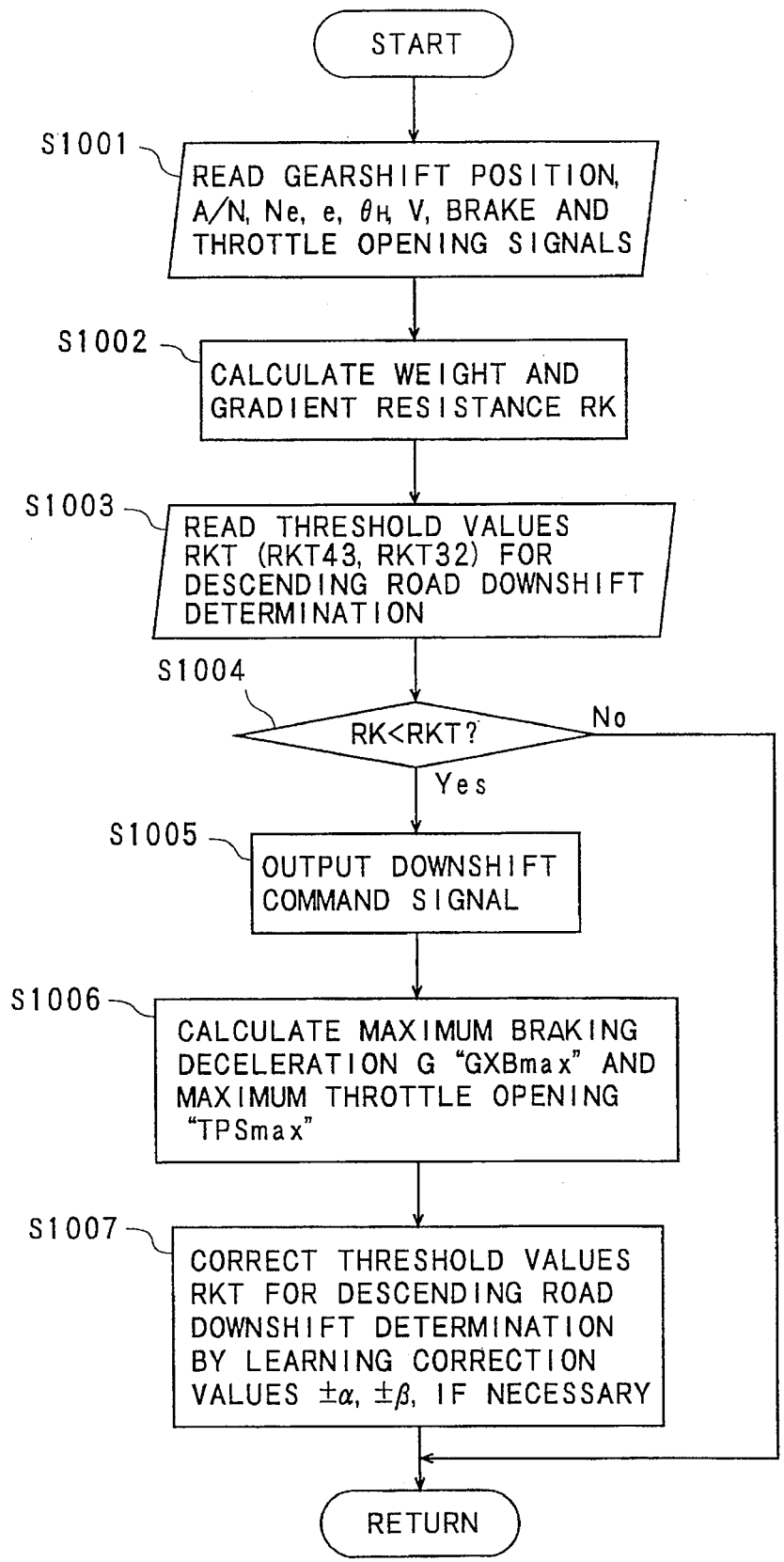
FIG. 7 is a flowchart of a downshift control carried out by means of the descending road downshift control section shown in FIGS. 5 and 6.

With reference to the flowchart of FIG. 7, the descending road downshift control will be explained.

At step S1001, various sensor outputs such as gearshift position, charging efficiency "A/N" of the engine, engine rotational speed "Ne," torque converter speed ratio "e," steering handle angle "θH," vehicle speed "V," brake signal, and opening "TPS" of the throttle valve are read into the descending road downshift control section 1008.

Next, at step S1002, the calculation of the weight and gradient resistance "RK" is carried out by the gradient detection section 1011 in accordance with the formula (1) through (8) given above, and the thus calculated weight and gradient resistance "RK" is periodically output at predetermined timing.

At step S1003, the threshold values RKR43 and RKT32 for the downshift determination in the case of descending road running are read into the downshift determination device 1006. Upon start of the control, values set beforehand (initial values) are read as the threshold values RKR43 and RKT32. If the learning correction is conducted subsequently, the latest ones of values gradually renewed by the learning correction are read.

Next, at step S1004, a determination is made by the downshift determination section 1009 as to whether or not the weight and gradient resistance "RK" exceeds the threshold values RKR43 and RKT32 for the downshift determination.

If the weight and gradient resistance "RK" does not exceed the threshold values RKR43 and RKT 32 for the downshift determination, then the "NO" route stands. The ECU, determining that the vehicle does not run on a gradient road which requires a downshift, enters in a standby state to thereby await start timing of the next processing cycle being reached, while performing no substantial actions. Whereupon, the processing cycle starts repeatedly at predetermined timing. On the other hand, if the weight and gradient resistance "RK" exceeds the threshold values RKR43 and RKT32 for the downshift determination, then the "YES" route stands, and a downshift command signal is output from the command section 1010, at step S1005. As a result, a downshift operation is conducted in the automatic transmission 1001 through the operating oil pressure control device 1007.

At step S1006, the maximum braking deceleration G "GXBmax" immediately after the downshift and the maximum throttle opening "TPSmax" immediately after the downshift are calculated by the learning correction device 1016. More specifically, in the learning correction device 1016, upon receipt of the downshift command signal, the maximum braking deceleration G "GXBmax" is calculated by the maximum braking deceleration G calculation section 1016C on the basis of pieces of information of the braking deceleration G "GXB" received during a predetermined time period just after the downshift (one through four seconds after completion of the downshift, for instance). In the maximum throttle opening calculation section 1016D, the maximum throttle opening "TPSmax" is calculated from pieces of throttle opening information received during a predetermined time period just after the downshift (one through three seconds after completion of the downshift, for instance).

Next, at step S1007, in the determination criterion value correction section 1016A of the learning correction device 1016, the determination criterion values (threshold values) RKT are subject to learning correction based on the maximum braking deceleration G "GXBmax" and the maximum throttle opening "TPSmax." More specifically, if the maximum braking deceleration G "GXBmax" is equal to or larger than a predetermined value and the maximum throttle opening "TPSmax" is smaller than a predetermined value, and hence further deceleration is required by the driver who feels that engine braking is deficient, then the threshold values RTK are decreasingly corrected with use of the learning correction values $-\alpha$, and $-\beta$. That is, the threshold values RKT43 and RKT32 are corrected as shown in the following formulae.

$$RKT43=RKT43-\alpha$$

$$RKT32=RKT32-\beta$$

If the maximum braking deceleration G "GXBmax" is smaller than the predetermined value and the maximum throttle opening "TPSmax" is equal to or larger than the predetermined value, and hence the driver feels that engine braking is excessive, then the threshold values RTK are increasingly corrected with use of the learning correction values $+\alpha$, and $+\beta$. That is, the threshold values RKT43 and RKT32 are corrected as shown in the following formulae.

$$RKT43=RKT43+\alpha$$

$$RKT32=RKT32+\beta$$

The threshold values RKT43 and RKT32, learning-corrected in the learning correction device 1016 each time, if necessary, a downshift operation is carried out, are output to the downshift determination section 1009 in which the thus learning-corrected threshold values are employed for the downshift determination at the next control cycle (see, step S1003). As a result of the learning correction being repeatedly carried out, a downshift suited to the liking of the driver can be achieved.

More specifically, if the driver feels a deficiency in the engine braking upon downshift on a descending road, then the driver depresses the brake pedal 1009 to cause deceleration of the vehicle. In response to this, the threshold values RKT are decreasingly corrected. As a result, the next and subsequent downshift operations in the automatic transmission 1001 become likely to happen. Thus, a downshift operation will take place in such a condition that the driver feels it necessary to exercise engine braking, so that a downshift which meets the preference of the driver will be carried out. If the driver feels excessive engine braking upon downshift on a descending road, then the driver depresses the accelerator pedal 1019 to cause acceleration of the vehicle. In response to this, the threshold values RKT are increasingly corrected. As a result, the next and subsequent downshift operations in the automatic transmission 1001 become less likely to happen. Thus, a downshift operation will not take place until an acceleration state which the driver desires is reached, so that a downshift which meets the preference of the driver will be carried out.

Correction in term of the learning correction is carried out by effecting addition or subtraction of a fixed correction amount of $\pm\alpha$ and $\pm\beta$ per control cycle. Thus, in order to attain a downshift characteristic which meets the driver's preference, the threshold values RKT must be renewed several times by means of the learning correction, depending on magnitudes of the correction amounts $\pm\alpha$ and $\pm\beta$. On the other hand, since the threshold values RKT are gradually corrected in this manner, a sudden change of the determination criterion for downshift can be prevented, whereby the control characteristic can be changed without causing a feeling of dissatisfaction.

The speed change control method of the present embodiment may be modified in various manners.

For instance, by causing the final threshold values RKT obtained by the learning correction to be stored in a memory, downshift control which meets the driver's preference can be immediately achieved upon start of the next vehicle driving, if the vehicle is driven by the same driver. This arrangement may be provided with a reset function of setting the threshold values RKT to their initial values when the vehicle is driven by a different driver. Further, the final threshold values RKT resulting from the learning correction may be written into a memory accommodated in, e.g., a card belonging to the individual driver. This makes it possible to always establish a state which meets the individual driver's preference at the start of vehicle driving. Moreover, a plurality of initial threshold values may be set beforehand, so that the individual driver can select a suitable initial threshold.

In the present embodiment, the learning correction is done based on the maximum braking deceleration "GXBmax" just after a downshift. However, a frequency of manipulation of the brake pedal 1018 may be counted, so as to make the learning correction on the basis of the brake pedal manipulation frequency. In this case, the brake pedal manipulation frequency is detected at step S1006 in FIG. 7 from a number of brake signals input during a predetermined time period which starts upon completion of the downshift. Then, at step S1007, the threshold value RKT is decreasingly corrected if the brake pedal manipulation frequency is equal to or larger than a predetermined value and the maximum throttle opening is smaller than a predetermined value. If the brake pedal manipulation frequency is smaller than the predetermined value and the maximum throttle opening is equal to or larger than the predetermined value, then the threshold value RKT is increasingly corrected.

In the following, a speed change control apparatus for embodying a speed change control method according to a second embodiment of the present invention will be explained.

Whole Arrangement

Figure 8:
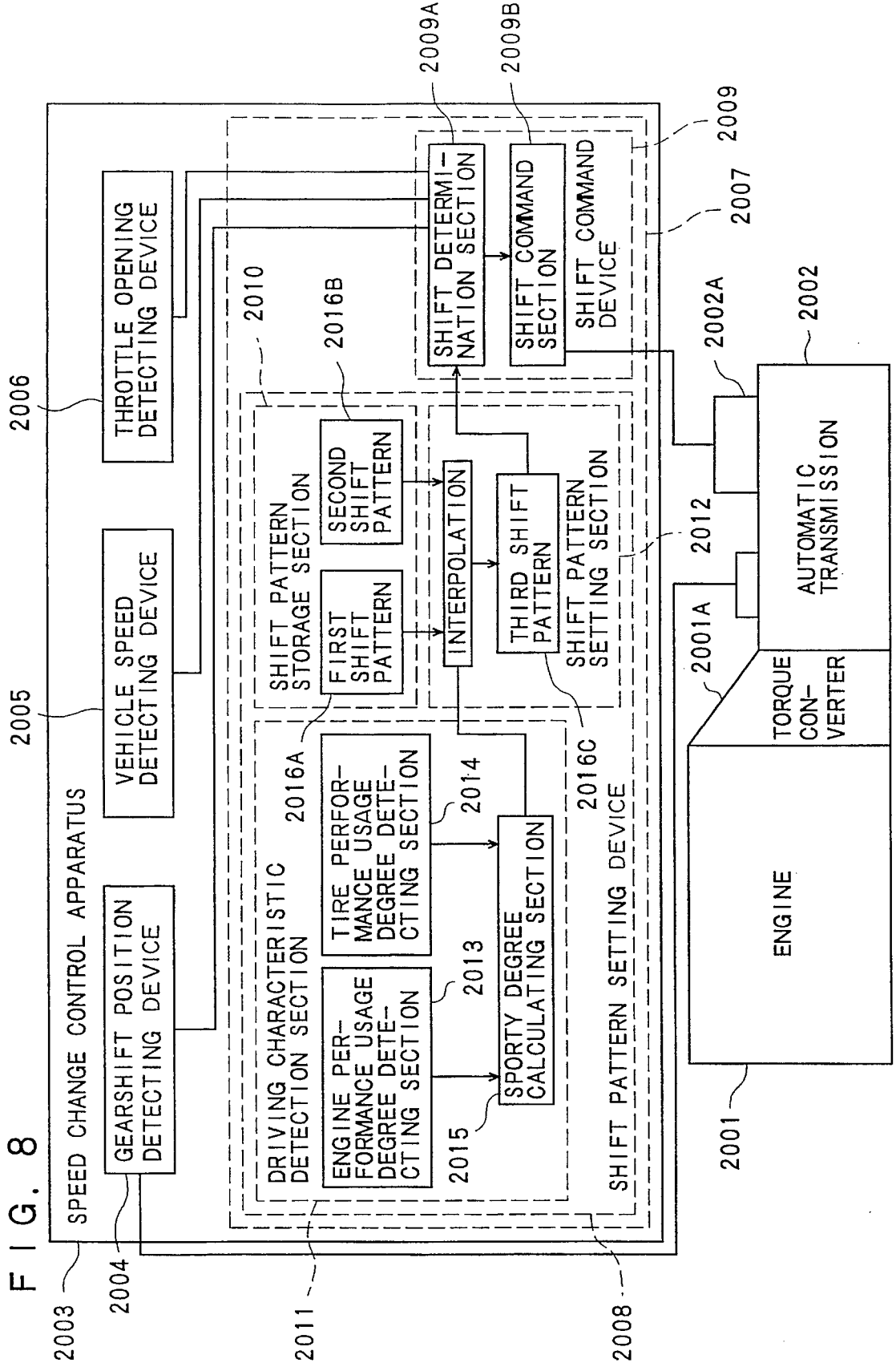
FIG. 8 is a functional block diagram pictorially showing the whole arrangement of a speed change control apparatus of a continuously variable shift pattern type for embodying a speed change control method according to a second embodiment of the present invention.

As shown in FIG. 8, the speed-change control apparatus, in the present embodiment, of a continuously variable shift pattern type is used with an automatic transmission 2002 which is supplied with an output of an engine 2001 installed on a vehicle through a torque converter 2001A, and which transmits the engine output to driving wheels, not shown. The speed change control apparatus is operable to control a state of a gearshift position changeover mechanism 2002A of the automatic transmission 2002, to thereby control switching of gearshift positions. The gearshift position changeover mechanism 2002A is constructed in the form of a hydraulic mechanism provided with electromagnetic valves, so that the electromagnetic valves are controlled to operate the hydraulic mechanism, to thereby establish a predetermined gearshift position state. Thus, the speed change control apparatus of the present embodiment is operable, in a direct sense, to control the operation of the electromagnetic valves.

The speed change control apparatus 2003 includes gearshift position detecting device 2004 for detecting a gearshift position presently established in the automatic transmission 2002, vehicle speed detecting device 2005 for detecting a speed at which a vehicle travels, throttle opening detecting device 2006 for detecting an opening of a throttle valve, and gearshift position changeover device 2007 for generating a changeover command for switching gearshift positions of the automatic transmission 2002 based on pieces of information supplied from the respective detecting means.

The gearshift position changeover device 2007 includes shift pattern setting device 2008 for setting a shift pattern in which a respective gearshift position corresponds to a combination of vehicle traveling speed and engine load, and gearshift position changeover command device (hereinafter referred to as shift command device) 2009 for outputting, if necessary, a desired gearshift changeover command signal.

The shift pattern setting device 2008 is comprised of a shift pattern storage section 2010 for storing therein a standard shift pattern set beforehand, a driving characteristic detecting section 2011 for detecting a driving characteristic of a driver, and a shift pattern setting section 2012 for changing the standard shift pattern based on the driving characteristic of the driver, to thereby set a shift pattern to be used.

The shift command device 2009 is comprised of a shift determination section 2009A for determining whether or not switching between gearshift positions is required based on the shift pattern set by the shift pattern setting section 2012, and a shift command section 2009B for outputting a desired gearshift position changeover signal when the shift determination section 2009A determines that a shift is required.

Shift Pattern Setting Device

Various sections of the shift pattern setting device 2008 will be explained. In the shift pattern storage section 2010, the standard pattern, which is set beforehand in accordance with traveling speed and throttle valve opening (corresponding to engine load), is stored. The standard pattern is provided with a first shift pattern (normal pattern) 2016A, and a second shift pattern (sporty pattern) 2016B set beforehand in a manner having a characteristic which is different from that of the first shift pattern 2016A. Of course, the sporty pattern 2016B is set in such a manner that upshift timing is delayed, and downshift timing is advanced, so that the driving is made with use of a relatively lower gearshift position than that used in the driving with the normal pattern 2016A, to thereby operate the engine in a high speed region in which a high output is obtainable.

Detection of Driving Characteristic

The driving characteristic detecting section 2011 is operable to detect a degree (hereinafter referred to as sporty driving degree, and further abbreviated as sporty degree) to which sporty driving is conducted by a driver. The sporty driving indicates the driving where a high output is taken out from the engine to operate a vehicle at a relatively higher speed with use of high acceleration performance. Thus, the engine output performance as well as the tire performance are utilized to a higher extent as the sporty degree becomes higher, since the lateral acceleration as well as acceleration and deceleration become large in the sporty driving.

Figure 9:
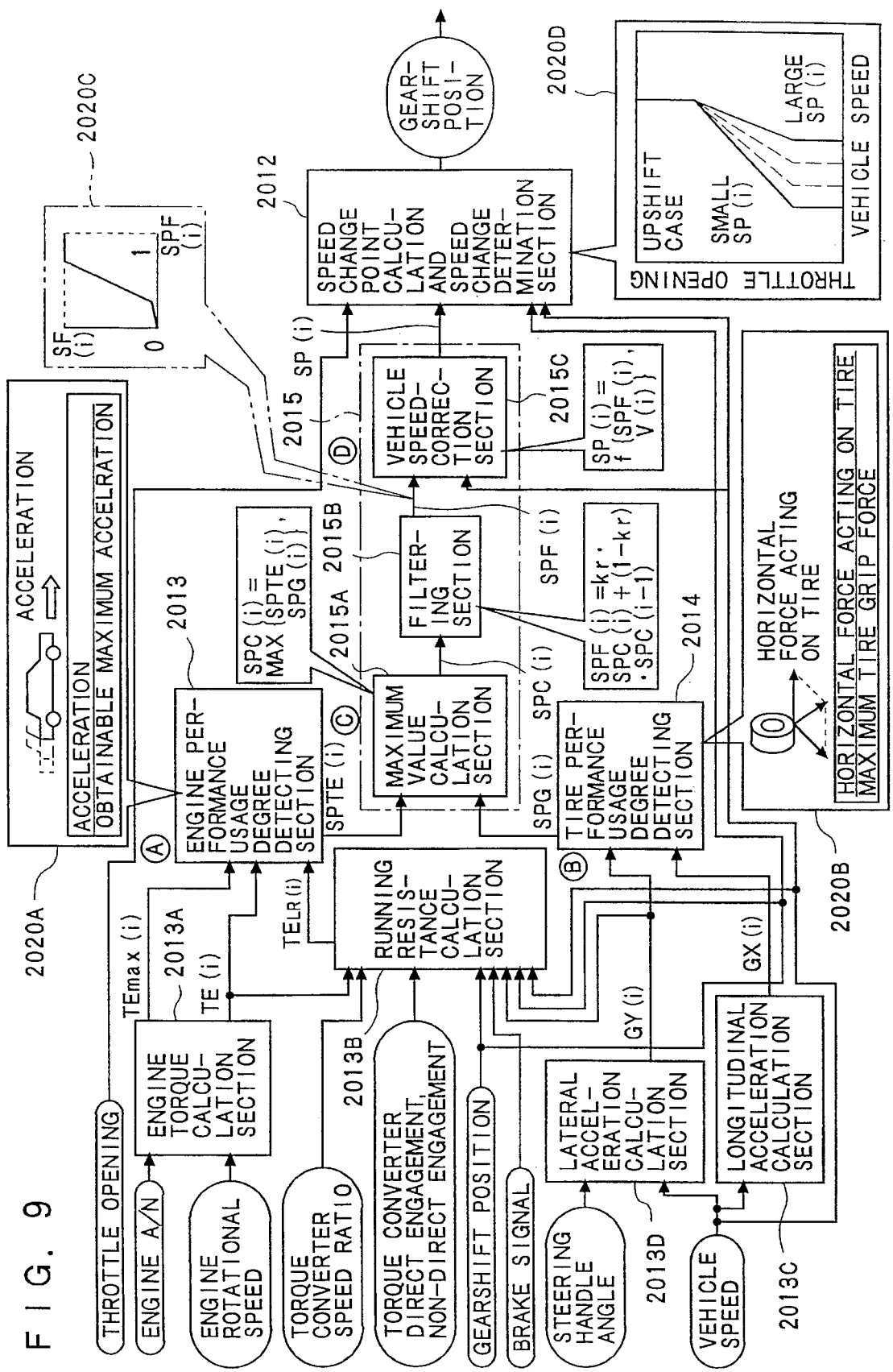
FIG. 9 is a functional block diagram showing essential part of the apparatus shown in FIG. 8.

In this respect, the driving characteristic detecting section 2011 is provided with an engine performance usage degree detecting section 2013 for detecting a degree to which the engine performance is used, a tire performance usage degree detecting section 2014 for detecting a degree to which the tire performance is used, and a sporty degree calculating section 2015 for determining a sporty degree from the degrees of usage of the engine performance and tire performance, as shown in FIGS. 8 and 9. The driving characteristic detecting section 2011 is operable to determine the sporty degree at intervals of a preset cycle.

Among these sections, the engine performance usage degree detecting section 2013 operates to calculate the sporty degree "SPTE(i)" in accordance with the following formula (11).

$$SPTE(i)=[TE(i)-TELR(i)]/[TEmax(i)-TELR(i)] \quad (11)$$

where TE(i) is present engine torque during vehicle driving which is calculated by the calculation section 2013A based on an intake charging efficiency "A/N" and an engine rotational speed "Ne", and is output therefrom.

Symbol TEmax(i) is maximum engine torque at the present engine rotational speed, which is calculated in the calculation section 2013A, and is output therefrom as maximum engine torque "TEmax(i)."

Symbol TELR(i) is a reduced torque, of running resistance including no acceleration resistance, on the engine crankshaft. The reduced torque of running resistance "TELR(i)" is calculated by the calculation section 2013B based on various pieces of information such as engine torque "TE(i)," torque converter speed ratio "e," torque converter direct engagement information, gearshift position of the automatic transmission 2002, brake signal, lateral acceleration "GY(i)," longitudinal acceleration "GX(i)" and vehicle speed "V" supplied from various sensors and switches, the reduced torque thus calculated being output.

In accordance with formula (11), a ratio of the currently used traveling torque to the maximum torque determined in dependence on usable engine performance is determined. As shown by the functional block 2020A in FIG. 9, this ratio corresponds to a ratio of the present vehicle acceleration to the maximum vehicle acceleration which can be generated.

This ratio, that is, a sporty degree "SPTE(i)" indicates a degree to which the engine output is used by the driver, or to which sporty driving is conducted by the driver.

In the tire performance usage degree detection section 2014, a sporty degree "SPG(i)" is calculated in accordance with the following formula (12).

$$SPG(i)=[\{GX(i)\}2+\{GY(i)\}2]^{1/2}/Gmax \qquad (12)$$

where GX(i) is longitudinal acceleration which is calculated in the calculation section 2013C by differentiating the vehicle speed "V" with respect to time, and which is output as longitudinal acceleration "GX(i)."

Symbol GY(i) is lateral acceleration which is calculated in the calculation section 2013D based on the vehicle speed "V" and the steering handle angle "θH," and which is output as lateral acceleration "GY(i)." In the meantime, Gmax is limit acceleration up to which no tire slip takes place, which is given as a constant.

As shown by the functional block 2020B in FIG. 9, formula (12) corresponds to a ratio of a horizontal force exerting on a tire to the maximum grip force of the tire. This ratio, that is, the sporty degree "SPG(i)" indicates a degree to which the grip performance of tire is used by the driver, or to which sporty driving is conducted by the driver.

The sporty degree calculating section 2015 is provided with a maximum value calculating section 2015A, a filtering section 2015B, and a vehicle speed-correction section 2015C. In these sections, the sporty degrees "SPTE(i)" and "SPG(i)" respectively associated with the engine performance and the tire performance are subject to processing, whereby the sporty degree is determined.

First, a larger one of the sporty degrees "SPTE(i)" and "SPG(i)" is selected in the maximum value calculating section 2015A, as shown in formula (13).

$$SPC(i)=\{MAX SPTE(i), SPG(i)\} \qquad (13)$$

Further, the sporty degree "SPC(i)" is subjected to filtering in the filtering section 2015B. This filtering is a process for obtaining an average sporty degree "SPF(i)" in a time range including the present and preceding detection cycles, by considering pieces of information obtained in the preceding detection cycle in addition to an instantaneous sporty degree "SPC(i)" obtained in the present detection cycle. The average sporty degree can be calculated in accordance with the following formula (14).

$$SPF(i)=kr \cdot SPC(i)+(1-kr) \cdot SPC(i-1) \qquad (14)$$

where symbol kr is a coefficient which varies in a range from 0 to 1, so that contribution of the instantaneous sporty degree "SPC(i)" attributable to data in the present detection cycle becomes large when kr is set to a value close to 1, whereas contribution of the sporty degree "SPC(i−1)" attributable to data in the preceding detection cycle becomes large when kr is set to a value close to 0. Thus, sensitiveness in response to a driver's demand can be made appropriate one by an adjustment of the value of kr.

As shown by a map in the functional block 2020C in FIG. 9, the sporty degree "SPC(i)" may be subjected to filtering, so as to be converted into a sporty degree "SP'(i)" and to be output. Namely, the sporty degree "SP'(i)" may be considered as being nearly 0 in a region in which the sporty degree "SPC(i)" is small, whereas the sporty degree "SP'(i)" may be considered as being nearly 1 (=100%) in a region in which the sporty degree "SPC(i)" is great, and "SP'(i)" may be set in a manner linearly increases with the increase of "SPC(i)" in an intermediate region. This makes it possible to improve control stability.

In the vehicle speed-correction section 2015C, the thus calculated sporty degree "SPF(i)" is subjected to vehicle speed-correction so as to meet feelings of the human being. For instance, in a low vehicle speed region, the sporty degree "SPF(i)" is relatively difficult to become large, so that the sporty degree of driving by the driver is relatively difficult to appear or to be reflected thereon. On the other hand, in a high vehicle speed region, the sporty degree "SPF(i)" is relatively easy to become large, and hence the sporty degree of the driving is liable to be emphasized. Thus, as shown in the following formula (15), the final sporty degree "SP(i)" is calculated as a function of the sporty degree "SPF(i)" and the vehicle speed "V(i)," to thereby correct the sporty degree "SPF(i)" in accordance the vehicle speed, so that the sporty degree of the driving is detected in a more appropriate manner.

$$SP(i)=f\{SPF(i), V(i)\} \qquad (15)$$

The sporty degree "SP(i)" calculated in the driving characteristic detecting section 2011 is output to the shift pattern setting section 2012. Meanwhile, the sporty degree "SP(i)" can be set to have a value which varies between its maximum value of 1 or 100(%) and its minimum value of 0.

Setting of Shift Pattern

In the shift pattern setting section 2012, a driving characteristic equivalent shift pattern as a third shift pattern (hereinafter referred to as driving characteristic equivalent pattern) is set between the normal pattern 2016A and the sporty pattern 2016B in accordance with the sporty degree "SP(i)."

Figure 10:
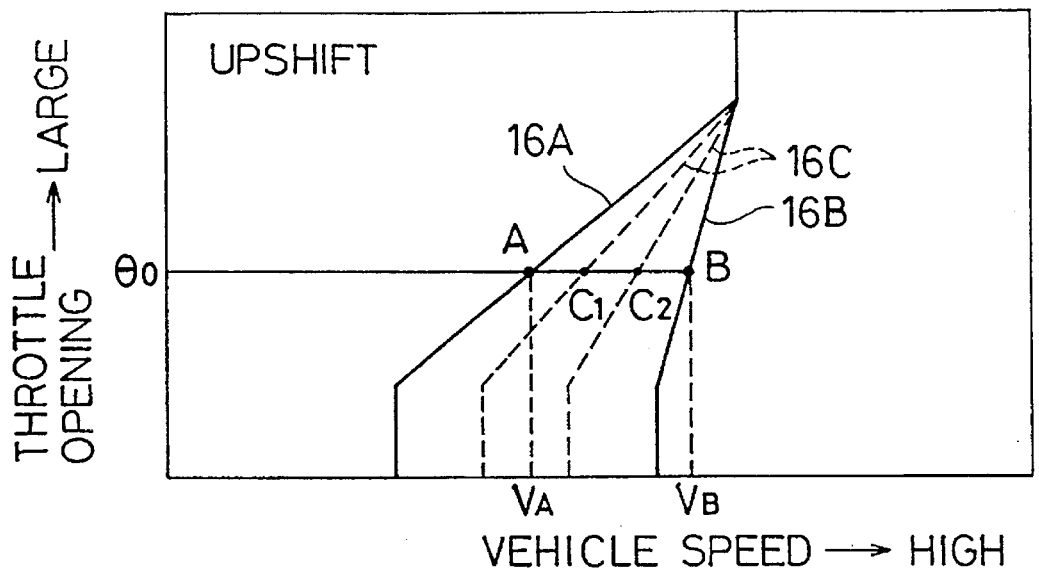
FIG. 10 is a graph exemplarily showing a shift pattern for upshift used for the speed change control effected by means of the apparatus shown in FIGS. 8 and 9.

The setting of the driving characteristic equivalent pattern 2016C is carried out with use of an interpolation method. For instance, if the present throttle opening is θO, then the setting is carried out in the following manner. In respect of an upshift, for instance, a point A (i.e., vehicle speed VA) serves as an upshift point in the normal pattern 2016A, whereas a point B (i.e., vehicle speed VB) serves as an upshift point in the sporty pattern 2016B, as shown in FIG. 10 and in the functional block 2020D in FIG. 9. An upshift point C in the driving characteristic equivalent pattern 2016C is determined by interpolating the points A and B in accordance with the sporty degree "SP(i)" input at that time.

A vehicle speed (upshift vehicle speed) VC corresponding to the upshift point C is represented as shown below with use of the vehicle speed VA corresponding to the upshift point A, the vehicle speed VB corresponding to the upshift point B, and the input sport degree "SP(i)."

$$VC=VA+(VB-VA) \cdot SP(i) \qquad (16)$$

Thus, if "SP(i)" is 0.5 (or 50%), for instance, the upshift point C is the midpoint between the points A and B. If "SP(i)" is 0.33 (or 33%), for instance, the upshift point C is away from the point A by 0.33 toward the point B, as shown by a point C1 in FIG. 10. If "SP(i)" is 0.67 (or 67%), for instance, the upshift point C is away from the point A by 0.67 toward the point B, as shown by a point C2 in FIG. 10.

The thus calculated driving characteristic equivalent pattern 2016C results in the pattern shown by the dotted lines in FIG. 10. Therefore, the driving characteristic equivalent pattern is continuously renewed with the change of the sporty degree "SP(i)" which is periodically input, so as to be located on an optimum line between the normal pattern 2016A and the sporty pattern 2016B.

In respect of a downshift, the above is also applied. That is, as shown in 11, a point A (i.e., vehicle speed VA) serves as a downshift point in the normal pattern 2016A, and a point B (i.e., vehicle speed VB) serves as a downshift point in the sporty pattern 2016B. A downshift point C (C1 or C2, for instance) of the driving characteristic equivalent pattern 2016C is determined by interpolating the points A and B in accordance with the sporty degree "SP(i)" input at that time.

Figure 11:
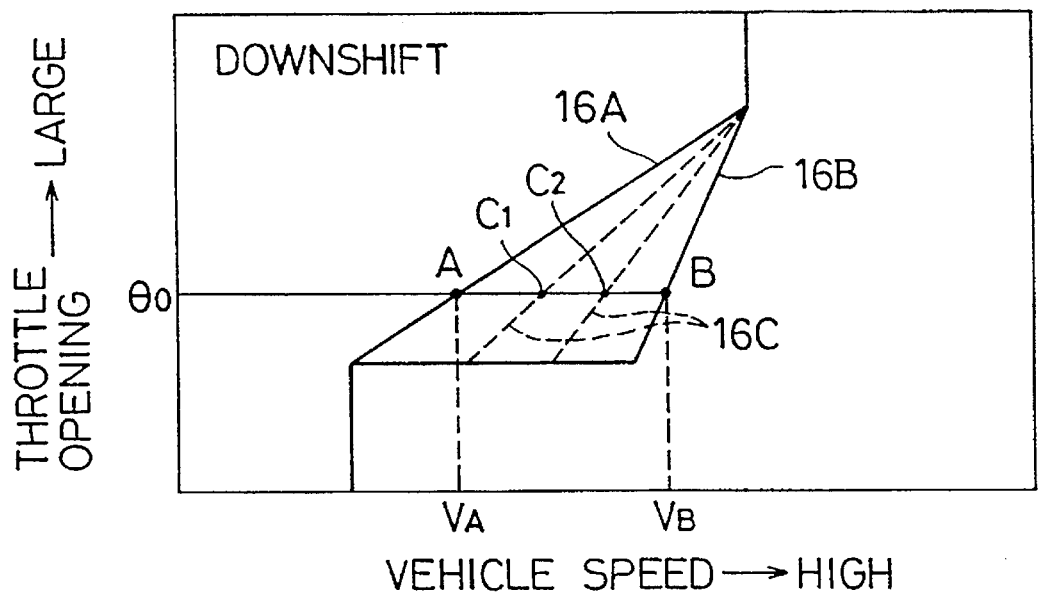
FIG. 11 is a graph, similar to FIG. 10, exemplarily showing a shift pattern for downshift.

Thus, if "SP(i)" is 0.5 (or 50%), for instance, the downshift point C is the midpoint between the points A and B. If "SP(i)" is 0.33 (or 33%), for instance, the downshift point C is away from the point A by 0.33 toward the point B, as shown by a point C1 in FIG. 11. If "SP(i)" is 0.67 (or 67%), for instance, the downshift point C is away from the point A by 0.67 toward the point B, as shown by a point C2 in FIG. 11.

The shift command device 2009 determines whether or not the gearshift position must be changed in accordance with the thus set driving characteristic equivalent pattern 2016C, and generates, if necessary, a desired gearshift position changeover command signal.

Operation and Effect

Figure 12:
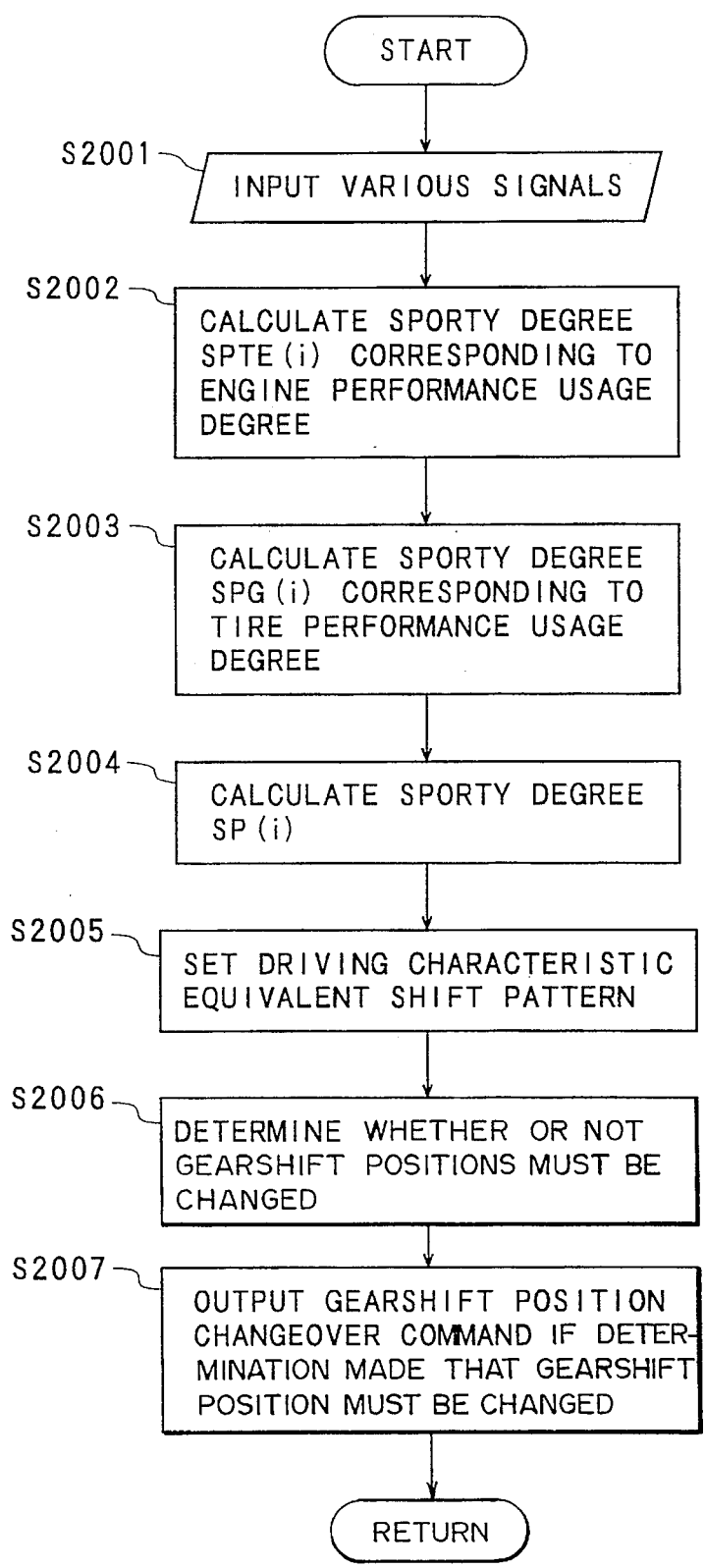
FIG. 12 is a flowchart of a speed change control carried out by means of the apparatus shown in FIGS. 8 and 9.

Since the speed change control apparatus, according to the present embodiment, of a continuously variable shift pattern type is constructed as explained above, control for switching gearshift positions of the automatic transmission 2002 is carried out, through the medium of the speed change control apparatus 2003 and the gearshift position changeover mechanism 2002A, in accordance with procedures exemplarily shown in FIG. 12.

More specifically, as shown in FIG. 12, at step S2001, various sensor outputs such as gearshift position, intake charging efficiency "A/N" of the engine, engine rotational speed "Ne," torque converter speed ratio "e," brake signal, torque converter direct engagement information, and throttle valve opening are read.

Next, at step S2002, the engine performance usage degree is calculated in the engine performance usage detecting section 2013 of the driving characteristic detecting section 2011. Whereupon, the sporty degree "SPTE(i)" is output. At step S2003, the tire performance usage degree is calculated in the tire performance usage degree detecting section 2014 of the driving characteristic detecting section 2011, so that the sporty degree "SPG(i)" is output. Upon calculation of the sporty degree "SPG(i)," the longitudinal acceleration GX(i) and the lateral acceleration "GY(i)" are first calculated in the calculation sections 2013C and 2013D, and then the sporty degree "SPG(i)" is calculated based thereon.

At the next step S2004, the sporty degree "SP(i)" is calculated in the sporty degree calculating section 2015 of the driving characteristic detecting section 2011 based on the sporty degrees "SPTE(i)" and "SPG(i)." In this calculation, a larger one of the two sporty degrees SPTE(i)" and "SPG(i)" is first selected in the maximum value calculating section, to obtain SPC(i), and then SPF(i) is obtained in the filtering section 2015B with use of the information SPC(i–1) up to the preceding detection cycle in addition to SPC(i). Further, in the vehicle speed-correction section 2015C, SPF(i) is subject to vehicle speed-correction so as to meet feelings of the human being.

After obtainment of the sporty degree "SP(i)," the shift pattern setting section 2012 sets a driving characteristic equivalent pattern 2016C, as a third shift pattern, between the normal shift pattern 2016A and the sporty pattern 2016B in accordance with the sporty degree "SP(i)," at step S2005.

Then, at step S2006, the shift determination section 2009A of the shift command means 2009 determines whether or not the gearshift position must be changed based on the driving characteristic equivalent pattern set in the shift pattern setting section 2012. Further, at step S2007, if the shift determination section 2009A determines that a shift must be made, then a desired gearshift position changeover command signal is output from the shift command section 2009B of the shift command device 2009. Then, the gearshift position changeover mechanism 2002A responds to the gearshift position changeover command signal, whereby a control for changeover between gearshift positions of the automatic transmission 2002 is carried out.

The above operation produces the following effects.

When sporty driving is done, a demand to the engine and tire performance is enhanced, and hence a shift line is changed toward the higher speed side, to thereby automatically conduct a speed change control in accordance with the sporty pattern. When mild driving by which a demand to the engine and tire performance is decreased is done, the shift line changes toward the lower speed side, so that a speed change control according to the economy pattern is performed automatically.

Differences can be found between individuals in respect of the sporty or mild degree. Thus, to achieve the speed change control suitable to individual preference, preferably, such a control must be carried out in a desired state between the sporty and economy patterns. According to the present embodiment, the changeable shift pattern can be continuously adjusted, making it possible to cause the shift pattern to finely meet the individuality.

The system only requires two shift patterns, i.e, the sporty and economy patterns. This reduces factors which must be confirmed and set through the medium of experiments, etc., whereby the system can be constructed easily at low costs. Further, arithmetic operations required for the calculation of the driving characteristic equivalent shift pattern 2016C includes a reduced number of arithmetic steps, and each arithmetic step can be easily carried out. This never causes a response delay attributable to time consuming arithmetic operations, whereby a rapid speed change control can be achieved.

The speed change control method of the present embodiment may be modified in various manners.

For instance, in the present embodiment, the setting of the driving characteristic equivalent shift pattern is made by effecting arithmetic operations for linear interpolation with use of the first and second shift patterns which serve as the standard shift pattern. However, the shift pattern setting may be made in terms of arithmetic operations of second-order interpolation with use of three standard shift patterns. Also, a single standard shift pattern may be used. In this case, the standard shift pattern is subject to correction in accordance with the sporty degree "SP(i)" to thereby set the driving characteristic equivalent shift pattern 2016C. Moreover, three or more shift patterns may be employed for finely setting a desired pattern between these shift patterns in various manners with use of a system similar to that of the foregoing embodiment.

In the following, a speed change control apparatus for embodying a speed change control method according to a third embodiment of the present invention will be explained.

Whole Arrangement

Figure 13:
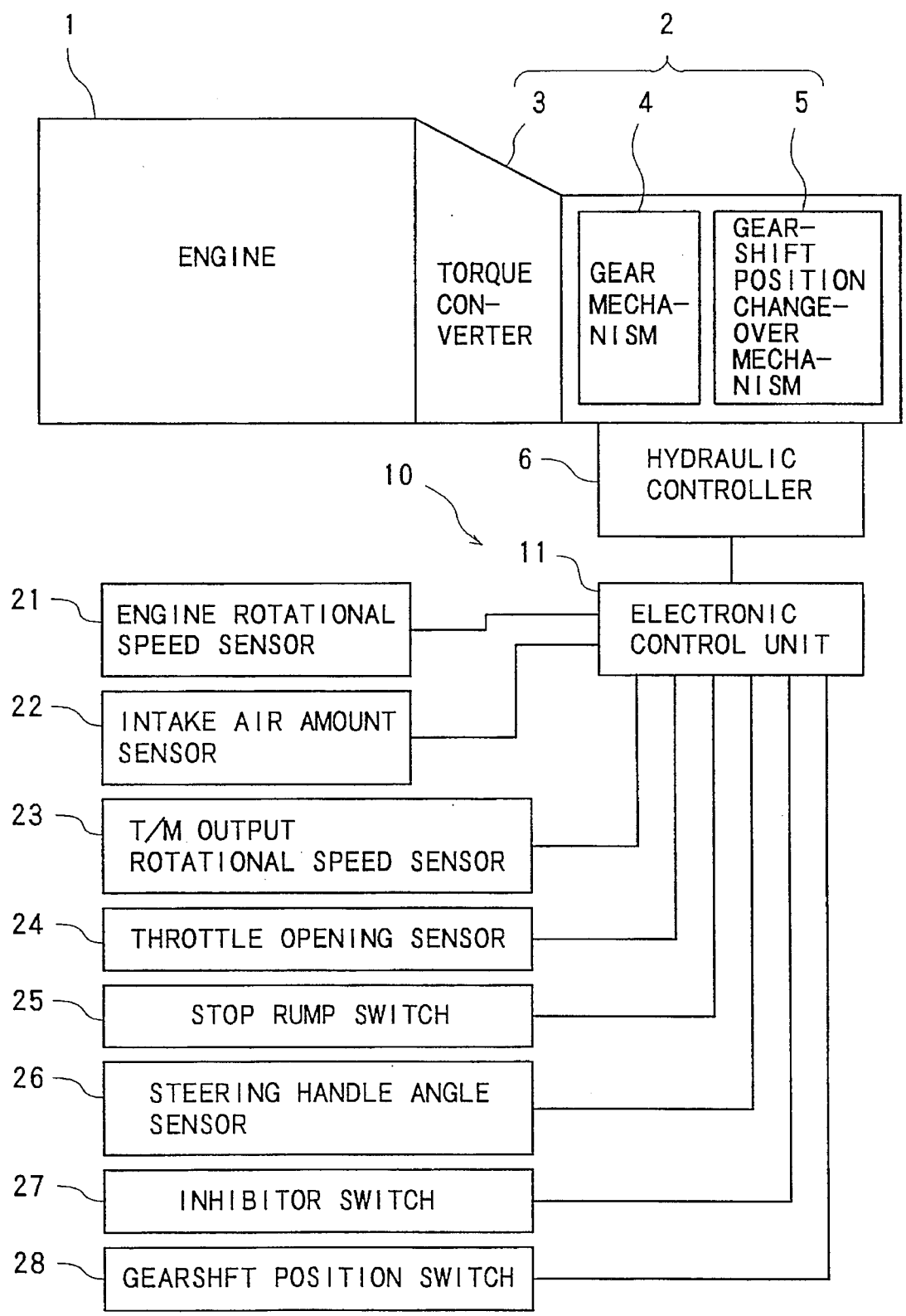
FIG. 13 is a schematic view showing an automatic transmission provided with a speed change control apparatus for embodying a speed change control method according to a third embodiment of the present invention.

As shown in FIG. 13, an automatic transmission 2, interposed between an engine 1 and driving wheels (not shown) of a vehicle, includes a torque converter 3 coupled to an output shaft of the engine 1, a gear mechanism 4 having a plurality of speed change gear wheels for establishing an arbitrary one of a plurality of, e.g., four gearshift positions, and a gearshift position changeover mechanism 5 for driving the gear mechanism to thereby switch gearshift positions.

Although detailed illustrations will be omitted, the gearshift position changeover mechanism 5 includes, e.g., a plurality of engaging members respectively comprised of clutches, and a hydraulic drive mechanism for switching engagement states of the engaging members. This drive mechanism has return springs for urging the engaging elements, and hydraulic pistons each of which serves to urge an associated one engaging element in the direction opposite the direction in which the spring force of an associated one return spring exerts. Operating oil pressure supplied to a pressure chamber corresponding to a respective hydraulic piston is controlled by means of a hydraulic controller 6.

The vehicle is mounted with a speed change control apparatus 10 for electrically controlling operational states of electromagnetic switching valves (not shown) of the hydraulic controller 6, to thereby operate the drive mechanism of the gearshift position changeover mechanism 5 so that a desired gearshift position is established. This speed change control apparatus 10 has various sensors for detecting running conditions of the vehicle, and an electronic control unit 11 which serves to achieve functions of various functional blocks shown in FIG. 14. This control unit 11 is designed to operate the electromagnetic switching valves of the hydraulic controller 6 in accordance with various sensor outputs.

Connected to the electronic control unit 11 are an engine rotational speed (NE) sensor 21, an engine intake air amount (A/N) sensor 22, a T/M (transmission) output rotational speed (N0) sensor 23, a throttle opening (Th) sensor 24, a stop lamp switch 25, a steering handle angle sensor 26, an inhibitor switch 27 for detecting a changeover position of a select lever (not shown) for switching drive ranges of the automatic transmission 2, a gearshift position switch 28 for detecting a gearshift position currently established in the automatic transmission 2, and the like. Meanwhile, an electronic control unit (not shown) for engine control is interposed between the control unit 11 and the sensors 21, 22 in a manner permitting signal transfer between these control units.

Figure 14:
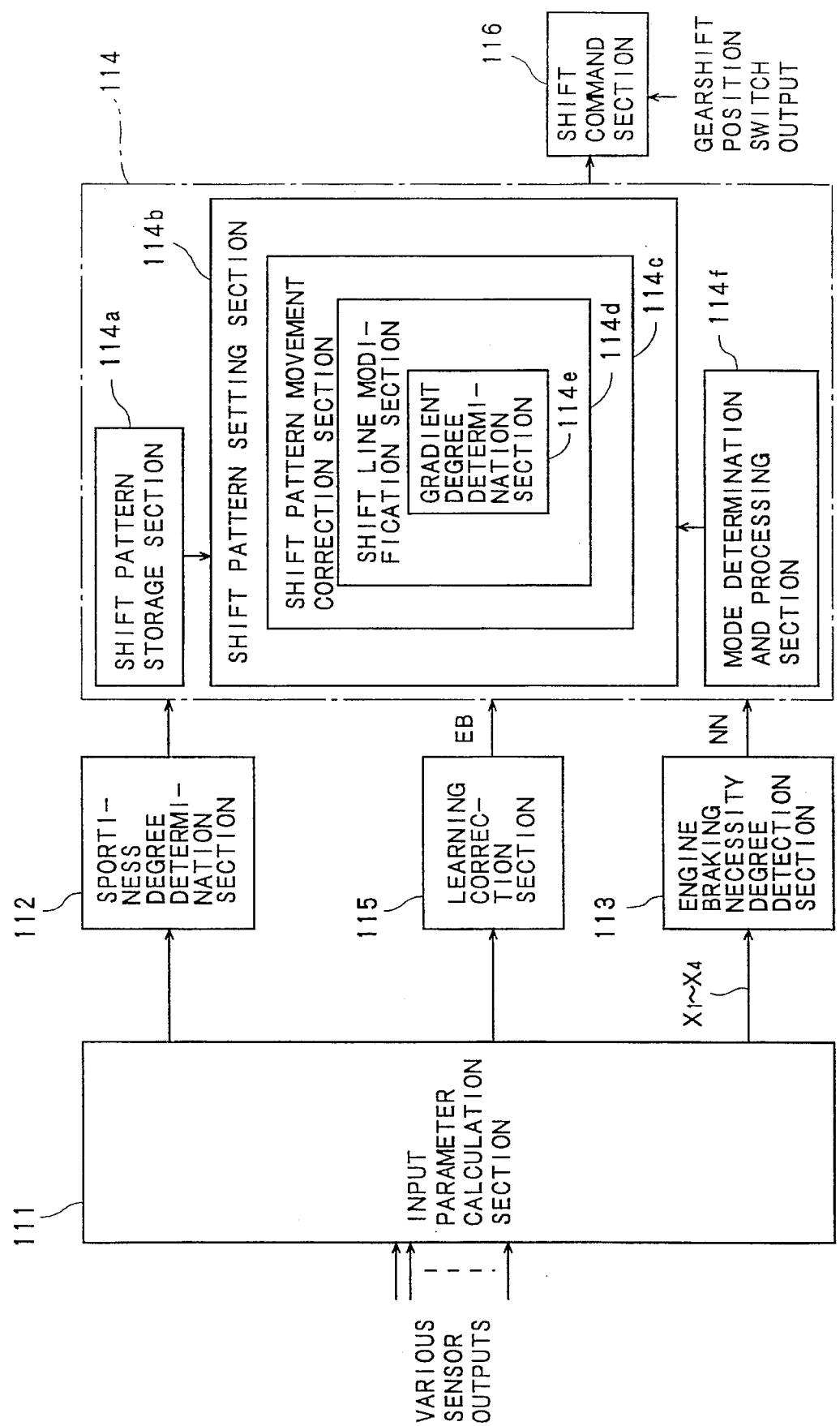
FIG. 14 is a functional block diagram of an electronic control unit, shown in FIG. 13, for speed change control.

Referring to FIG. 14, the electronic control unit 11 functionally includes an input parameter calculation section 111 for calculating input variables and input switches, which are used for calculations in various sections of this control unit, on the basis of sensor outputs; a sportiness degree determination section 112 for determining a degree to which sporty driving is conducted; an engine braking necessity degree detection section 113 for detecting a degree of necessity of engine braking; a shift pattern selection section 114 for selecting a desired shift pattern to determine a commanded gearshift position; a learning correction section 115 for effecting learning correction of a determination reference value used by the shift pattern selection section 114 in determining the necessity of downshift; and a shift command section 116 for determining necessity of gear-changing for speed change based on a commanded gearshift position determined by the shift pattern selection section 114 and a current gearshift position detected by the gearshift position switch 28.

The shift pattern selection section 114 has a shift pattern storage section 114a storing therein two standard shift patterns (a mild pattern attaching importance to economical vehicle running ability and a sporty pattern attaching importance to vehicle drivability) each represented by a function of vehicle speed and engine load (throttle opening). The sporty pattern is set such that upshift timing is delayed and downshift timing is advanced as compared with those in the mild pattern, so that the engine 1 is operated in its higher output region (see, FIGS. 32 and 33).

When comparing the mild and sporty patterns from another viewpoint, the mild pattern is suitable to be used as a pattern for flat roads, and the sporty pattern is suitable to be used as a pattern for ascending roads. Thus, in the subsequent explanations, especially in an explanation regarding an upshift line modification, the terms "mild pattern" and "sporty pattern" sometimes represent the pattern for flat roads and the pattern for ascending roads, respectively.

The shift pattern selection section 114 includes a shift pattern setting section 114b for setting a shift pattern suitable to the sporty degree and the later-mentioned gradient degree (shift movement coefficient) by performing interpolation based on the two standard shift patterns. This setting section 114b includes a shift pattern movement correction section 114c for causing a shift pattern to move in accordance with the sporty and gradient degrees. The correction section 114c includes a shift line modification section 114d for continuously modifying a shift line of a shift pattern in accordance with the sporty and gradient degrees. Moreover, this modification section 114d includes a gradient degree determination section 114e for determining the gradient degree based on weight and gradient resistance RS which is determined by the input parameter calculation section 111 in a manner mentioned below.

Further, the shift pattern selection section 114 includes a mode determination and processing section 114f for determining a running mode suitable to input parameters and an output from the engine braking necessity degree detection section 113, and for determining a commanded gearshift position in accordance with input parameters and a shift pattern set by the shift pattern setting section 114b. In the present embodiment, a flat or ascending road running mode A, a gentle descending road running mode C, and a steep descending road running mode D are provided. A desired one of the four gearshift positions is established as an optimum gearshift position in the mode A. Fixing to the gearshift position for the third speed is made in the mode C, and fixing to the gearshift position for the second speed is made in the mode D.

Outlines of Operation

The electronic control unit 11 constructed as mentioned above executes a main routine shown in FIG. 15 at intervals of a predetermined cycle, to thereby achieve the functions of the various sections 111 through 116, shown in FIG. 14, of the control unit.

When the ignition key of the engine 1 is turned on, for instance, the electronic control unit 11 initializes various parts of the control unit to thereby effect initial setting (step S1). This initial setting step S1 is not conducted in the second and subsequent main routine execution cycles.

Then, the control unit 11 serving as the input parameter calculation section 111 reads the outputs from the various sensors 22 through 27, and calculates input variables in a manner mentioned below (step S2). In this input variable calculation, sensor outputs and parameters derived therefrom are subject to processing whereby they are converted into dimensionless quantities. This makes it possible to apply the speed change control apparatus to a variety of vehicles and engines which have different specifications.

Next, the control unit 11 serving as the input parameter calculation section 111 calculates input switches, as mentioned later (step S3). These input switches serve as pieces of flag information which are employed in the calculations executed by the various sections of the control unit. The input switches include a braking deceleration switch BGSP, a large braking deceleration switch BGSB, a non-negative gradient resistance FSRSP, three moderate throttle opening switches FSTh45, FSTh34, FSTh23, a mode C fulfillment switch MSWC, etc.

Upon completion of calculations of the input switches, a degree of sportiness is determined by the control unit 11 serving as the sporty degree determination section 112 as mentioned below (step S4), and a degree of gradient (shift movement coefficient) is calculated by the control unit 11 serving as the gradient degree determination section 114e as mentioned below (step S5).

Next, the control unit 11 as the mode determination and processing section 114f determines whether or not non-mode is established (step S6). More specifically, it is determined that the non-mode is established if an oil temperature is equal to or lower than a predetermined temperature, or if a pattern (hold pattern, or "P," "R," "N," or "L" range) other than a standard pattern is used in shift pattern control, or if a particular failure such as disconnection of the throttle opening sensor 24 is detected in failure diagnosis, or an abnormality of the stop lamp switch 25 is detected.

If it is determined that the non-mode is not established, and hence the result of the determination at step S6 is negative, then the control unit 11 serving as the shift pattern setting section 114b sets a shift pattern suitable to the sporty degree and the gradient degree respectively obtained at steps S4 and S5, and the control unit 11 serving as the mode determination and processing section 114f calculates, in accordance with the thus set shift pattern, a gearshift position SHIFT1 in the mode A on the basis of a vehicle speed V and a throttle opening Th which are included in the input variables obtained at step S2 (step S7). Next, the mode determination and processing section 114f determines whether or not a mode shift prohibition condition, such that the vehicle speed V is equal to or lower than a predetermined vehicle speed, or a particular failure such as a false adjustment of the throttle opening sensor 24 is detected in the failure diagnosis, is fulfilled (step S8).

If the mode shift prohibition condition is not fulfilled, so that the result of determination at step S8 becomes negative, then the engine braking necessity degree detection section 113 supplies four input variables X1 through X4, respectively associated with gradient, braking force, steering handle angle, and vehicle speed, to a neural network, to thereby determine an engine braking conformity degree NN, as mentioned below (step S9).

Next, on the basis of the vehicle speed V and the throttle opening Th included in the input variables obtained at step S1, a non-negative gradient resistance switch FSRSP included in the input switches obtained at step S3, the engine braking conformity degree NN obtained at step S9, and the like, fulfillment or unfulfillment of each of the below-mentioned fuzzy rules is checked by the mode determination and processing section 114f (step S10). Further, the below-mentioned engine braking learning processing is carried out by the learning correction section 115 (step S11). In the learning correction processing, threshold values associated with the engine braking conformity degree NN, which affect fulfillment of the fuzzy rules, are subject to learning correction each time an excess or deficiency in engine braking is determined.

Whereupon, the later-mentioned mode processing is carried out by the mode determination and processing section 114f to thereby calculate a gearshift position SHIFTF in the current mode (step S12). In the mode processing at step S12, necessity of mode shift and the gearshift position SHIFTF in the current mode are decided on the basis of a current vehicle running mode (the mode A, C, or D) and a commanded gearshift position respectively obtained in the preceding main routine execution cycle, the gearshift position SHIFT1 in the mode A obtained at step S7, and results of the fuzzy rule check at step S10.

Next, a commanded gearshift position SHIFT0 is calculated by the mode determination and processing section 114f based on the gearshift position SHIFTF in the current mode obtained at step S12, and the like (step S13). Whereupon, the execution of the main routine in the present cycle is finished. The main routine is executed again from step S2 when the next main routine execution timing is reached.

If it is determined at step S6 that the non-mode is established, the mode determination and processing section 114f calculates a commanded gearshift position SHIFT0 suitable to a non-mode condition (step S14). For this gearshift position calculation, the mild pattern stored in the shift-pattern storage section 114a is utilized. Further, if it is determined at step S8 that the mode shift prohibition condition is fulfilled, the gearshift position SHIFT1 in the mode A calculated at step S7 is set as the gearshift position SHIFTF in the current mode (step S15). Upon completion of the calculation of gearshift position at step S14 or S15, the program returns to step S2. Meanwhile, the control unit 11 serving as the shift command section 116 determines whether or not gear-changing for speed change is required on the basis of the commanded gearshift position SHIFT0 obtained at step S13 or S14 and the gearshift position presently established, and delivers a gearshift position changeover command, if necessary.

As suggested by the foregoing explanations on the whole arrangement and the outlines of operation, and as explained hereinbelow, the speed change control apparatus of the present embodiment is so designed as to achieve various functions in addition to an ordinary shift pattern control function. That is, the speed change control apparatus has a function of causing an appropriate engine braking to exert during vehicle running on a descending road; a function of learning a downshift operation condition so as to permit a downshift to be conducted during vehicle running on a descending road in conformity with a driver's preference; a function of continuously switching shift patterns such that the resultant shift pattern is in conformity with a driving manner (sporty degree) of the driver; a function of prohibiting an unnecessary upshift due to lift-foot during vehicle running on an ascending road, to thereby ensure drivability (driving force) of the vehicle; and a function of causing a downshift to take place easily when the sporty degree and the braking deceleration are large, to thereby improve the drivability upon restart of accelerated vehicle driving.

In the following, various sections of the electronic control unit will be explained in detail.

Input Parmeter Calculation Section

In the calculation of input variables, the control unit 11 serving as the input parameter calculation section 111 processes outputs from the engine rotational speed sensor 21, the engine intake air amount sensor 22, the T/M output rotational speed sensor 23, the throttle opening sensor 24, the stop lamp switch 25, and the steering handle angle sensor 26, to thereby obtain an engine rotational speed NE, an intake air amount A/N, a T/M output rotational speed N0, a throttle opening Th, a brake switch BS, an absolute value ST of steering handle angle, etc. The brake switch BS has a value of, e.g., "0" when the stop lamp switch 25 is turned off, and has a value of, e.g., "1" when the switch is turned on.

Moreover, in the input variable calculation, a vehicle speed V, longitudinal acceleration GX, lateral acceleration GY, braking deceleration GBG, engine torque TE, maximum engine torque TEMAX, a torque converter speed ratio e, a torque converter torque ratio t, a current speed ratio iT, an engine driving force FE, acceleration resistance RA, weight and gradient resistance RS, an acceleration margin KACC, acceleration torque TEACC, neural network inputs X1 through X4, etc. are calculated as input variables in accordance with associated calculation formulae.

The vehicle speed V is calculated in accordance with the formula $V=(N0\cdot 2\pi\cdot r\cdot 60)/iF\cdot 1000$ which includes a T/M output rotational speed N0, a tire diameter r, and a final reduction gear ratio iF, as variables.

The longitudinal acceleration GX is obtained by subjecting a value GX0 to a filtering process, the value GX0 being calculated in accordance with the formula $GX0=\{2\pi\cdot r\cdot(N0n0-N0n-1)\}/(0.024\cdot iF\cdot 60\cdot 9.8)$ which includes a change amount (N0n0−N0n−1) of T/M output rotational speed, a tire diameter r, and a final reduction gear ratio iF, as variables. The filtering process is carried out in accordance with the formula $Xf=Kf\cdot X+(1-Kf)\cdot Xf-1$. Symbols Xf, X, and Xf−1 denote a filter output, a filter input, and a filter output in the preceding calculation, respectively. Symbol Kf denotes a filter constant which is represented by a calculation cycle and a cut-off frequency.

The lateral acceleration GY is obtained by subjecting a value GY0 to a filtering process, the value GY0 being calculated in accordance with the arithmetic formula $GY0=(ST\cdot\pi)/[180\cdot iS\cdot 1\cdot\{A+1/N0\cdot 2\quad \pi\cdot r/iF/60)2\}\cdot 9.8]$ which includes, as variables, the T/M output rotational speed N0, an absolute value ST of steering handle angle, a steering gear ratio iS, a wheel base 1, a stability factor A, the tire diameter r, and the final reduction gear ratio iF.

The braking deceleration GBG, which is determined from longitudinal acceleration GX and a brake switch BS, has a value of "0" when BS=0 or when GX≧0, and has a value of "−GX" when BS=1 and GX<0.

The engine torque TE is determined by subjecting a value, obtained from an engine rotational speed NE and an intake air amount A/N, to a filtering process. The maximum engine torque TEMAX is determined from the engine rotational speed NE and a predetermined intake air amount A/N (e.g., 96%).

The torque converter speed ratio e is calculated in accordance with the arithmetic formula $e=iT\cdot N0/NE$ including a present speed change ratio iT which is the speed change ratio at the commanded gearshift position, the T/M output rotational speed N0, and the engine rotational speed NE, as variables. Further, the torque converter torque ratio t is determined based on a torque converter speed ratio e with reference to an e·t map (not shown). Moreover, an engine driving force FE is determined in accordance with the arithmetic formula $FE=TE\cdot t\cdot iT\cdot iF\cdot\eta/r$ which includes, as variables, engine torque TE, the torque converter torque ratio t, the present speed change ratio iT, the final reduction gear ratio iF, a transmission efficiency η of the transmission, and the tire diameter r.

The acceleration resistance is calculated in accordance with the following arithmetic formula.

$$RA=\{W+W0\cdot(KMT+KME\cdot iT2\cdot iF2)\}\cdot GX$$

where W, W0, KMT, and KME represent vehicle weight, weight of empty vehicle, an equivalent weight ratio of rotary part of a tire, and an equivalent weight ratio of rotary part of the engine, respectively.

Weight and gradient resistance RS is determined by subjecting a value RS0 to filtering processing, the value RS0 being calculated in accordance with the arithmetic formula RS0=FE−RA−RL−RR which includes, as variables, the driving force FE of the engine, acceleration resistance RA, air resistance RL, and rolling resistance RR. The parameter RS0 has a value of "0," if a range other than the "D," "3," or "2" range is established, or if the vehicle speed V is equal to or lower than a predetermined vehicle speed. Further, the parameter RS0 has a value which is the same as a preceding value, if calculation timing of RS0 is reached during the speed change or immediately after the speed change or immediately after the brake switch BS being changed from a value of "1" to a value of "0," or if the brake switch BS has a value of "1." Arithmetic formulae for air resistance RL and rolling resistance RR are given as shown below.

$$RL=(\tfrac{1}{2})\cdot\rho\cdot S\cdot CD\cdot(N0\cdot 2\pi r/iF\cdot 60)2$$

$$RR=\mu R\cdot W+\{WF/2\cdot GY)2/CPF\}\cdot 2+\{(WR/2\cdot GY)2/CPR\}\cdot 2$$

where ρ, S and CD represent an air density, a front projection area, and an air resistance coefficient, respectively. Symbols μR, WF, WR, CPF, and CPR represent a rolling resistance coefficient, vehicle weight on the front wheel side, vehicle weight on the rear wheel side, cornering power on the front wheel side, and cornering power on the rear wheel side, respectively.

Figure 16:
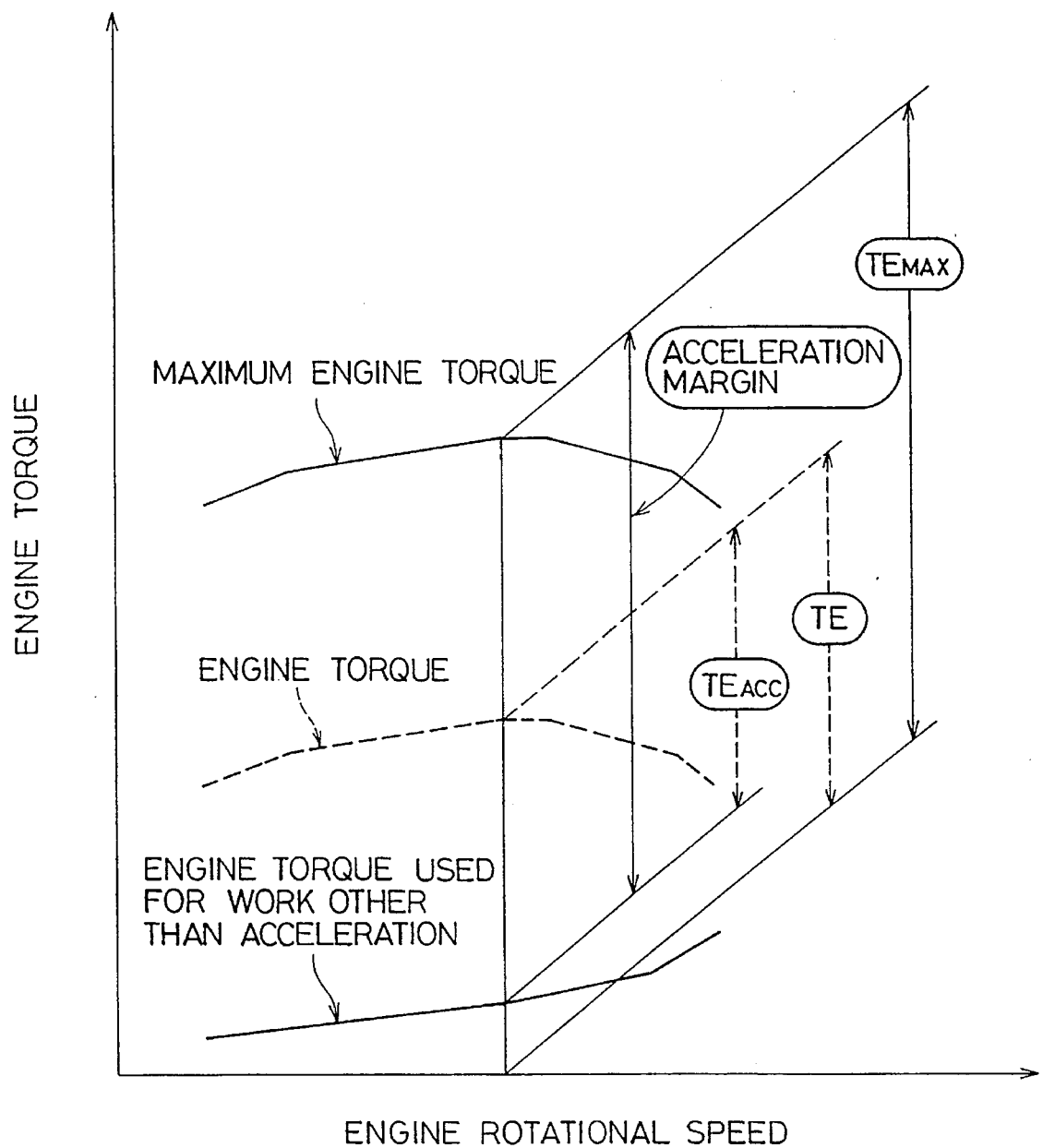
FIG. 16 is a graph showing engine torque, maximum engine torque, and acceleration torque respectively calculated in the main routine shown in FIG. 15.

Further, acceleration torque TEACC and margin KACC for acceleration are calculated in accordance with the following arithmetic formulae (see, FIG. 16).

$$TEACC=RA\cdot r/(iT\cdot iF\cdot\eta\cdot t)$$

$$KACC=(TEMAX-TE+TEACC)/TEMAX$$

The neural network inputs X1 through X4 are calculated in accordance with the formulae $X1=\{RS\cdot r/(iTD\cdot iF\cdot\eta)\}/KN1$, $X2=GXBG/KN2$, $X3=ST/KN3$, and $X4=N0\cdot iTD/KN4$. In the formulae, iTD is a speed change ratio after mode shift (after downshift), and is determined in accordance with a combination of the running mode and the below-mentioned commanded gearshift position SHIFT0.

In the present embodiment in which the mode A wherein the vehicle runs on flat roads or ascending roads, the mode C wherein the vehicle runs on gentle descending roads, and the mode D wherein the vehicle runs on steep descending roads are provided, the speed change ratio iTD after mode shift is set to the speed change ratio iT2 associated with the gearshift position for the second speed with respect to a combination of the mode A and the commanded gearshift position "2," a combination of the mode C and the commanded gearshift position "3," and a combination of the mode D and the commanded gearshift position "2." With respect to a combination of the mode A and the commanded gearshift position "3" or "4," the speed change ratio iTD after mode shift is set to the speed change ratio iT3 associated with the gearshift position for the third speed.

The input parameter calculation section 111 further calculates a braking deceleration switch BGSP, a large braking deceleration switch BGSB, a non-negative gradient resistance switch FSRSP, three moderate throttle opening switches FSTh45, FSTh34, FSTh23, a mode B fulfillment switch MSWB, a mode C fulfillment switch MSWC and the like, as input switches which are pieces of flag information used for calculations in various sections of the control unit 11.

The switch BGSP has a value of "1" when the brake switch BS is turned on and the longitudinal acceleration GX is negative, and has a value of "0" in other cases. The switch BGSB has a value of "1" when the brake switch BS is turned on and the longitudinal acceleration GX is smaller than a predetermined negative value, and has a value of "0" in other cases.

The switch FSRSP has a value of "1" when a state where the weight and gradient resistance RS is larger than a predetermined negative value continues over a predetermined time period, and has a value of "0" in other cases.

The switch FSTh45, FSTh34 or FSTh23 has a value of "1" when a state where the throttle opening sensor output is larger than a first, second or third predetermined value continues over a predetermined time period, otherwise has a value of "0." The second predetermined value is smaller than the first predetermined value, and the third predetermined value is smaller than the second predetermined value.

The switch MSWB or MSWC is changed from a value of "0" to a value of "1" when a predetermined time period has elapsed from the time when the mode B or C was established, and is changed from a value of "1" to a value of "0" when the mode B or C is released.

Sporty Degree Determination Section

Figure 17:
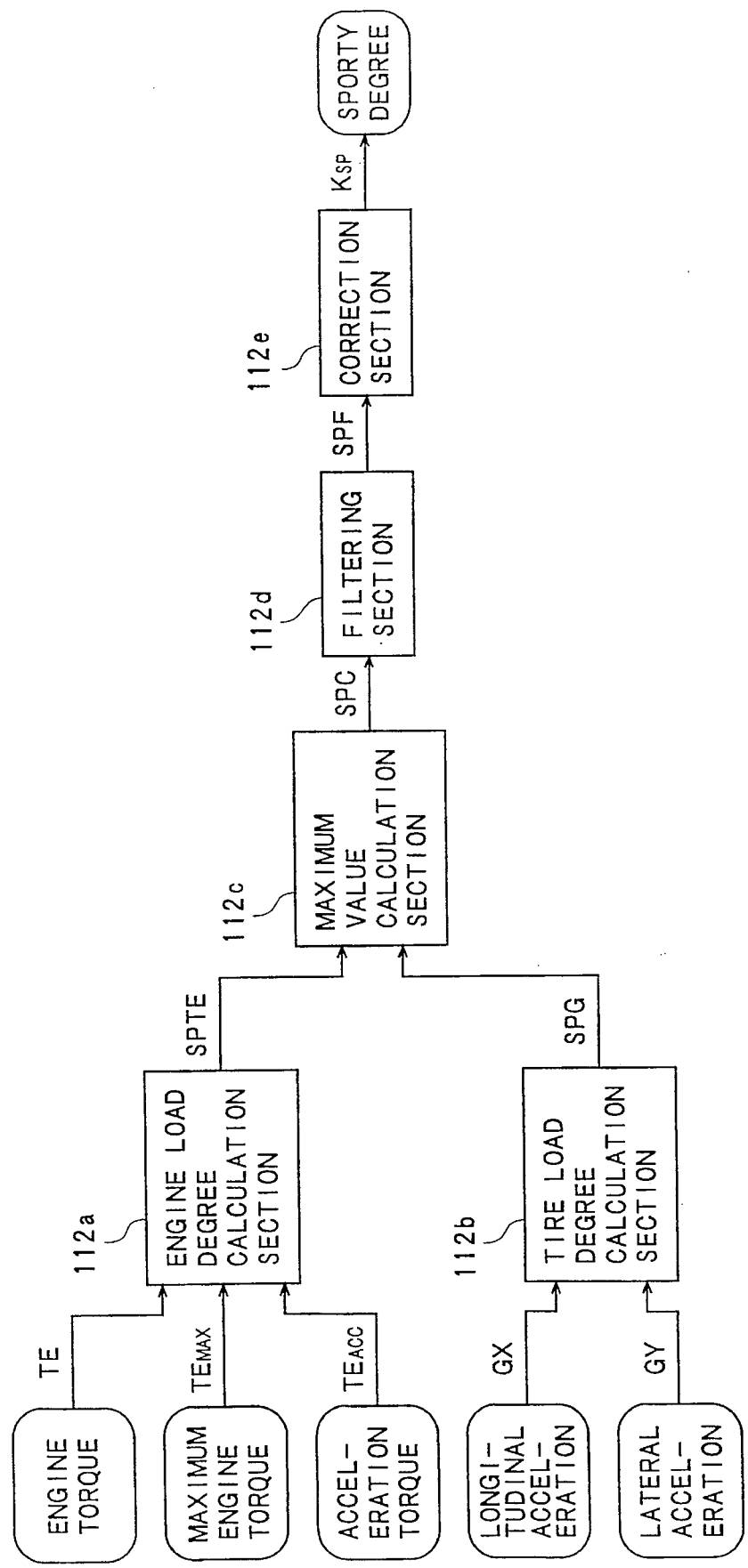
FIG. 17 is a block diagram showing in detail a sporty degree determination section shown in FIG. 14.

The sporty degree determination section 112 is operable to detect a degree (sporty degree) to which the so-called sporty driving is conducted by a driver. More generally, this section detects an driving characteristic of the driver. As the sporty degree becomes higher, the engine is operated in a higher output region, and the tires are employed in a region closer to their critical limit. Thus, as shown in FIG. 17, the sporty degree determination section 112, serving as a driving characteristic detection section, includes an engine load degree calculation section 112a for calculating a degree to which load is applied to the engine 1, and a tire load degree calculation section 112b for calculating a degree to which load is applied to the tires, not shown.

The engine load degree calculation section 112a determines the engine load degree SPTE in accordance with the formula SPTE=TEACC/(TEMAX−TE+TEACC), by using the engine torque TE, the maximum engine torque TEMAX, and the acceleration torque TEACC respectively calculated by the parameter calculation section 111. In the meantime, SPTE is set to a value of "1" if the calculated value of SPTE is equal to or smaller than "0," and is set to a value of "1" if the calculated value of SPTE is equal to or larger than "1." The engine load degree obtained in this manner represents a ratio of the currently used running torque to the maximum torque which is usable from the viewpoint of engine performance. This ratio indicates the degree to which the driver uses the engine performance.

The tire load degree calculation section 112b calculates the tire load degree SPG in accordance with the formula SPG=(GX2+GY2)½/GMAX by using the longitudinal acceleration GX and the lateral acceleration GY calculated by the parameter calculation section 111. In the formula, symbol GMAX represents tire grip limit acceleration. The tire load degree SPG represents a ratio of a horizontal force acting on a tire to the maximum grip force of the tire. This ratio indicates a degree to which the driver uses the grip performance of the tire, or a degree to which the driver conducts sporty driving.

The sporty degree determination section 112 further includes a maximum value calculation section 112c for selecting a larger one SPC (=MAX{SPTE(i), SPG(i)} of the engine load degree SPTE and the tire load degree SPG, and a filtering section 112d for filtering an output SPC of the calculation section 112c in accordance with the formula SPF=SPF(i−1)+KFS·{SPC−SPF(i−1)}. In the formula, symbol SPF(i−1) denotes a filtering section output in the preceding cycle, and KFS denotes a filter constant.

Figure 18:
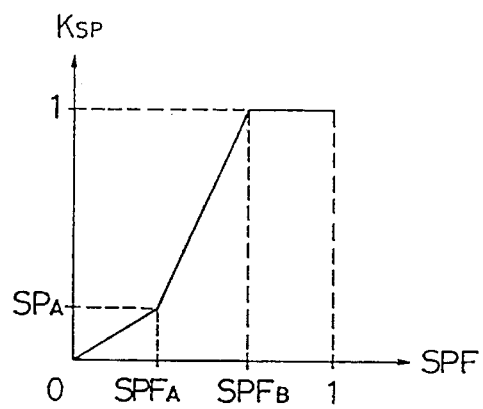
FIG. 18 is a graph showing a sporty degree $K_{SP}$ determined by the sporty degree determination section as a function of a filtering section output SPE of the determination section.

The correction section 112e, which receives the output SPF of the filtering section 112d, determines the sporty degree KSP in accordance with the formula KSP=SPA·SPF/ SPFA if the filtering section output SPF is equal to or smaller than a correction coefficient SPFA, and calculates a sporty degree KSP in accordance with the formula KSP=SPA+(1− SPA)·(SPF−SPFA)/(SPFB−SPFA) if the output SPF is larger than the correction coefficient SPFA (see, FIG. 18). Symbol SPFB represents a correction coefficient.

Figure 15:
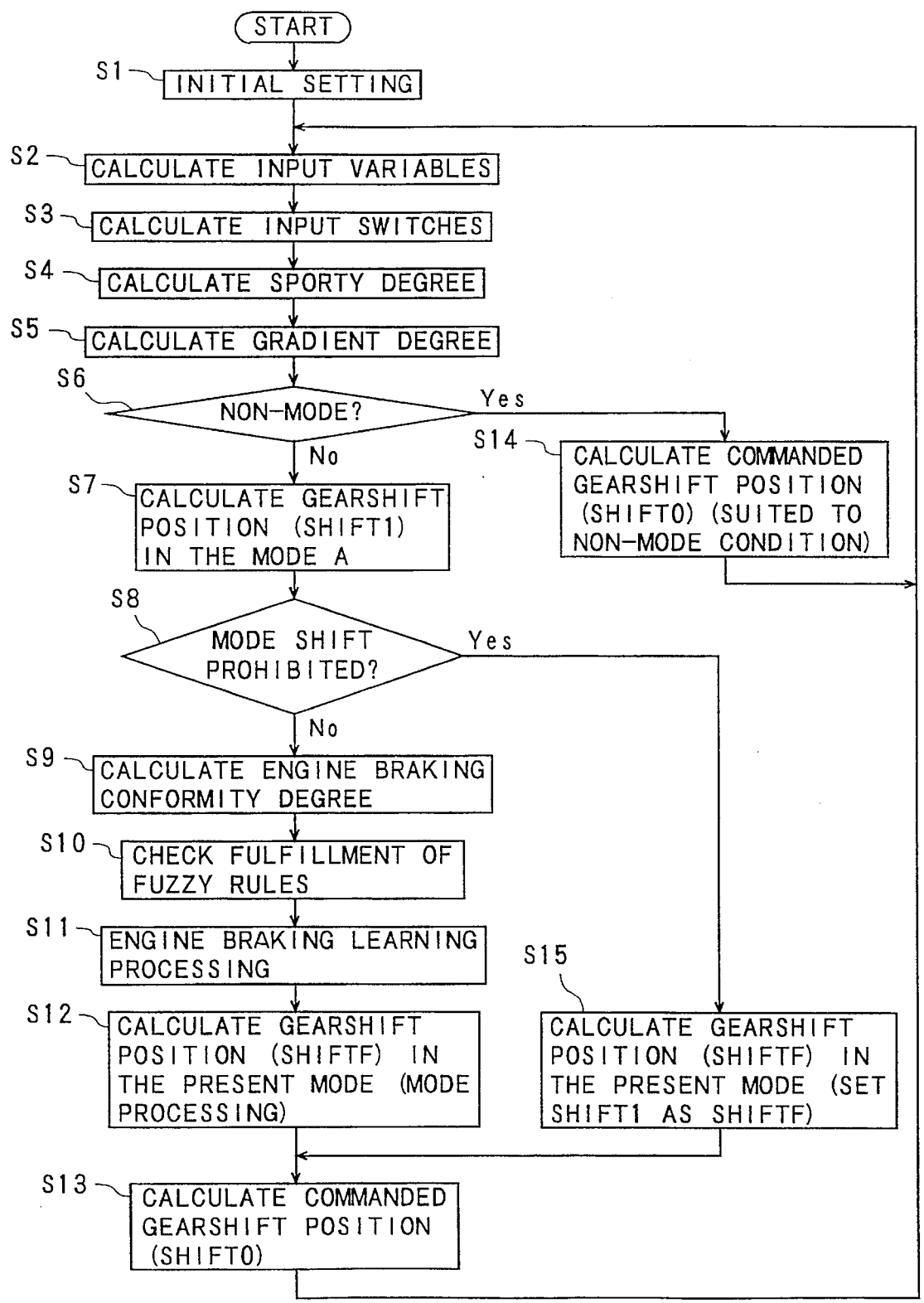
FIG. 15 is a flowchart of a main routine for speed change control executed by the electronic control unit shown in FIGS. 13 and 14.
Figure 19:
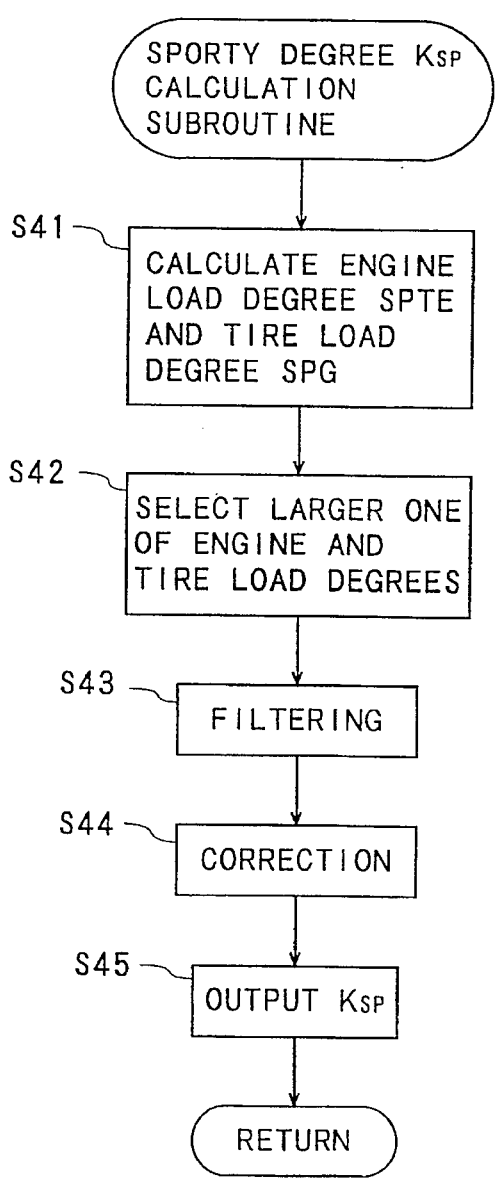
FIG. 19 is a flowchart of a sporty degree calculation subroutine carried out by the electronic control section serving as the sporty degree determination section.

More specifically, at step S4 of the main routine shown in FIG. 15, the electronic control unit 11 serving as the sporty degree determination section 112 executes a sporty degree calculation subroutine shown in FIG. 19. In this subroutine, the control unit 11 calculates the engine load degree SPTE and the tire load degree SPG in the aforementioned manner (step S41), selects a larger one of these calculated values (step S42), and subjects the resultant output SPC to filtering (step S43).

Figure 20:
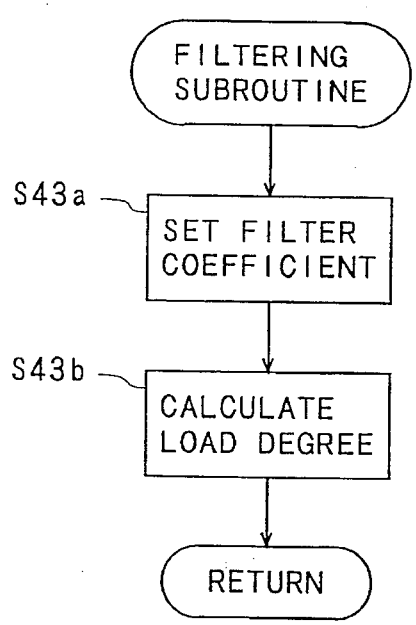
FIG. 20 is a flowchart of a filtering subroutine forming part of the sporty degree calculation subroutine shown in FIG. 19.
Figure 21:
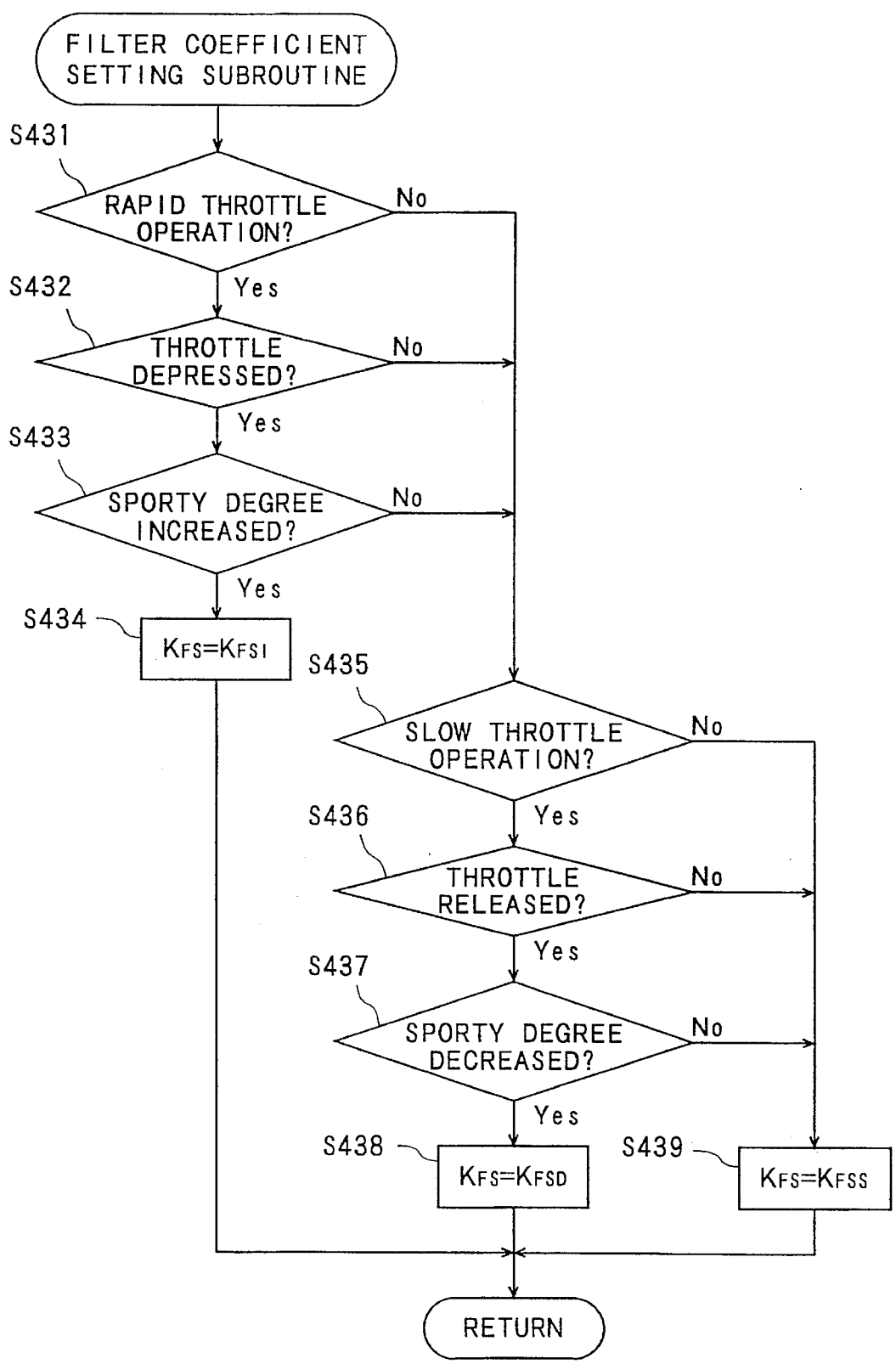
FIG. 21 is a flowchart of a filter coefficient setting subroutine forming the filtering subroutine shown in FIG. 20.

As shown in FIG. 20, this filtering process is comprised of a process for setting a filter coefficient (step S43a), and a process for calculating a load degree filter SPF as an output of the filtering section 112d (step S43b).

In the filter coefficient setting process, the electronic control unit 11 determines whether a value of a rapid throttle operation switch TSWS calculated at step S3 of the main routine is "1" or not, to thereby determine whether or not a rapid throttle operation is conducted (step S431). If the result of this determination is affirmative, the control unit further determines whether a value of a throttle depression switch TSWF calculated at step S3 of the main routine is "1" or not, to thereby determine whether or not the throttle (accelerator pedal) is depressed (step S432). If the result of this determination is affirmative, a determination is made as to whether or not the output SPC obtained at step S42 shown in FIG. 19 is larger than the filtering section output SPF(i−1) in the preceding cycle, to thereby determine whether or not the sporty degree increases (step S433). If the result of this determination is affirmative, the sporty degree filter coefficient KFS is set to a predetermined value KFSI (step S434), whereupon the filter coefficient setting subroutine is completed.

On the other hand, any one of the determination results at steps S431, S432 and S433 is negative, a determination is made as to whether the value of the rapid throttle operation switch TSWS is "0" or not, to thereby determine whether or not a slow throttle operation is conducted (step S435). If the result of this determination is affirmative, whether or not the throttle depression switch TSWF has a value of "0" is further determined to thereby determine whether or not the throttle is released (step S436). If the result of this determination is affirmative, a determination is made as to whether or not the output SPC obtained at step S42 is smaller than the filtering section output SPF(i−1) in the preceding cycle, to determine whether or not the sporty degree decreases (step S437). If the result of this determination is affirmative, the sporty degree filter coefficient KFS is set to a predetermined value KFSD (step S438), and then the filter coefficient setting subroutine is completed.

If any one of the results of determinations at steps S435, S436 and S437 is negative, the sporty degree filter coefficient KFS is set to a predetermined value KFSS (step S439), and the filter coefficient setting subroutine is completed.

The predetermined values KFSD, KFSI, and KFSS of the sporty degree filter coefficient are set beforehand such that the relationship KFDS>KFSI>KFSS is fulfilled. Although the filter coefficient KFS normally has a relatively small value KFSS, the filter coefficient KFS, serving as a sporty degree increasing filter coefficient, is switched to the value KFSI which is larger than the value KFSS, at step S434, when the throttle is depressed rapidly. Thus, the filtering section output SPF increases rapidly when sporty driving is conducted. On the other hand, when the throttle is released slowly, the filter coefficient KFS, serving as a sporty degree decreasing filter coefficient, is switched to the value KFSD larger than the value KFSS. Therefore, the filtering section output SPF decreases rapidly when mild driving is conducted.

The reason why the filter coefficient is variably set in accordance with the throttle operation in the above manner resides in that using the filter coefficient of a fixed value makes it difficult to appropriately set the degree of filtering. That is, if the degree of filtering is too weak, the sporty degree can vary even if the vehicle driving is conducted in a constant manner. On the other hand, if the degree of filtering is too strong, a change of the sporty degree to a change of driving manner, varying between the sporty driving and the mild driving, can be delayed. According to the present embodiment in which the filter coefficient is variably set, a shift pattern is moved toward the higher speed side at an increased movement speed, by means of the below-mentioned shift pattern movement effected in dependence on the sporty degree, when a rapid change of the engine load is detected. Further, the shift pattern is moved toward the lower speed side at a movement speed, which is higher than the movement speed for movement toward the higher speed side, when a gradual change of the engine load is detected. As a result, the response in the gear-changing for speed change is improved. In addition, an unnecessary shift pattern movement is prevented during vehicle running accompanied with an ordinary degree of acceleration and deceleration.

Engine Braking Necessity Degree Determination Section

Figure 22:
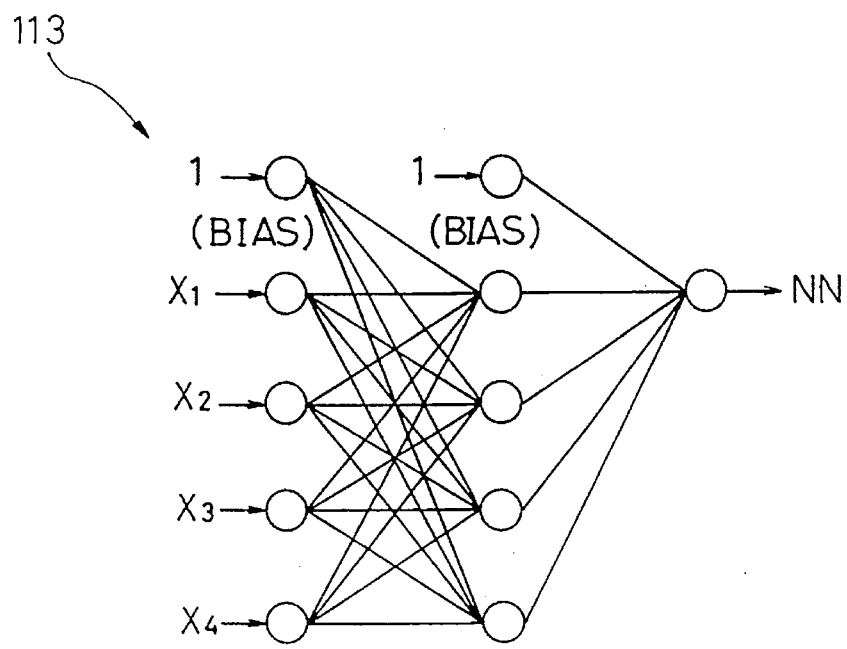
FIG. 22 is a schematic view showing a neural network which forms an engine brake necessity degree detection section shown in FIG. 14.

As shown in FIG. 22, the engine braking necessity degree determination section 113 is comprised of a stacked neural network. That is, the neural network is comprised of an input layer (first layer) having four cells to which the neural network inputs X1 through X4 from the parameter calculation ection 111 are applied, respectively, and having a bias cell for receiving an input of "1"; an intermediate layer (second layer) having a suitable number of cells, i.e., four cells, and having a bias cell; and an output layer (third layer) having one cell for outputting an engine braking conformity degree NN.

In the following explanation, symbols OPij, IPij, and IPSij represent an output from the j'th cell in the i'th layer, a total input at the j'th cell in the i'th layer, and a sigmoid input/total input at the j'th cell in the i'th layer, respectively. Also, symbols Wij0 and Wijk denote a threshold value for the cell input at the j'th cell in the i'th layer, and a coupling weight between the j'th cell in the i'th layer and the k'th cell in the (i−1)'th layer, respectively (see, FIG. 23). The coupling weights are set beforehand by means of learning based on conventionally known back propagation method.

In the neural network, the neural network inputs Xj (j=1 through 4) are set as respective cell outputs OPij in the first layer, and the total input IPij at each of the cells in the next layer is calculated in accordance with the formula IPij= Wij0+Σ(Wijk·OP(i−1)k) with respect to k which varies from "1" to "n(i−1)." Here, n(i−1) denotes the number of the cells in the (i−1)'th layer. Then, the sigmoid input IPSij (=IPij) equal to the total cell input IPij is converted by a sigmoid function f, to thereby obtain each cell output OPij. Whereupon, the above procedure is sequentially conducted up to the cell in the output layer, to thereby determine the cell output OP31 in the output layer, the thus determined cell output being set as the engine braking conformity degree NN (=OP31).

As mentioned above, the engine braking conformity degree NN indicative of the degree of necessity of engine braking is synthetically determined by the neural network from the four inputs X1 through X4 respectively associated with gradient, braking acceleration, steering handle angle, and vehicle speed which are variables indicative of the vehicle running condition. Then, a shift pattern selection is performed appropriately in various vehicle running conditions by means of the below-mentioned shift pattern selection effected in accordance with the engine braking conformity degree NN, to thereby achieve a function of carrying out a downshift for exercising appropriate engine braking when the vehicle runs on a descending road.

Since whether or not engine braking is required is determined on the basis of the neural network inputs obtained at the present time, the response to the running condition and the accuracy of determination can be improved, as compared with a case where such a determination is made based on a running condition history obtained before the present time.

Shift Pattern Selection Section

The mode determination and processing section 114f of the shift pattern selection section 114 determines whether or not each of five fuzzy rules comprised of first through fourth rules and a sixth rule is fulfilled. The fulfillment of each of the rules is determined when all of the three or four determination conditions for each rule are satisfied. In other words, the fulfillment of the fuzzy rules is checked by using crisp functions.

[First Rule] If FSRSP=0, NN≧EB43, VTH≦VTHS, and V≦VB43, then the mode C is entered.

[Second Rule] If FSRSP=0, NN≧EB32, VTH≦VTHS, and V≦VB32, then the mode D is entered.

[Third Rule] If SHIFT1>2, FSTh23=1, VTH<VTHB, and GY≦GYS, then the mode D is released.

[Fourth Rule] If SHIFT1>3, FSTh34=1, VTH<VTHB, and GY≦GYS, then the mode C is released.

[Sixth Rule] If FSRSP=1, VTH>VTHS, and GY≦GYS, then the modes C and D are released.

In the rules, EB43 and EB32 each denote an engine braking conformity degree threshold value, and VTHS and VTHB each denote a throttle opening threshold value, VB43 and VB32 each denote a vehicle speed threshold value, and GYS denotes a lateral acceleration threshold value.

In order to determine a running mode and a gearshift position SHIFTF in the present mode, the electronic control unit 11 serving as the mode determination and processing section 114f carries out mode processing at step S12 of the main routine shown in FIG. 15.

Figure 24:
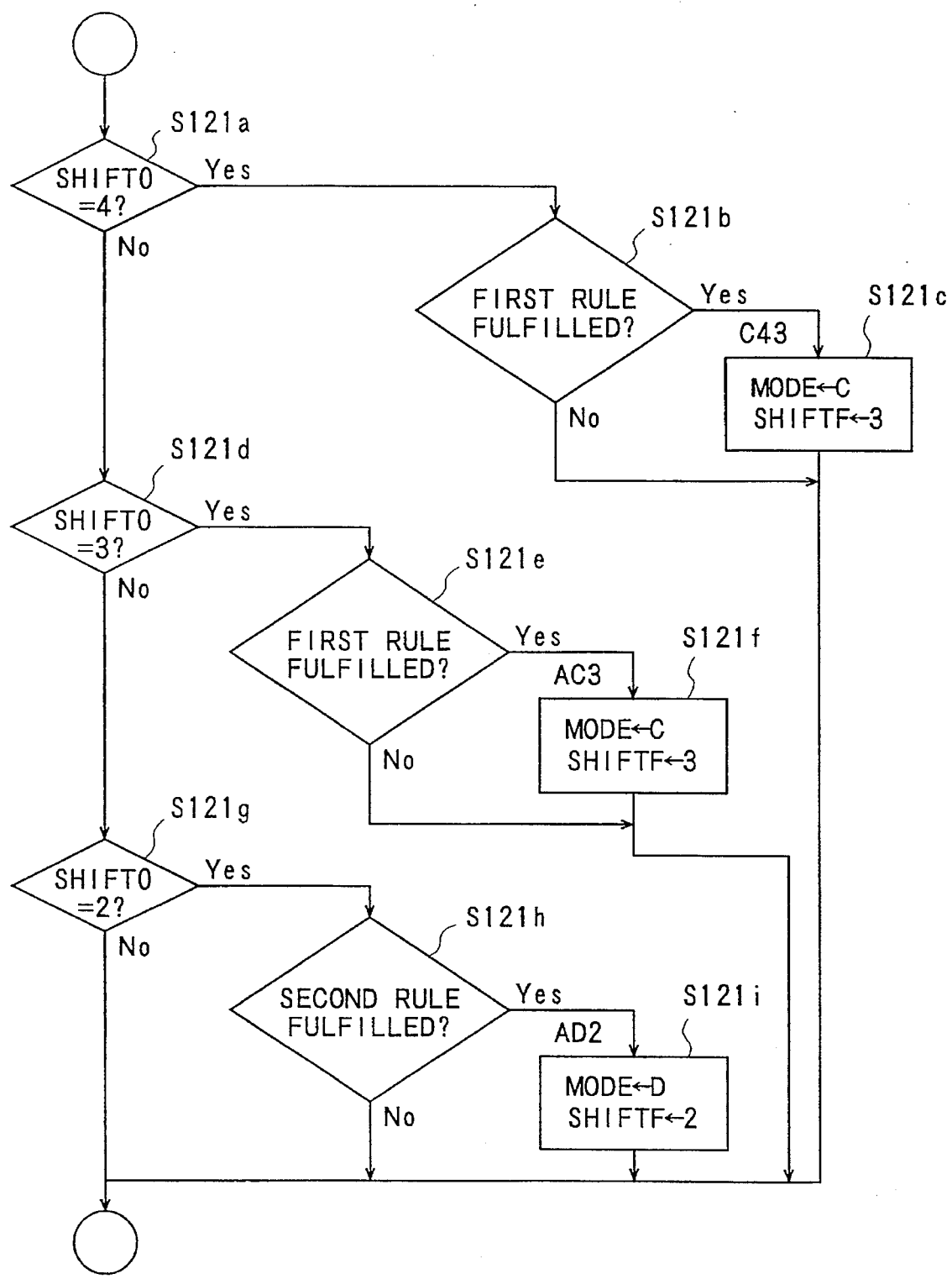
FIG. 24 is a flowchart of part of mode processing carried out by the electronic control section serving as a mode determination and processing section.

More specifically, the electronic control unit 11 executes a subroutine shown in FIG. 24 when the present mode is the mode A. In this subroutine, a determination is made as to whether or not the present commanded gearshift position SHIFT0 is the fourth gearshift position (step S121a), and, if the result of this determination is affirmative, whether the aforementioned first rule is fulfilled or not is further determined (step S121b). If the result of this determination is affirmative, the mode C is set as the running mode, and the third gearshift position is set as the gearshift position SHIFTF in the present mode (step S121c). On the other hand, if the result of determination at step S121b is negative, this subroutine is completed.

If the result of determination at step S121a is negative, a determination is made as to whether or not the commanded gearshift position SHIFT0 is the third gearshift position (step S121d), and, if the result of this determination is affirmative, whether or not the first rule is fulfilled is further determined (step S121e). Moreover, if the result of this determination is affirmative, the mode C is set as the running mode, and the third gearshift position is set as the gearshift position SHIFTF in the present mode (step S121f). On the other hand, if the result of the determination at step S121b is negative, the subroutine is finished.

If the result of the determination at step S121d is negative, whether or not the commanded gearshift position SHIFT0 is the second gearshift position is determined (step S121g). If the result of this determination is affirmative, whether or not the second rule is fulfilled is further determined (step S121h). If the result of this determination is affirmative, the mode D is set as the running mode and the second gearshift position is set as the shift position SHIFTF in the present mode (step S121i). On the other hand, if the result of the determination at step S121h is negative, the subroutine is finished.

Figure 25:
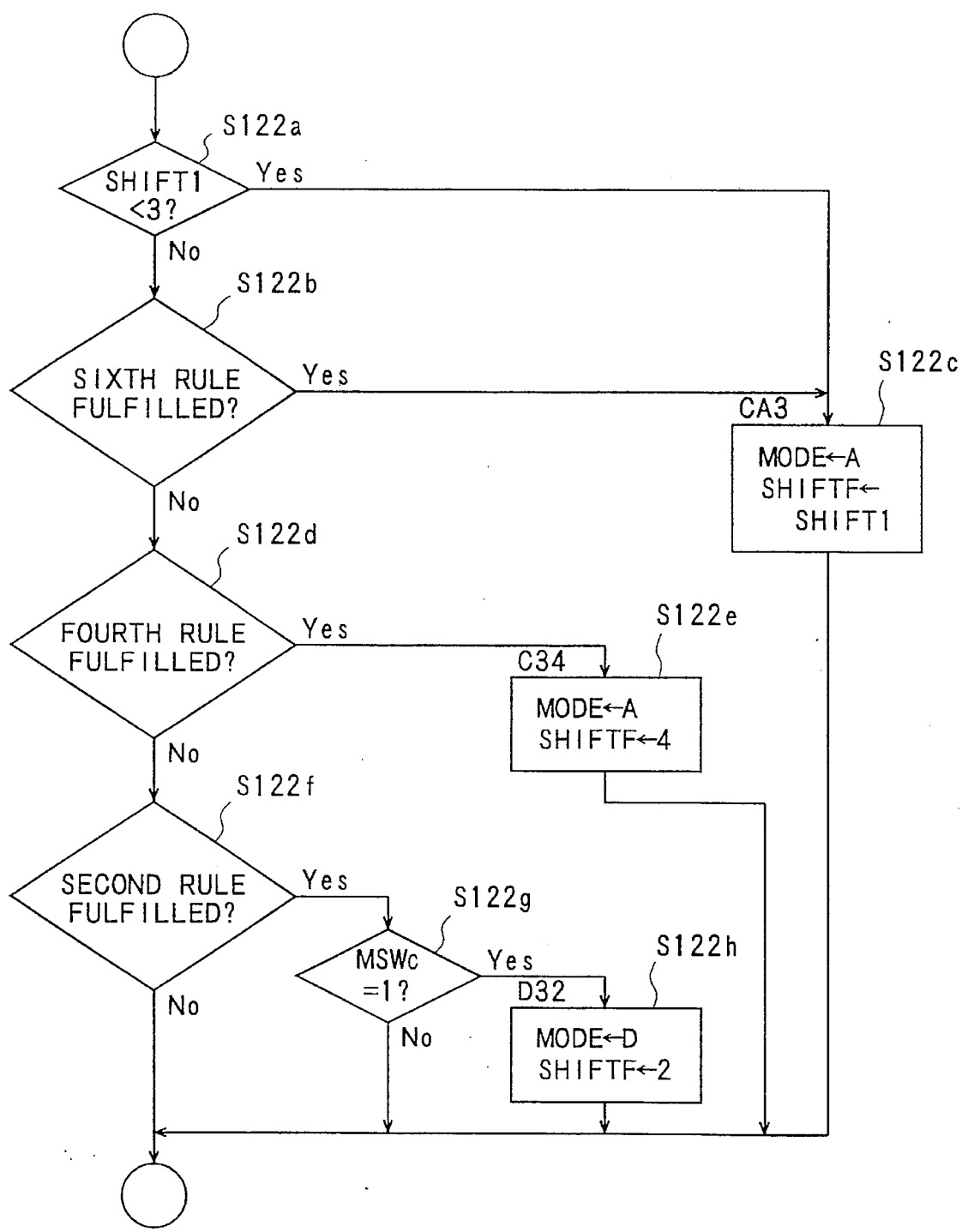
FIG. 25 is a flowchart showing another part of the mode processing.

When the present mode is the mode C, a subroutine shown in FIG. 25 is carried out. In this subroutine, whether or not the gearshift position SHIFT1 in the mode A is a gearshift position lower than the third gearshift position is determined (step S122a). If the result of the determination is negative, whether or not the sixth rule is fulfilled is determined (step S122b). Next, if the result of this determination or the result of the determination at step S122a is affirmative, the mode A is set as the running mode and the gearshift position SHIFT1 in the mode A is set as the gearshift position SHIFTF in the present mode (step S122c).

On the other hand, if the result of the determination at step S122b is negative, whether or not the fourth rule is fulfilled is determined (step S122d). If the result of this determination is affirmative, the mode A is set as the running mode and the fourth gearshift position is set as the gearshift position SHIFTF in the present mode (step S122e).

If the result of the determination at step S122d is negative, whether or not the second rule is fulfilled is determined (step S122f). If the result of this determination is affirmative, whether or not the mode C fulfillment switch MSWC obtained at step S3 in the main routine has a value of "1" is further determined (step S122g). If the result of this determination is affirmative, the mode D is set as the running mode and the second gearshift position is set as the gearshift position SHIFTF in the present mode (step S122h). On the other hand, if the either one of the results of the determinations at steps S122f and S122g is negative, the subroutine is finished.

Figure 26:
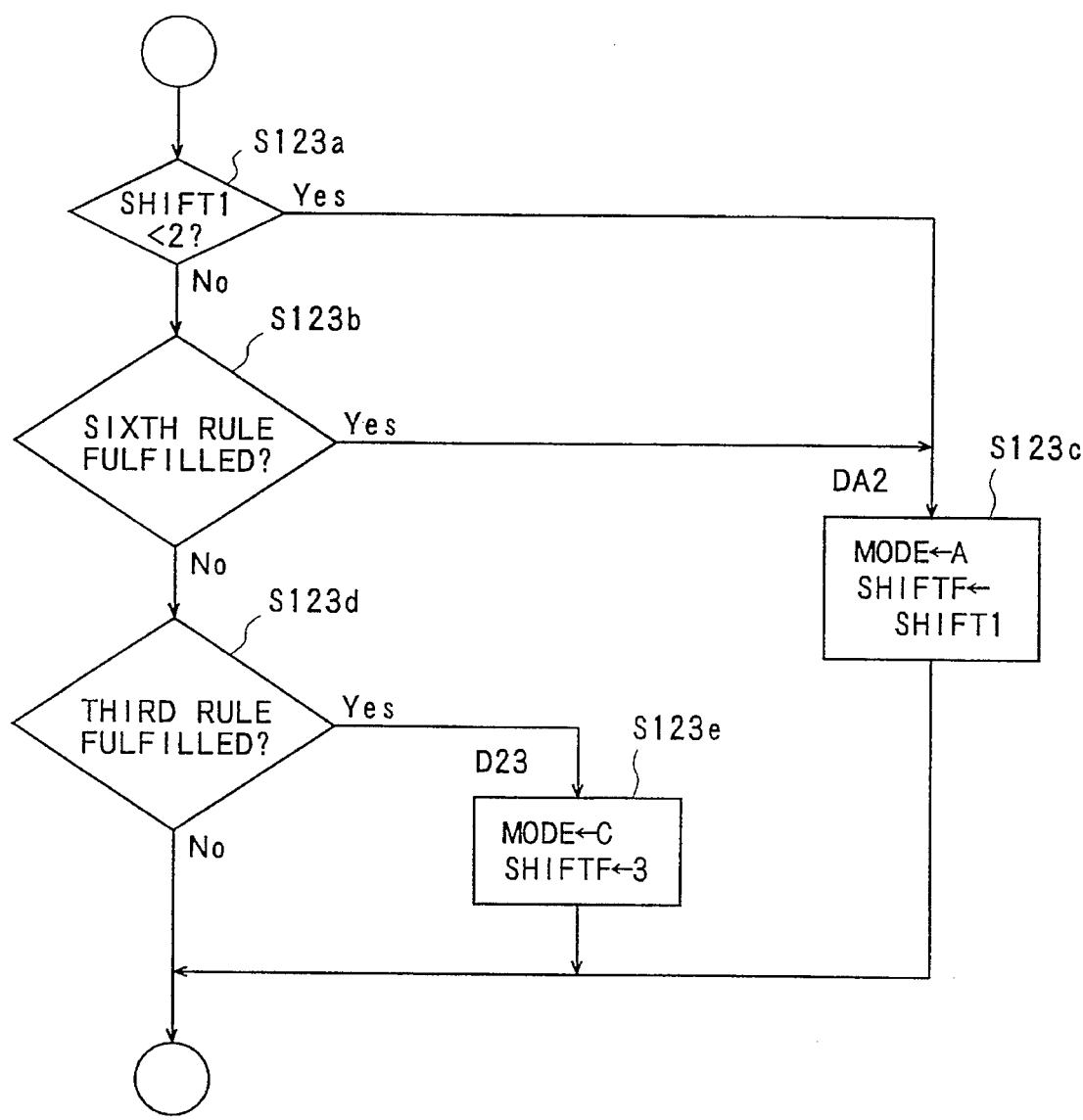
FIG. 26 is a flowchart showing a still another part of the mode processing.

When the present mode is the mode D, a subroutine shown in FIG. 26 is carried out. In this subroutine, whether or not the gearshift position SHIFT1 in the mode A is a gearshift position lower than the second gearshift position is determined (step S123a). If the result of this determination is negative, whether or not the sixth rule is fulfilled is determined (step S123b). If the result of this determination or the result of the determination at step S123a is affirmative, the mode A is set as the running mode and the gearshift position SHIFT1 in the mode A is set as the gearshift position SHIFTF in the present mode (step S123c).

On the other hand, if the result of the determination at step S123b is negative, whether or not the third rule is fulfilled is determined (step S123d). If the result of this determination is affirmative, the mode C is set as the running mode and the third gearshift position is set as the gearshift position SHIFTF in the present mode (step S123e).

If the result of the determination at step S123d is negative, the subroutine is finished.

Figure 27:
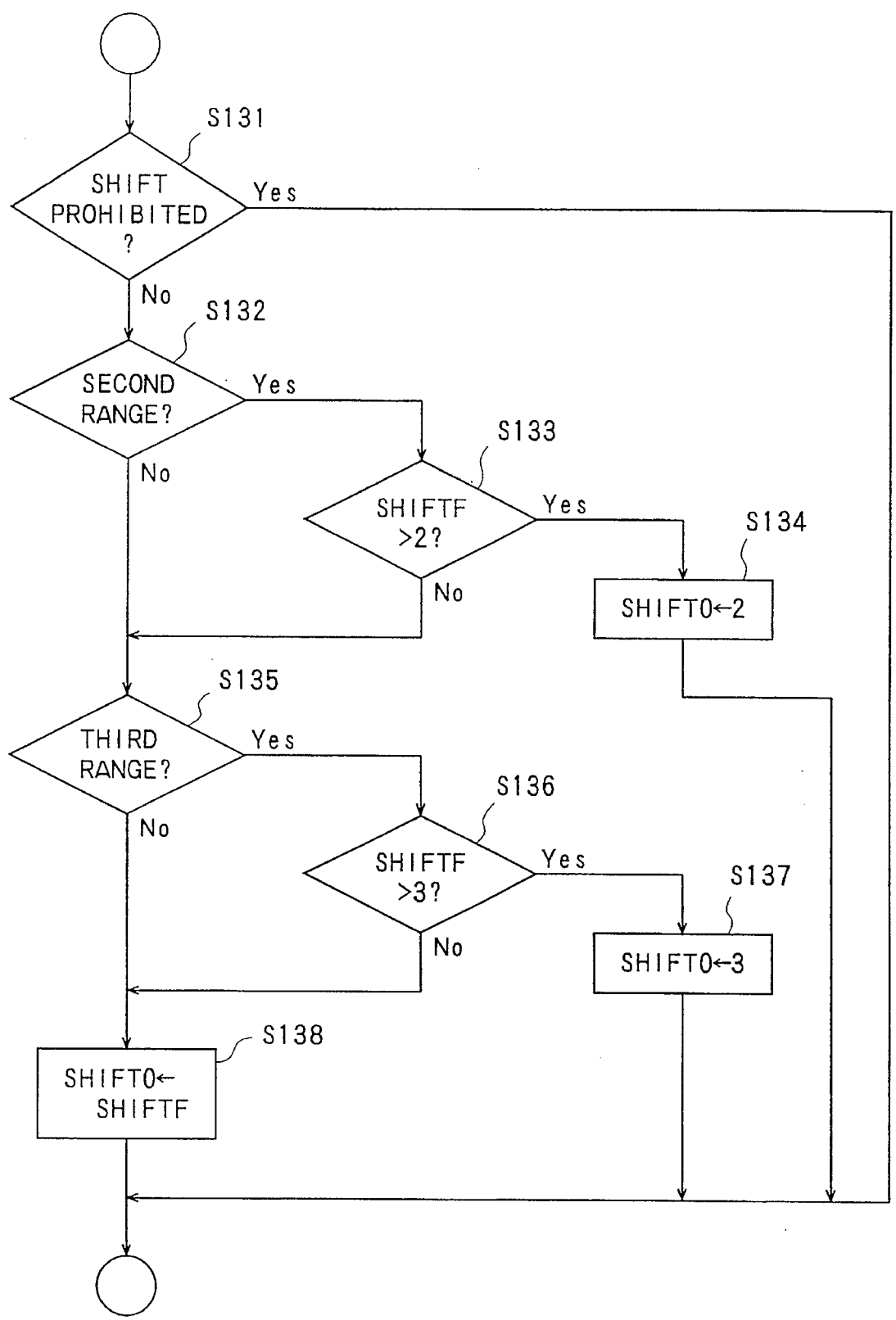
FIG. 27 is a flowchart of a commanded gearshift position determination subroutine carried out by the mode determination and processing section.

To determine the commanded gearshift position SHIFT0, the electronic control unit 11 serving as the mode determination and processing section 114f carries out a subroutine shown in FIG. 27. In this subroutine, whether or not a shift prohibition command is delivered from the controller (not shown) for traction control is first determined, to thereby determine whether or not gear-changing for speed change is prohibited (step S131). If the result of this determination is affirmative, the subroutine is finished. In this case, the commanded gearshift position SHIFT0 is maintained to that obtained in the preceding cycle.

On the other hand, if the result of the determination at step S131 is negative, whether or not the select lever is in the "2nd" range is determined based on an output of the inhibitor switch 27 indicative of the changeover position of the select lever (step S132). If the result of the determination is affirmative, whether or not the gearshift position SHIFT1 in the mode A obtained at step S7 in the main routine is higher than the second gearshift position is further determined (step S133). Further, if the result of this determination is affirmative, the second gearshift position is set as the commanded gearshift position SHIFT0 (step S134).

If the result of the determination at step S132 is negative, whether or not the select lever is in the "3rd" range is determined (step S135). If the result of this determination is affirmative, whether or not the gearshift position SHIFT1 in the mode A is higher than the third gearshift position is further determined (step S136). If the result of this determination is affirmative, the third gearshift position is set as the commanded gearshift position SHIFT0 (step S137).

If either one of the results of the determinations at steps S135 and S137 is negative, the gearshift position SHIFTF in the present mode obtained at step S12 in the main routine is set as the commanded gearshift position SHIFT0 (step S138).

Figure 28:
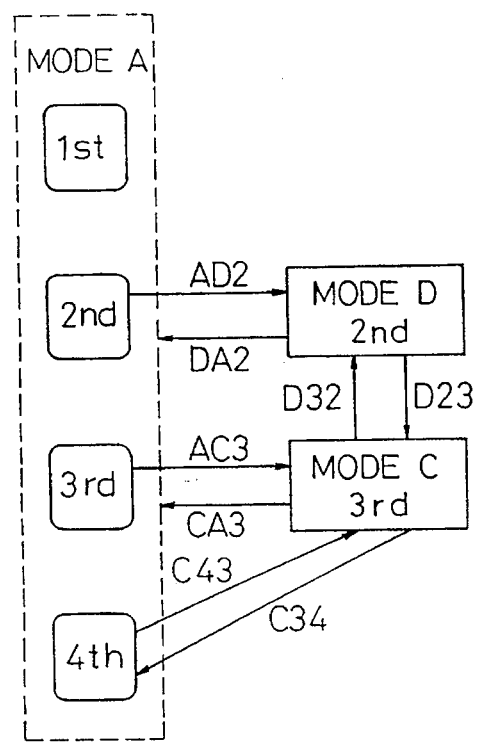
FIG. 28 is a schematic view showing mode shifts.

As a result of the mode processing shown in FIGS. 24 through 27 being conducted in the above manner, various mode shifts shown in FIG. 28 are carried out.

More specifically, when a gentle descending road is reached during the vehicle running with the fourth gearshift position, so that fulfillment of the aforementioned first rule is determined at step S121b shown in FIG. 24, the mode shift C43 is carried out at step S121c. As a result, a shift is made from the mode A to the mode C, and a shift is made from the fourth gearshift position to the third gearshift position. When a gentle descending road is reached during the vehicle running with the third gearshift position in the mode A, so that fulfillment of the first rule is determined at step S121e, the mode shift AC3 for making a shift from the mode A to the mode C while maintaining the third gearshift position unchanged is carried out (step S121f). Further, when a steep descending road is reached during the vehicle running with the second gearshift position in the mode A, so that fulfillment of the second rule is determined at step S121h, the mode shift AD2 for making a shift from the mode A to the mode D while maintaining the second gearshift position unchanged is carried out (step S121i).

On the other hand, if the driver attempts to make rapid acceleration during the vehicle running with the third gearshift position in the mode C, so that it is determined at step S122a in FIG. 25 that the commanded gearshift position SHIFT1 in the mode A is lower than the third gearshift position, or if a flat road is reached during the vehicle running with the third gearshift position in the mode C so that fulfillment of the sixth rule is determined at step S122b, then the mode shift CA3 for making a shift from the mode C to the mode A and for making a shift from the third gearshift position to the commanded gearshift position SHIFT1 in the mode A takes place (step S122c). Further, when the driver attempts to make gradual acceleration during the vehicle running with the third gearshift position in the mode C, so that fulfillment of the fourth rule is determined at step S122d, then the mode shift C34 for making a shift from the mode C to the mode A and for making a shift from the third gearshift position to the fourth gearshift position is conducted (step S122e). Moreover, if a steep descending road is reached during the vehicle running with the third gearshift position in the mode C, so that fulfillment of the second rule is determined at step S122f, the mode shift D32 for making a shift from the mode C to the mode D and for making a shift from the third gearshift position to the second gearshift position is carried out (step S122h).

Furthermore, when the drive attempts to make rapid acceleration during the vehicle running with the second gearshift position in the mode D, so that it is determined at step S123a of FIG. 26 that the commanded gearshift position SHIFT1 in the mode A is lower than the second gearshift position, or when a flat road is reached during the vehicle running with the second gearshift position in the mode D so that fulfillment of the sixth rule is determined at step S123b, the mode shift DA2 for making a shift from the mode D to the mode A and for making a shift from the second gearshift position to the commanded gearshift position SHIFT1 in the mode A is carried out (step S123c). When the driver attempts to make gradual acceleration during the vehicle running with the second gearshift position in the mode D, so that fulfillment of the third rule is determined at step S123d, the mode shift D23 for making a shift from the mode D to the mode C and for making a shift from the second gearshift position to the third gearshift position is carried out.

As apparent from the foregoing explanation, when the mode shift D32 or the mode shift C43 is caused, the mode determination and processing section 114f achieves a function of downshift necessity determination means for determining the necessity of a downshift.

A control output indicative of the commanded gearshift position determined by the shift pattern selection section 114 in the above manner is output to the shift command section 116 (FIG. 14). The shift command section 116 determines the necessity or unnecessariness of gear-changing for speed change on the basis of the commanded gearshift position and the current gearshift position detected by means of the gearshift position switch 28, and outputs a gearshift position changeover command to the hydraulic controller 6, if necessary.

Shift Pattern Setting Section

The shift pattern, which is referred to in the aforementioned mode determination and mode processing conducted by the mode determination and processing section 114f of the shift pattern selection section 114, is set by means of the shift pattern setting section 114b.

Figure 29:
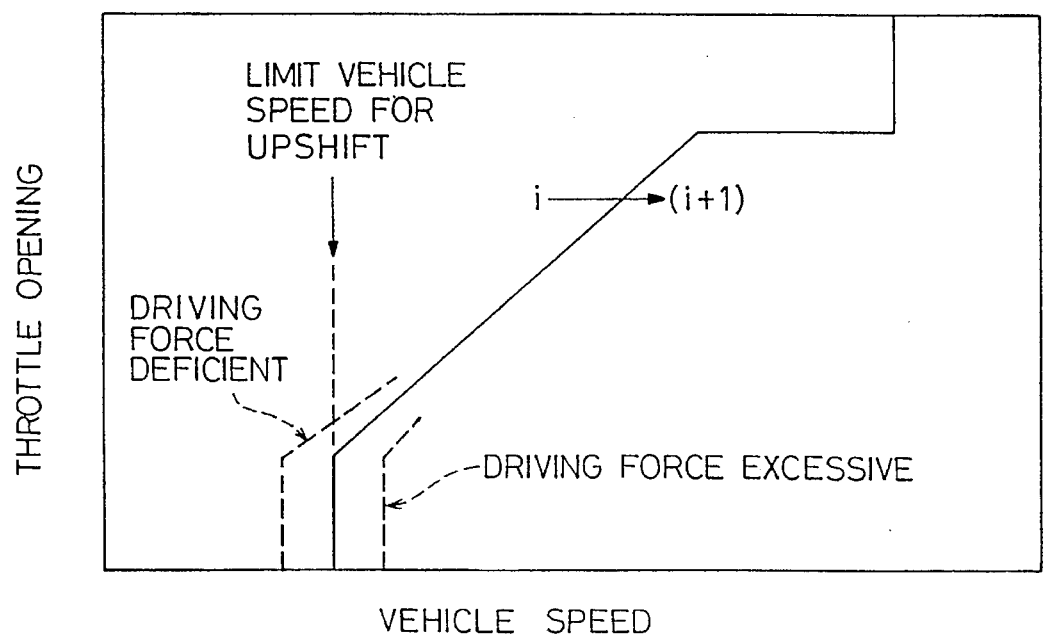
FIG. 29 is a graph for explaining a limit vehicle speed for upshift.

The setting section 114b includes a gradient degree determination section 114e for calculating a gradient degree KRSi, serving as a shift line movement coefficient, used in determining a vehicle speed limit for upshift (see, FIG. 29), by which a driving force having been produced during the vehicle running with the i'th gearshift position is ensured even if an upshift is made from the i'th (i=1, 2 or 3) gearshift position to the (i+1)'th gearshift position.

Figure 30:
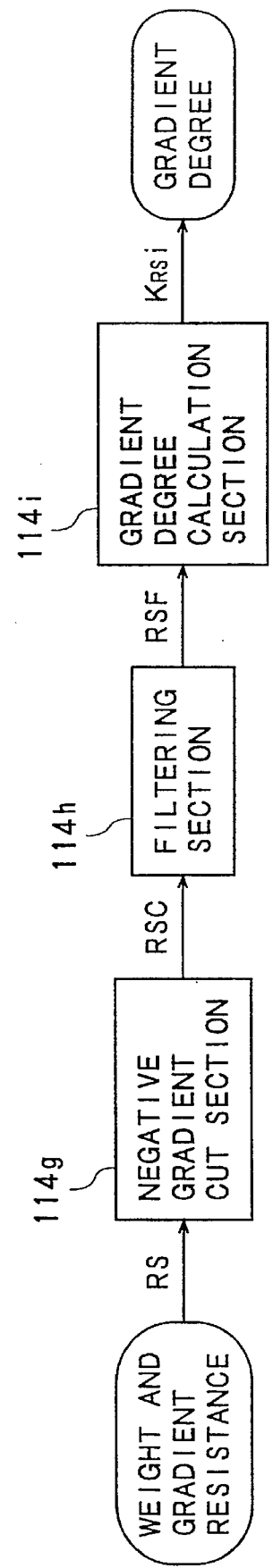
FIG. 30 is a block diagram showing in detail a gradient degree determination section shown in FIG. 14.

As shown in FIG. 30, the gradient degree determination section 114e includes a negative gradient cut section 114g for cutting weight and gradient resistance on flat roads or descending roads. The cut section 114g is operable to generate an output RSC of a value of "0" when the weight and gradient resistance RS received from the parameter calculation section 111 is equal to or smaller than a weight and gradient resistance threshold value RSS so that the weight and gradient resistance is small, and to generate an output RSC of a value of "RS" when the weight and gradient resistance RS is larger than the threshold value RS, so that the weight and gradient resistance is not small.

Figure 31:
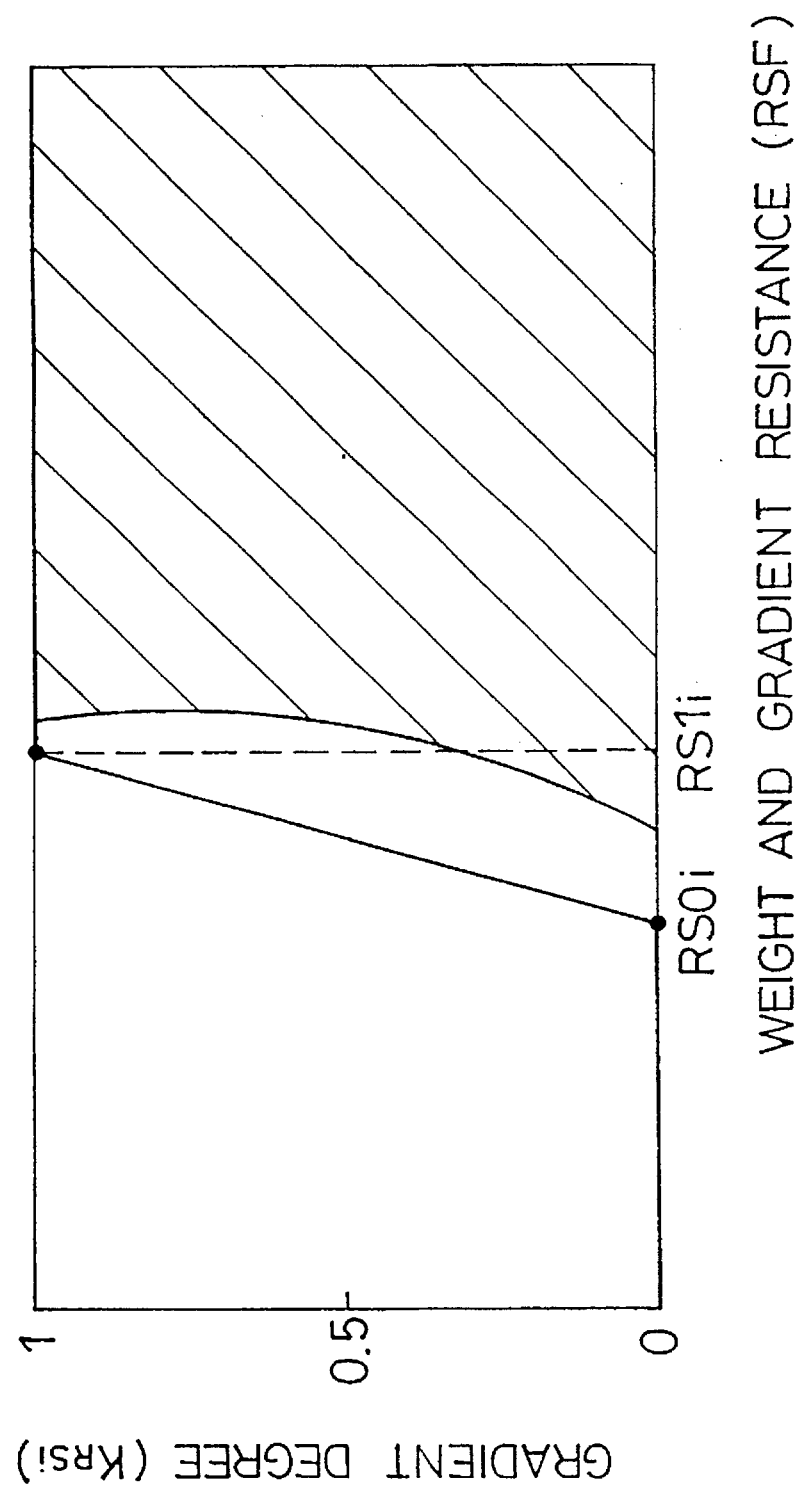
FIG. 31 is a graph showing a relationship between weight and gradient resistance and gradient degree.

The gradient degree determination section 114e further includes a filtering section 114h for filtering the negative gradient cut section output RSC in accordance with the formula RSF=RSF(i−1)+KFR·{RSC−RSF(i−1)}, and a gradient degree calculation section 114i for calculating the gradient degree KRSi (see, FIG. 31) in accordance with the formula KRS1=(RSF−RS0i)/(RS1i−RS0i). In the formula, RSF(i−1) represents a filtering section output in the preceding cycle, and KFR represent a gradient filter coefficient. Further, RS0i represents a gradient degree reference value 0 for i'th to (i+1)'th upshift, and RS1i represents a gradient degree reference value 1 for i'th to (i+1)'th upshift. In a hatched region shown in FIG. 31, it is impossible to maintain the vehicle speed when an upshift to the (i+1)'th gearshift position is made at the limit vehicle speed for upshift.

The shift line modification section 114d of the shift pattern movement correction section 114c calculates the sum of the sporty degree KSP and the gradient degree KRSi of the i'th to (i+1)'th shift line, respectively determined by the sporty degree determination section 112 and the gradient degree determination section 114e, as a movement coefficient KMi for the i'th to (i+1)'th shift line. Further, the modification section 114d multiplies a value, which is obtained by subtracting an upshift speed NOUM corresponding to a throttle opening Th in the mild pattern from an upshift speed NOUS corresponding to a throttle opening Th in the sport pattern, by the shift line movement coefficient KMi, to thereby obtain an upshift speed modification amount KMi·(NOUS−NOUM) as an upshift line modification amount (see, FIG. 32).

In case that the throttle opening Th is equal to or larger than a predetermined throttle opening Thv (minimum throttle opening at which a kick-down is conducted), the shift line modification section 114d of the shift pattern movement correction section 114c multiplies a value, which is obtained by subtracting a downshift speed NODM corresponding to a throttle opening Th in the mild pattern from a downshift speed NODS corresponding to a throttle opening Th in the sporty pattern, by a sporty degree KSP, to thereby obtain a downshift speed modification amount KSP·(NODS−NODM). See, FIG. 33.

When the throttle opening Th is smaller than the predetermined throttle opening Thv, on the other hand, the shift line modification section 114d of the shift pattern movement correction section 114c determines a brake-down coefficient KBG, used for the calculation of the downshift speed modification amount for this case, in accordance with a value of the large braking acceleration switch BGSB determined by the input parameter calculation section 111 and the sporty degree KSP obtained by the sporty degree determination section 112. The brake-down coefficient KBG is set to a value of "0" when the value of the switch BGSB is "0" which indicates that the braking deceleration is not large, or when the vehicle speed V is equal to or smaller than a vehicle speed threshold value VSBG, whereas the brake-down coefficient is set to a value which is equal to the sporty degree KSP when the switch BGSB has a value of "1" which indicates that the braking deceleration is large. Next, the shift line modification section 114d of the shift pattern movement correction section 114c multiplies a value, which is obtained by subtracting the lowest speed NOBM for brake-downshift from the highest speed NOBS for brake-downshift, by the brake-down coefficient KBG, to thereby determine a downshift line modification amount KBG·(NOBS−NOBM).

Based on the upshift speed modification amount and the downshift speed modification amount determined in the aforementioned manner by the shift pattern movement correction section 114c of the shift pattern setting section 114b, this setting section 114b determines an upshift speed NOU, and a downshift speed NOD for the throttle opening equal to or larger than the predetermined throttle opening Thv or a downshift speed NOB for the throttle opening smaller than the predetermined throttle opening Thv in accordance with the following formulae.

$$NOU=NOUM+KMi·(NOUS−NOUM)$$

$$NOD=NODM+KSP·(NODS−NODM)$$

$$NOB=NOBM+KBG·(NOBS−NOBM)$$

That is, the shift pattern. setting section 114b sets such a shift pattern as has an upshift or downshift vehicle speed, which is obtained by conducting interpolation of the upshift or downshift vehicle speed in the mild pattern and that in the sporty patter in accordance with the sporty degree KSP and the gradient degree KRS. Therefore, the thus set shift pattern is changed between the mild pattern and the sporty pattern with changes of the sporty degree and the gradient degree. In other words, the shift pattern setting section 114b functions as shift pattern movement means for continuously moving the shift pattern. Meanwhile, an upshift command is delivered when the current vehicle speed becomes greater than the upshift vehicle speed, whereas a downshift command is delivered when the current vehicle speed becomes smaller than the downshift vehicle speed.

Figure 46:
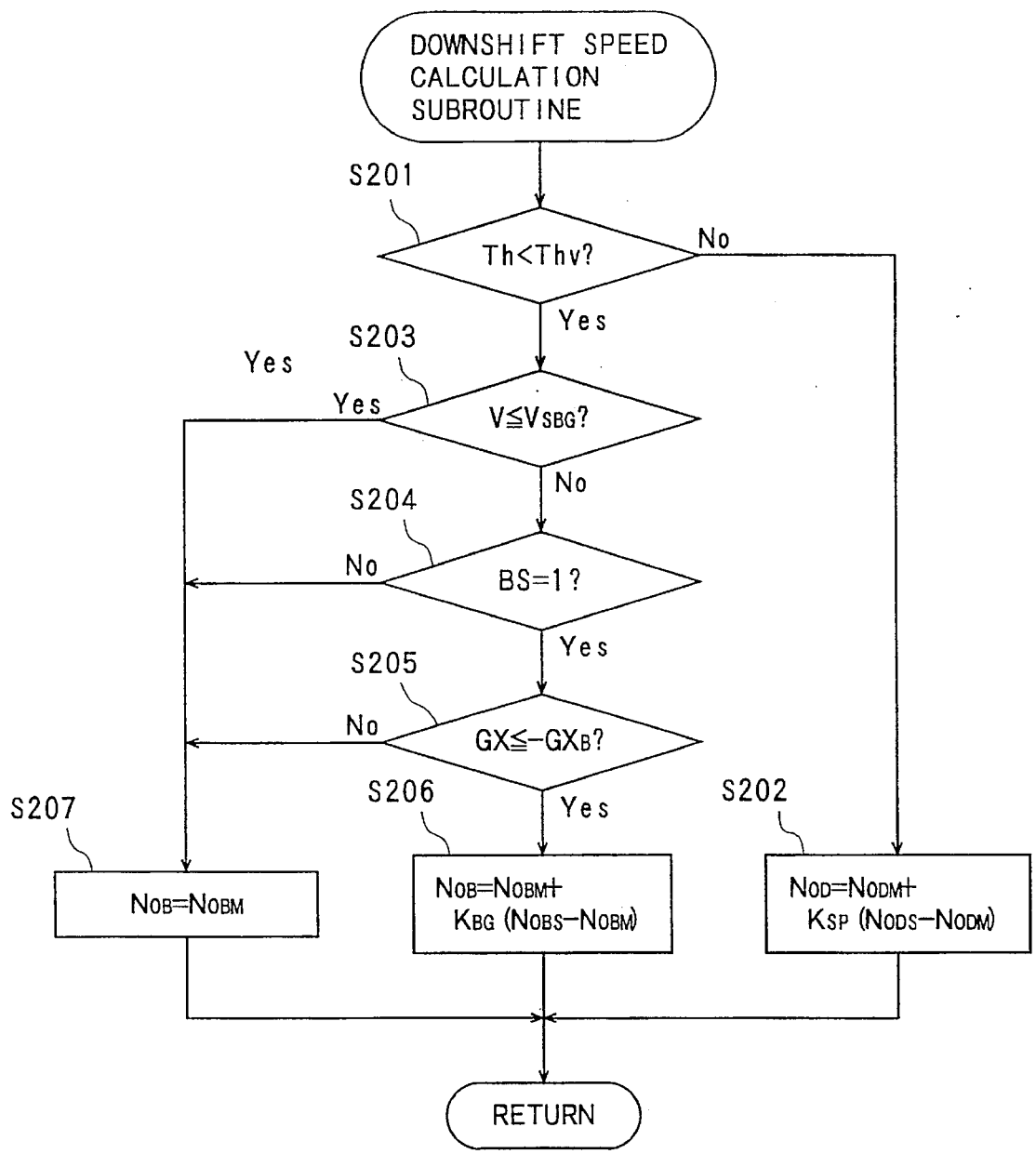
FIG. 46 is a flowchart of a downshift speed determination calculation subroutine carried out by the electronic control unit serving as a shift pattern setting section shown in FIG. 14.
Figure 47:
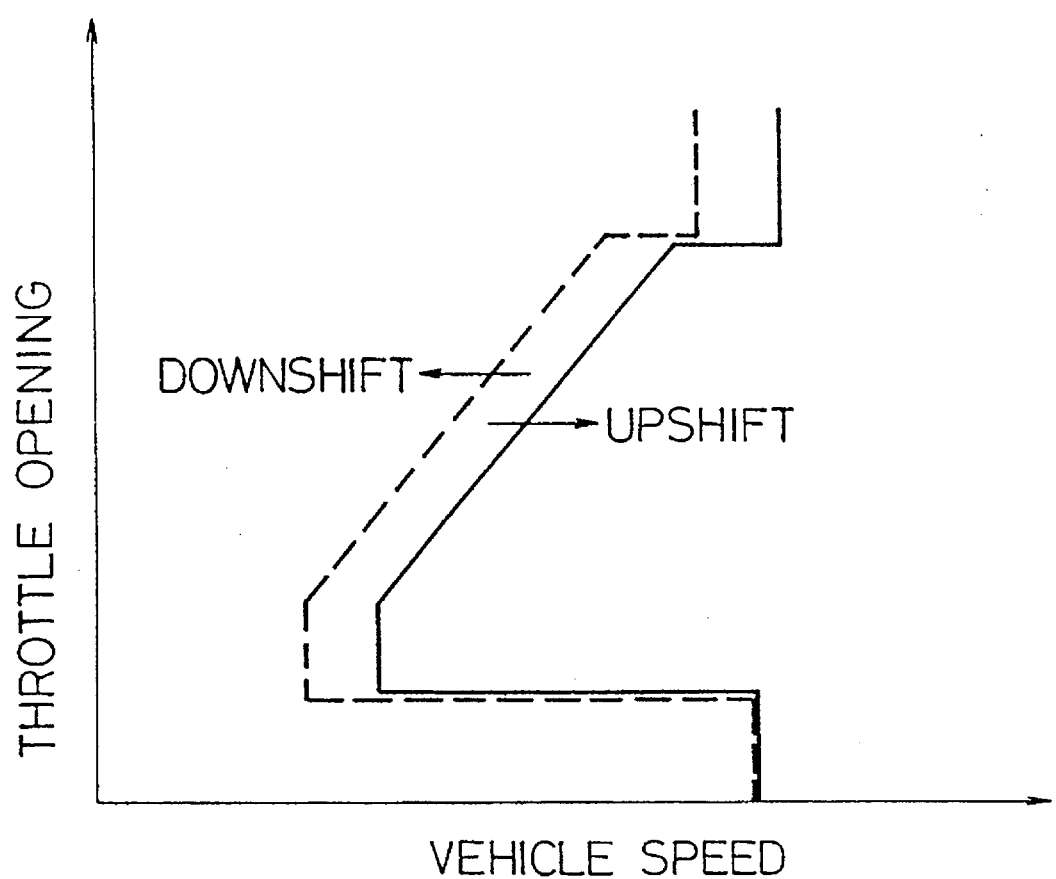
FIG. 47 is a view showing a shift schedule used in a conventional speed change control apparatus.

FIG. 46 shows a downshift speed calculation subroutine executed by the electronic control unit 11 serving as the shift pattern setting section 114b.

In this subroutine, the control unit 11 reads a throttle opening Th (stored in, e.g., a memory accommodated in the control unit 11, together with various parameters and setting values which will be mentioned hereinbelow), determines a predetermined throttle opening Thv with reference to, e.g., a map shown in FIG. 33, and further determines whether or not the thus read throttle opening is smaller than the predetermined throttle opening (step S201). If the result of this determination is negative, the control unit 11 determines, with reference to the sporty and mild patterns shown in FIG. 33, the downshift speeds NODS and NODM respectively corresponding to the throttle opening Th on the sporty pattern and that on the mild pattern, and reads the sporty degree KSP, at step S202. Next, the control unit 11 multiplies a value, obtained by subtracting the downshift speed NODM from the downshift speed NODS, by the sporty degree KSP, to thereby obtain a downshift line modification amount KSP·(NODS−NODM), and further adds this modification amount to the downshift speed NODM, to thereby calculate a downshift speed NOD for the throttle opening which is equal to or larger than the predetermined throttle opening Thv.

On the other hand, if the result of the determination at step S201 is affirmative, and hence the throttle opening Th is smaller than the predetermined throttle opening Thv, then the control unit 11 reads the vehicle speed V and a vehicle speed threshold value VSBG from the memory, and determines whether or not the vehicle speed V is equal to or smaller than the threshold value VSBG (step S203). If the result of the determination is negative, the brake switch BS is read out., and whether or not the brake switch BS is "1(ON)" is determined (step S204). If the result of this determination is affirmative, the longitudinal acceleration GX and a predetermined value of −GXB are read out from the memory, and whether or not the longitudinal acceleration GX is equal to or smaller than the predetermined value of −GXB, that is, whether or not the deceleration is large is further determined (step S205).

If the result of the determination at step S205 is affirmative, that is, if the vehicle speed V is large, the brake switch is in an ON state, and the deceleration is large, then the control unit 11 determines, with reference to the sporty and mild patterns shown in FIG. 33, the maximum and minimum speeds NOBS, NOBM at which a brake-downshift takes place, and reads the sporty degree KSP. Further, the control unit 11 multiplies a value, obtained by subtracting the minimum speed NOBM from the maximum speed NOBS, by the sporty degree KSP, to thereby obtain a downshift line modification amount KSP·(NOBS−ONBM), and adds this modification amount to the minimum speed NOBM to thereby calculate a downshift speed NOB for the throttle opening smaller than the predetermined throttle opening Tv (step S206).

If the result of the determination at step S203 is affirmative, or if the result of the determination at step S204 or S205 is negative, that is, if the vehicle speed is low or the brake switch BS is in an OFF state or the deceleration is small, then the minimum speed NOBM at which a brake downshift takes place is set as the downshift speed NOB for the throttle opening smaller than the predetermined throttle opening Thv (step S207).

According to the aforementioned shift pattern setting, the shift pattern is continuously changed over so as to be conformed with the manner (sporty degree) of driving of the driver. In addition, the shift pattern movement is conducted when the driving manner changes from mild degree oriented driving to sporty degree oriented driving or vice versa, while preventing the shift pattern from being unintentionally moved when the acceleration or deceleration degree is at an ordinary level. Thus, improved response in gear-changing for speed change can be attained.

As a result of the shift pattern setting, the upshift line is moved in a stepless fashion by at least sufficient amount which is enough to ensure a driving force, to thereby prevent shift hunting which would occur if an upshift is made during the vehicle running with a deficient driving force. Further, upshift is not prevented so long as an adequate driving force is produced. Thus, the drivability (driving force) of the vehicle can be ensured, while preventing an unnecessary upshift due to lift-foot during the vehicle running on an ascending road.

Furthermore, according to the aforementioned shift pattern setting, when the sporty degree and the braking deceleration are large, the downshift line is moved toward the higher speed side in a low throttle opening region, so that downshift is carried out with ease, whereby the drivability of the vehicle at the time of restarting accelerated vehicle driving can be improved. Especially, when sporty vehicle running is made along such a road that a long straight and a sharp corner repeatedly appear, a downshift takes place at a location short of a corner, and hence a downshift no longer takes place at the exit of the corner, so that smooth acceleration is ensured. On the other hand, the downshift line in a small throttle opening region is not expanded to such an extent that it reaches a region defined by a shift line associated with a one level higher speed than the downshift line. In other words, the degree of movement, toward the higher speed side, of the downshift line in the small throttle opening region is restricted. Thus, downshift never takes place unexpectedly during coasting vehicle running. Further, in a low vehicle speed region, the downshift line in the small throttle opening region is prevented from moving toward the higher speed side, so that downshift never takes place when braking manipulation is carried out to cause the vehicle to stop running.

As explained in the above, the shift pattern movement is adjusted non-stepwise in accordance with the manner (sporty degree) of driving by the driver and the gradient degree, so that an optimum shift pattern suitable to the individual driver's preference and the vehicle running condition is automatically set. Thus, an improved drive feeling can be achieved. In addition, a numerous number of standard shift patterns are unnecessary. This makes it possible to relatively easily construct a speed change control apparatus at relatively low costs.

Learning Correction Section

A learning correction section 115 is operable to determine an excess and deficiency in engine braking on the basis of a vehicle running condition and driver's manipulation, and perform learning correction of threshold values EB43 and EB32, which affect upon fulfillment of mode shift fuzzy rules, associated with the engine braking conformity degree by a minute amount EP each time the excess or deficiency in engine braking is determined. More specifically, it is determined that the engine braking is excessive when the throttle is depressed immediately after a downshift carried out upon fulfillment of a fuzzy rule in connection with entry to the mode C or D, or when the fuzzy rule associated with entry to the mode C or D is fulfilled again immediately after an upshift carried out upon the mode C or D being released. On the other hand, it is determined that the engine braking is deficient if the fuzzy rule associated with entry to the mode C or D is not fulfilled as the vehicle runs on a descending road, and if a braking period ratio is large.

Figure 34:
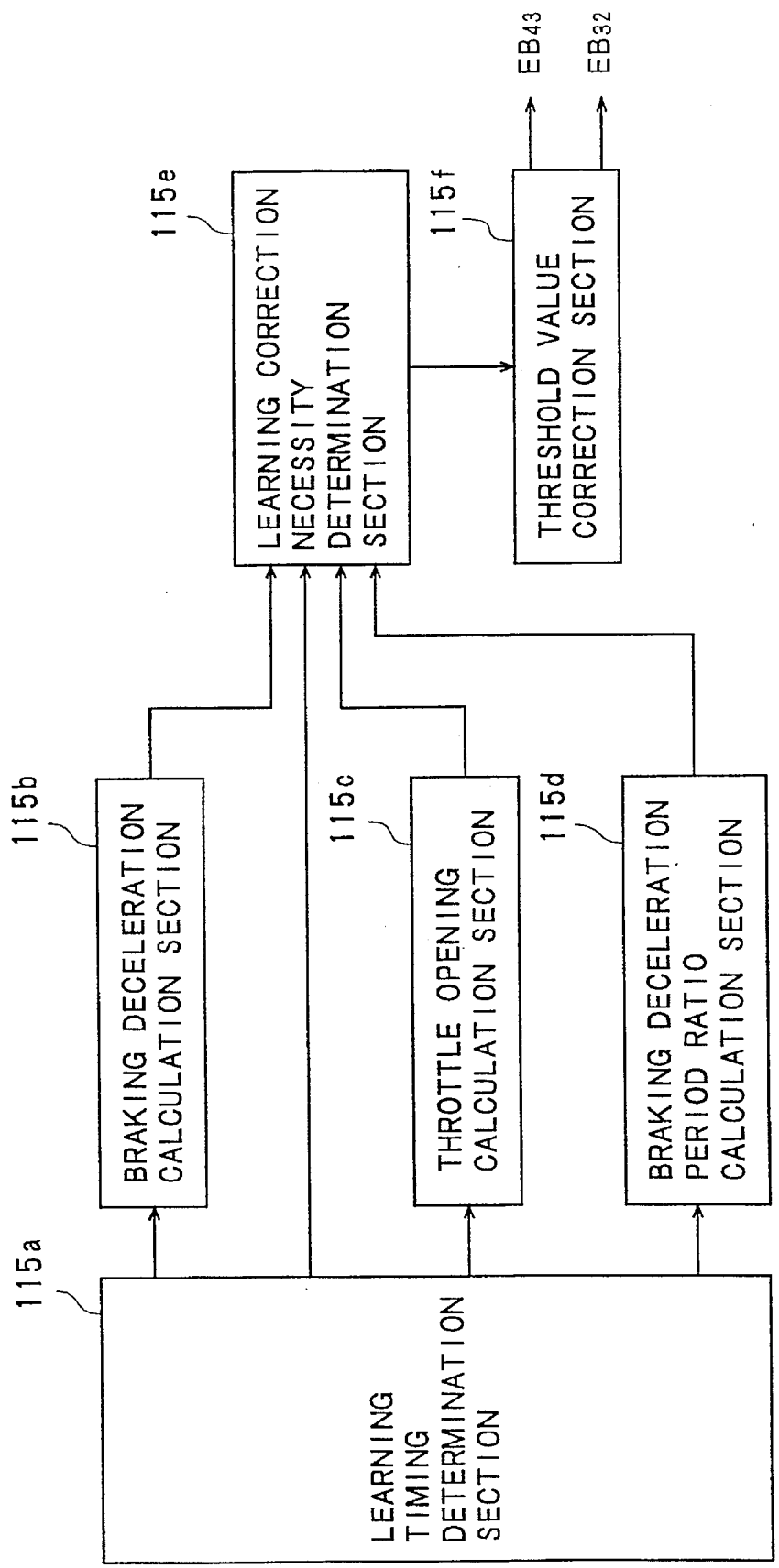
FIG. 34 is a block diagram showing in detail a learning correction section shown in FIG. 14.

To this end, as shown in FIG. 34, the learning correction section 115 includes a learning timing determination section 115a which is operable to determine that learning timing. to learn excessive engine braking after downshift is reached, if the mode C or D continues up to the time point at which a predetermined period, e.g., four seconds, has elapsed from the time when the downshift initiated upon entry to the mode C or D was completed, or if a corresponding one of the fourth and third fuzzy rules is fulfilled after the time point at which a first predetermined period, e.g., one second, has elapsed from the time when the aforesaid downshift was completed, and before the time point at which a second predetermined period, e.g., four seconds, will elapse from the time when the downshift was completed.

Further, the learning timing determination section 115a is operable to determine that learning timing to learn excessive engine braking after upshift is reached, if a corresponding one of the first and second fuzzy rules is fulfilled before a predetermined time period (e.g., three seconds) has elapsed from the time when an upshift initiated upon release of the mode C or D (mode shift C34 or D23) was completed. Also, the section 115a operates to determine that learning timing to learn deficient engine braking before downshift is reached, if the current gearshift position is the fourth or third gearshift position and if a time period counted by the below-mentioned learning timer TG reaches a predetermined time period (e.g., six seconds).

The learning correction section 115 further includes a maximum braking deceleration calculation section 115b and a maximum throttle opening calculation section 115c for respectively calculating the maximum value of the braking acceleration and that of the throttle opening during a time period from the time when a predetermined period (e.g., one second) has elapsed from an instant at which a downshift initiated upon entry to the mode C or D was completed, to the time when the learning timing is reached. Also, the learning correction section 115 includes a braking deceleration period ratio calculation section 115d for calculating a braking deceleration period ratio BR in a learning determination period from the time when the learning timer TG starts to the time when a predetermined time period (e.g., six seconds) elapses from the time point of the timer start.

The learning correction section 115 further includes a learning correction necessity determination section 115e for determining necessity and unnecessariness of the learning correction after downshift, after upshift, and before downshift in accordance with the below-mentioned fuzzy rules, and a threshold value correction section 115f for correcting a threshold value associated with the engine braking conformity degree.

The electronic control unit 11 serving as the learning correction section 115 executes an engine braking learning subroutine corresponding to step S11 of the main routine and shown in FIGS. 35 through 39.

Figure 35:
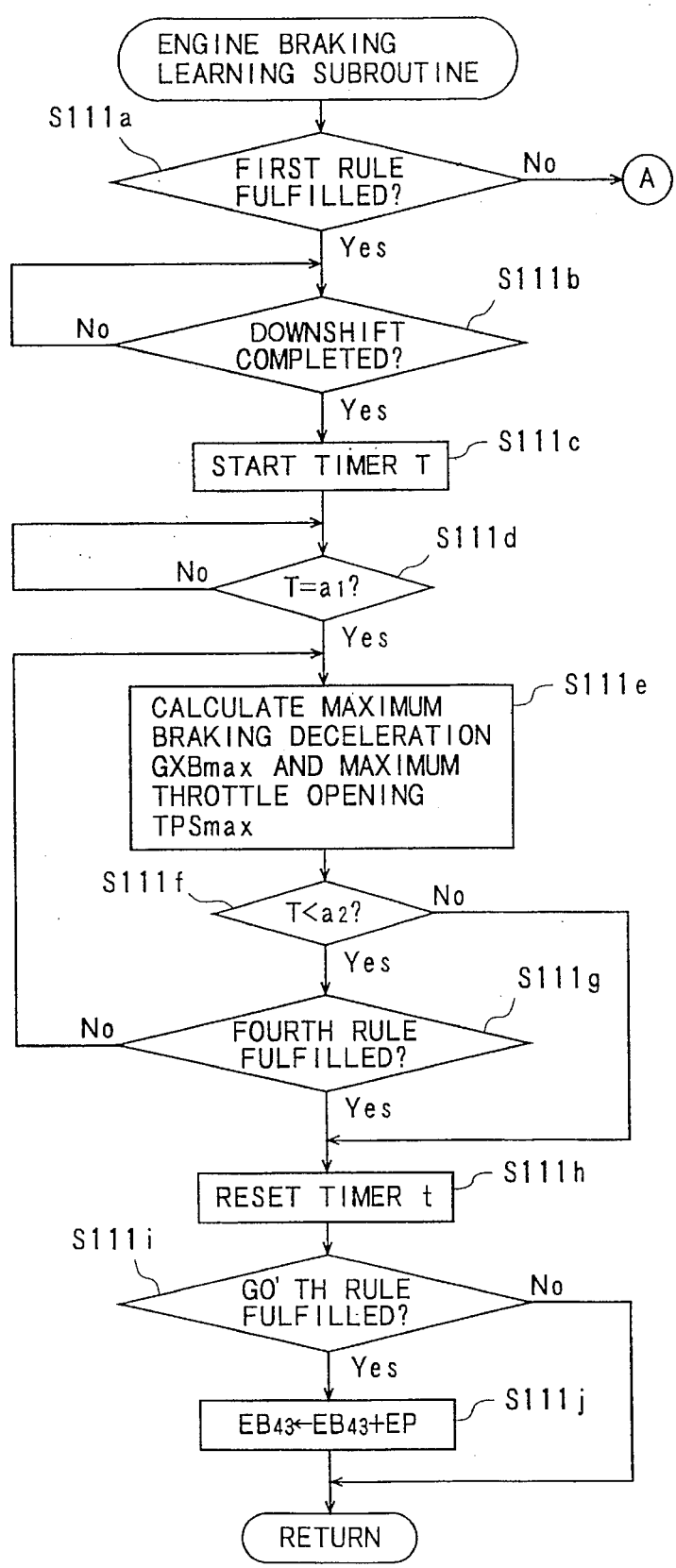
FIG. 35 is a flowchart showing part of an engine braking learning correction subroutine carried out by the electronic control unit serving as a learning correction section shown in FIG. 14.

In this subroutine, the control unit 11 first determines whether or not the first rule is fulfilled (step S111a of FIG. 35). If the result of this determination is affirmative (during a 4–3 downshift), the control unit awaits completion of a downshift initiated in accordance with a downshift command, which is associated with the mode shift C43 and which was delivered from the mode determination and processing section 114f upon fulfillment of the first rule. When the completion of the downshift is determined at step S111b, the control unit 11 causes a timer T to start (step S111c), and is in a standby state until when a time period counted by the timer T reaches a predetermined time period al (e.g., one second).

When it is determined at step S111d that the predetermined period al has elapsed from the time point at which the downshift was completed, the control unit 11 calculates a maximum braking deceleration GXBmax and a maximum throttle opening TPSmax (step S111e). If then determines whether or not the time period counted by the timer T is shorter than a predetermined time period a2, e.g., four seconds (step S111f). If the result of this determination is affirmative, whether or not the fourth fuzzy rule is fulfilled is determined (step S111g). If the determination result at step S111g is negative, the steps S111e through S111g are executed repeatedly.

Thereafter, when the result of the determination at step S111f becomes negative or when the result of the determination at step S111g becomes affirmative, the control unit 11 determines that the learning correction timing is reached, and causes the timer T to be reset at step S111h and determines whether or not the following G0'th fuzzy rule is fulfilled (step S111i).

[G0'th rule] If VTHD>VTHS, VTHD<VTHB, GXBGD≦GXBGS, and V>VS, then engine braking is excessive.

In the G0'th rule, symbol VTHS represents a throttle opening threshold value, and VTHB represents a throttle opening threshold value which is larger than the threshold value VTHS. Symbols GXBGS and VS represent a braking deceleration threshold value and a vehicle speed threshold value, respectively.

If all of the four determination conditions of the G0'th rule are satisfied (the maximum throttle opening is neither small nor large, the maximum braking deceleration is small, and the vehicle speed is small), and hence the determination result at step S111$i$ is affirmative, then the control unit 11 determines that the engine braking is excessive, and hence adds a minute amount EP to the threshold value EB43 associated with the engine braking conformity degree. This thereby increasingly correct the threshold value EB43 (step S111$j$), whereby the learning correction for causing the engine braking to be difficult to exercise is effected.

On the other hand, if unfulfillment of the G0'th rule is determined at step S111$i$, the subroutine is finished without making such a determination that the engine braking is excessive.

FIGS. 41 and 42 indicate, along time axis, a procedure of learning timing determination at the time of the aforementioned 4–3 downshift.

Figure 36:
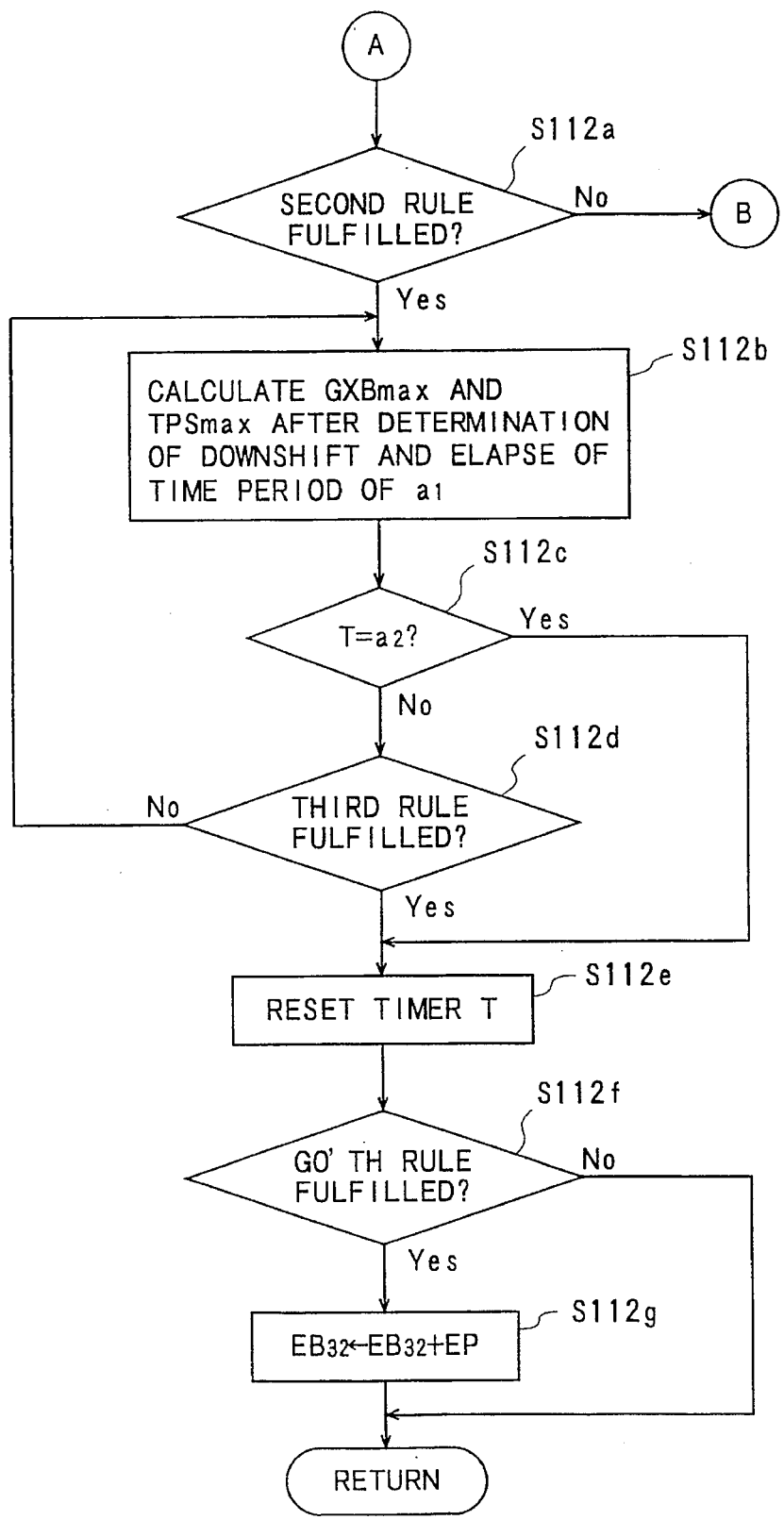
FIG. 36 is a flowchart showing another part, following FIG. 35, of the engine braking learning correction subroutine.

When determining at step S111$a$ of FIG. 35 that the first fuzzy rule is not fulfilled, the control unit 11 determines whether or not the second fuzzy rule is fulfilled (step S112$a$ of FIG. 36). If the result of this determination is affirmative (at the time of 3–2 downshift), step S112$b$ which corresponds to steps S111$b$ through S111$e$ of FIG. 35 is executed. That is, if the time period counted by the timer T, which started when the completion of downshift was determined, has reached the predetermined time period a1, the calculation of maximum braking deceleration and maximum throttle opening is started.

Then, associated ones of steps S112$c$ through S112$g$ respectively corresponding to steps S111$f$ through S111$j$ of FIG. 35 are executed in sequence each time the calculation of maximum braking deceleration and maximum throttle opening is completed. As a consequence, the timer T is caused to be reset (step S112$e$) if it is determined at step S112$f$ that the third fuzzy rule is fulfilled after the time point at which the predetermined time period a1 has elapsed from the time when the downshift was completed, and before the time point at which the predetermined time period a2 will elapse from the time when the downshift was completed, or if it is determined at step S112$c$ that the predetermined time period a2 has elapsed from the time when the downshift was completed. Then, whether or not the G0'th rule is fulfilled is determined (step S112$f$). If the G0'th rule is fulfilled, the threshold value EB32 for the engine braking conformity degree is increasingly corrected by the minute amount EP (step S112$g$).

Figure 37:
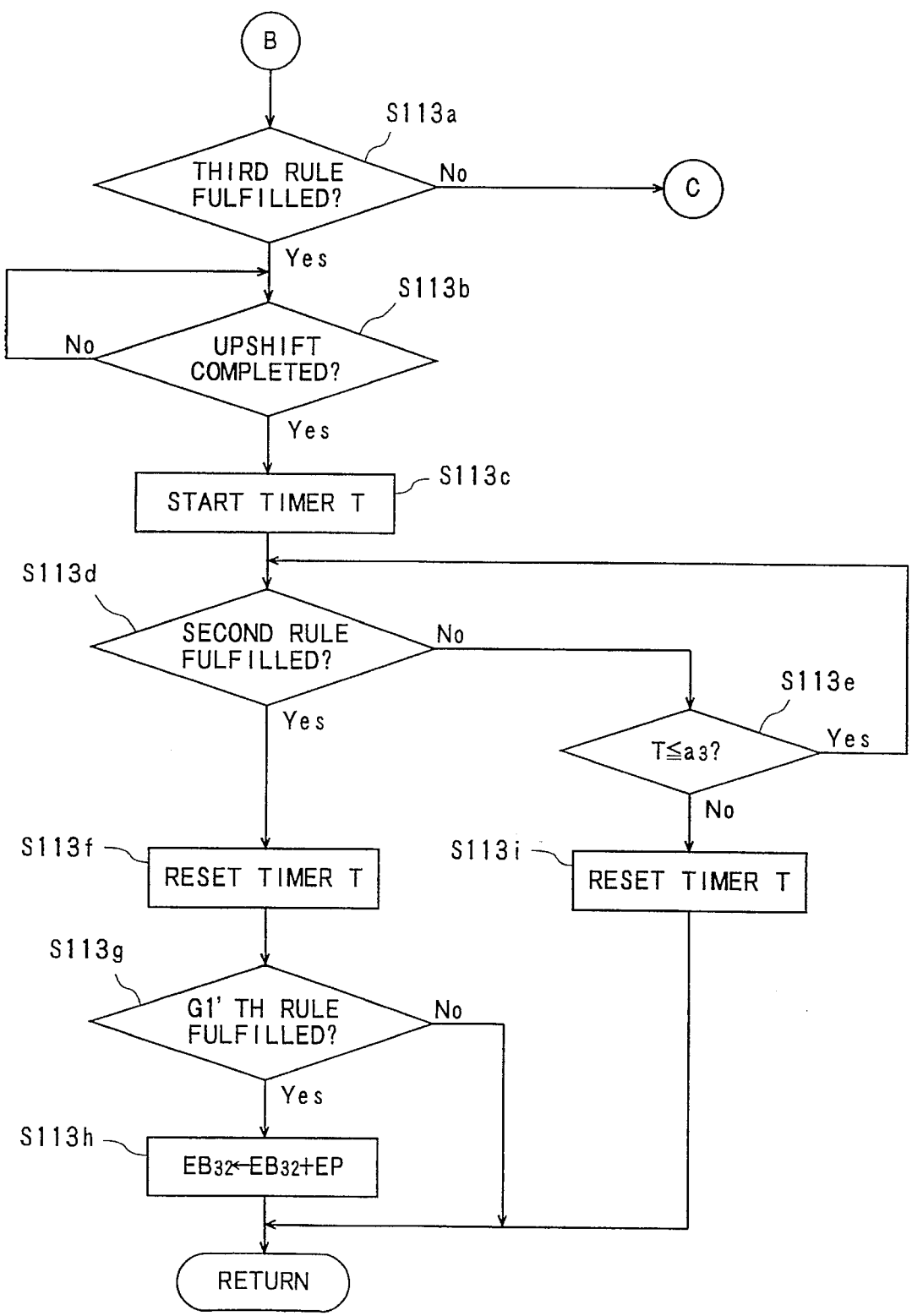
FIG. 37 is a flowchart showing a still another part, following FIG. 36, of the engine braking learning correction subroutine.

When determining unfulfillment of the second fuzzy rule at step S112$a$ of FIG. 36, the control unit 11 serving as the learning correction section 115 determines whether or not the third fuzzy rule is fulfilled (step S113$a$ of FIG. 37). If the result of this determination is affirmative (at the time of 2–3 upshift), then the control unit awaits completion of an upshift initiated in response to an upshift command associated with the third rule.

If the completion of the upshift is determined at step S113$b$, the control unit 11 causes the timer T to start (step S113$c$), and determines whether or not the second fuzzy rule is fulfilled (step S113$d$). If the result of this determination is negative, then a determination is made as to whether or not the time period counted by the timer T is equal to or shorter than a predetermined time period. a3, e.g., three seconds (step S113$e$). The program returns to step S113$d$, if the predetermined time period a3 has not elapsed.

When determining at step S113$d$ that the second rule has been satisfied before the predetermined time period a3 elapses, the control unit 11 causes the timer T to be reset at step S113$f$, and determines whether or not the below-mentioned G1'th fuzzy rule is satisfied (step S113$g$).

[G1'th rule] If GXBG≦GXBGS and V>VS, then engine braking is excessive.

When determining fulfillment of the G1 rule, the control unit 11 increasingly corrects the threshold value EB32 for the engine braking conformity degree by the minute amount EP (step S113$h$), whereupon the subroutine is completed.

On the other hand, when it is determined at step S113$e$ that the predetermined time period a3 has elapsed, the timer T is reset at step S113$i$, and the subroutine is finished. If unfulfillment of the G1 rule is determined at step S113$g$, the subroutine is finished immediately.

Figure 38:
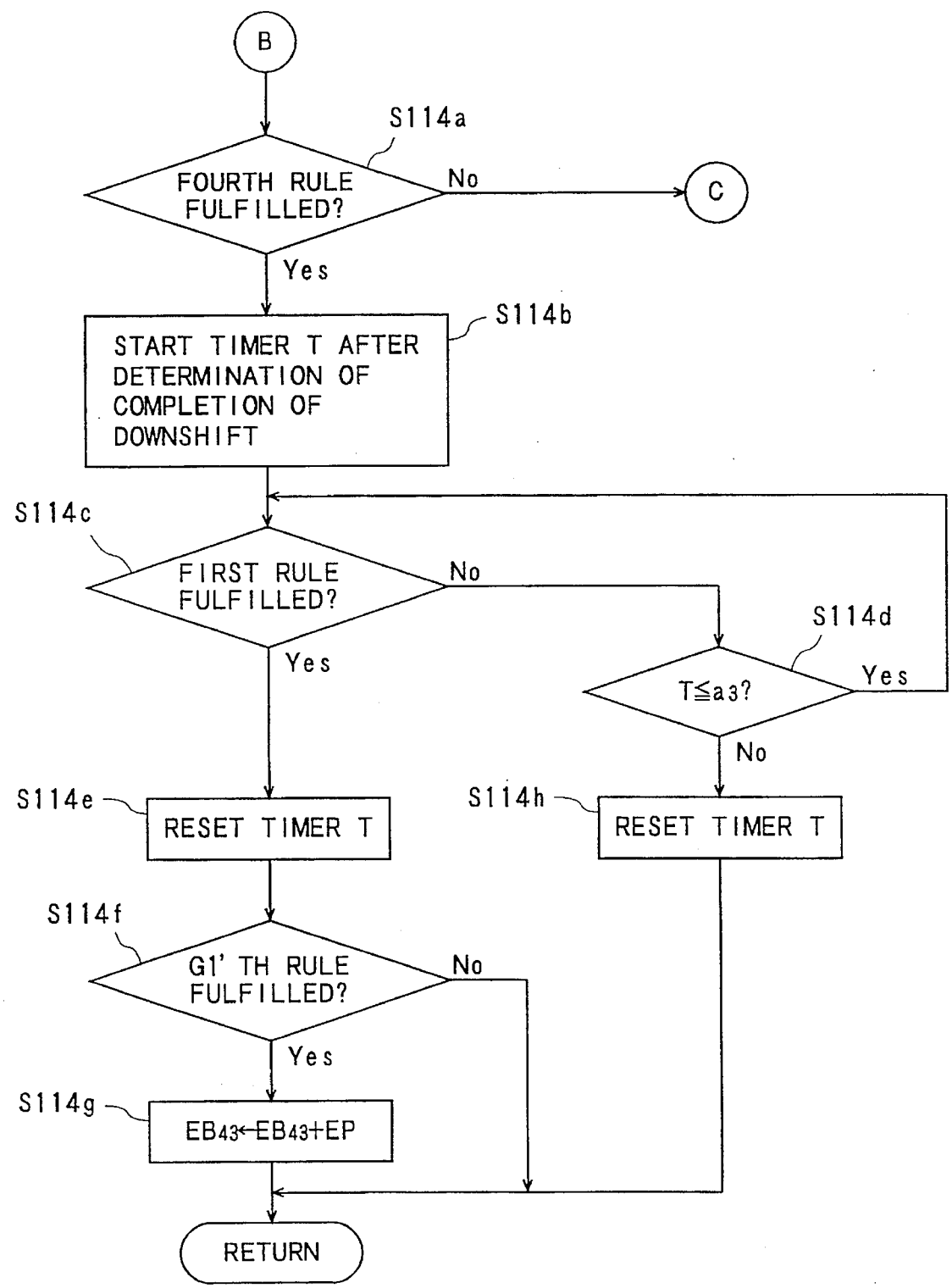
FIG. 38 is a flowchart showing a still another part, following FIG. 37, of the engine braking learning correction subroutine.

When determining at step S113$a$ of FIG. 37 that the third rule is not fulfilled, the control unit 11 determines whether or not the fourth rule is fulfilled (step S114$a$ of FIG. 38). If the result of this determination is affirmative (at the time of 3–4 upshift), step S114$b$ corresponding to steps S113$b$ and S113$c$ is executed, and then a determination is made as to whether or not the first rule is satisfied (step S114$c$).

Then, if unfulfillment of the first rule is determined at step S114$c$, the control unit 11 determines whether the time period counted by the timer T started at step S114$b$ falls within a predetermined time period a3, e.g., three seconds (step S114$d$). The program returns to step S114$c$, if the determination result is affirmative.

When fulfillment of the first rule is determined at step S114$c$, the electronic control unit 11 causes the timer T to be reset, and determines whether or not the G1'th rule is fulfilled (steps S114$e$ and S114$f$). If the result of this determination is affirmative, then the threshold value EB43 for the engine braking conformity degree is increasingly corrected by a minute value (step S114$g$). Whereupon the subroutine is finished. On the other hand, if unfulfillment of the G1'th rule is determined at step S114$e$, then the subroutine is finished immediately. Further, if it is determined at step S114$d$ that the predetermined time period a3 has elapsed, the subroutine is finished after the timer T is reset at step S114$h$.

Figure 43:
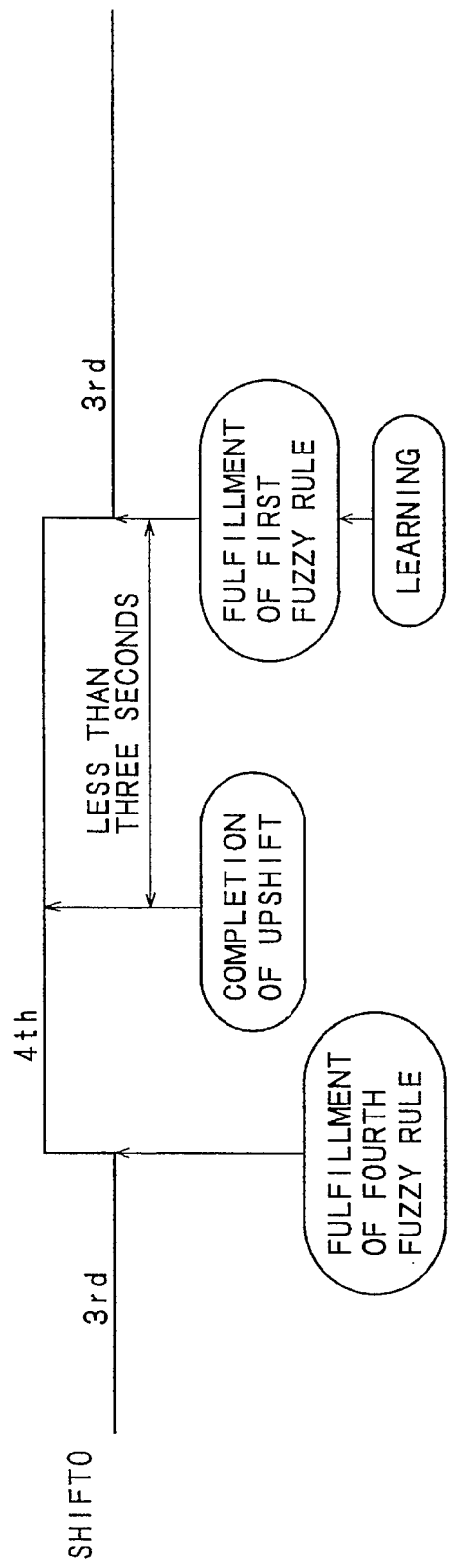
FIG. 43 is a view showing a learning correction timing determination procedure at the time of an upshift from the third speed to the fourth speed.

FIG. 43 indicates, along the time axis, a procedure of determining the learning timing at the time of 3–4 upshift.

Figure 39:
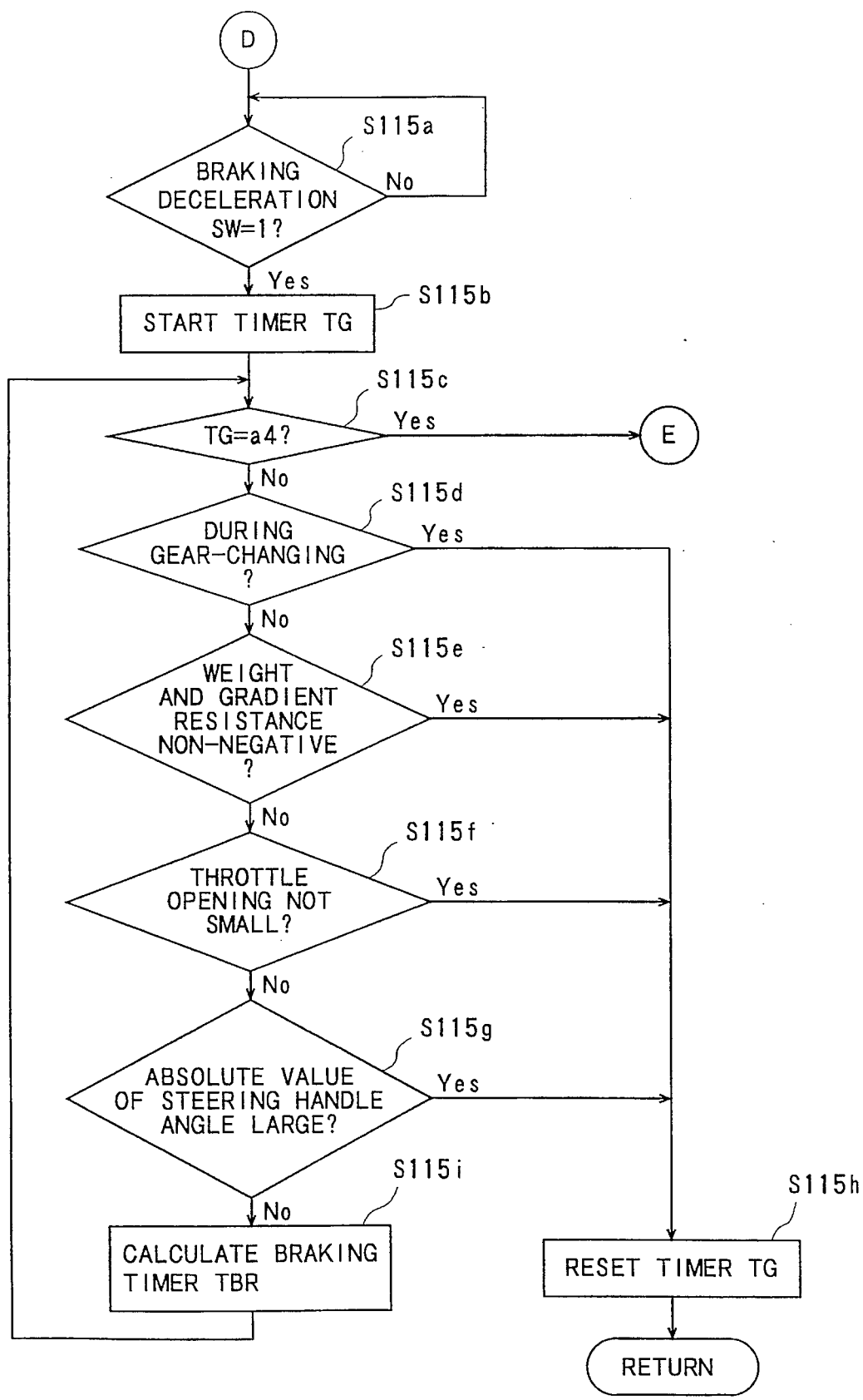
FIG. 39 is a flowchart showing still another part, following FIG. 38, of the engine braking learning correction subroutine.
Figure 40:
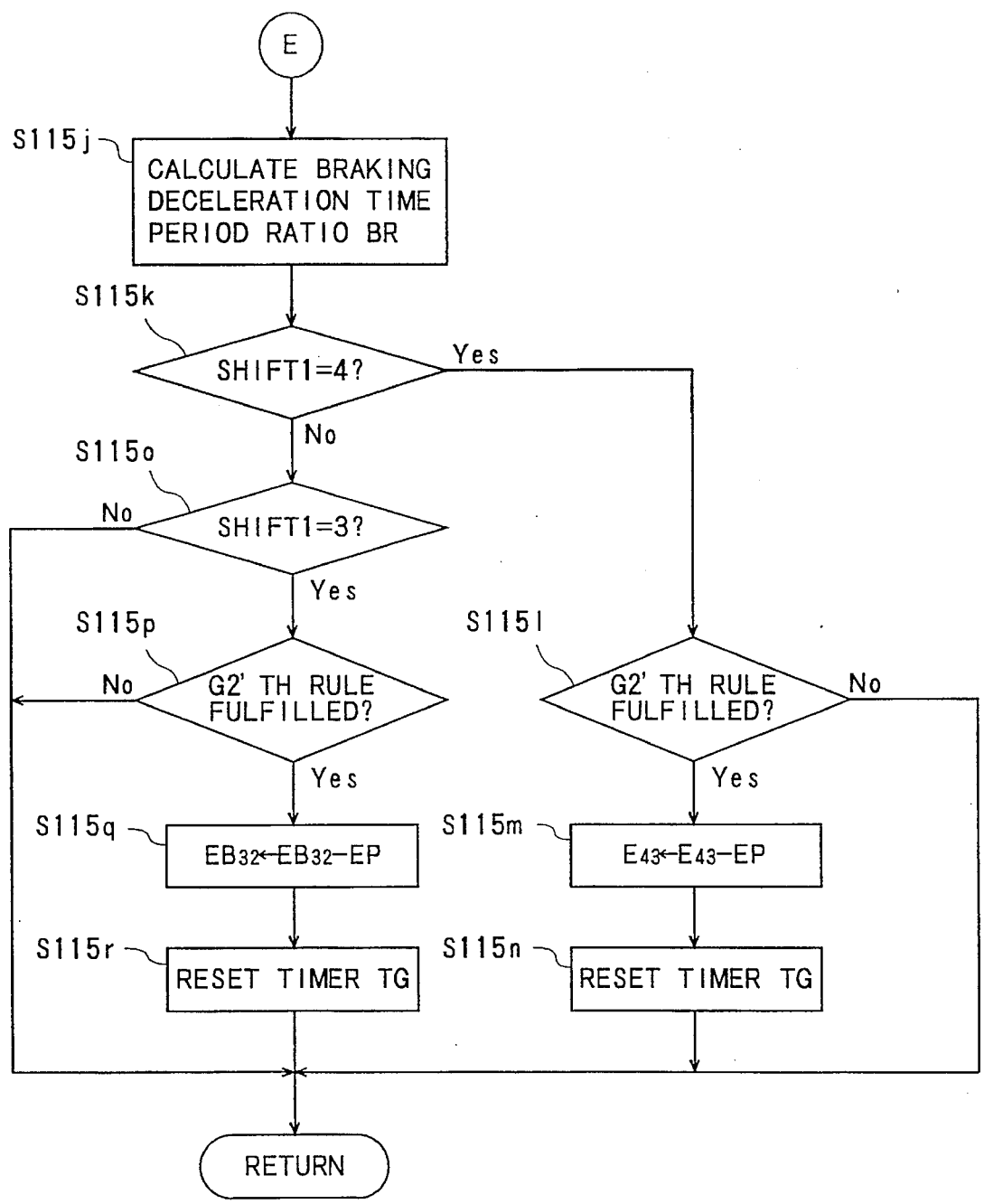
FIG. 40 is a flowchart showing still another part, following FIG. 39, of the engine braking learning correction subroutine.

When determining at step S114$a$ of FIG. 38 that the fourth rule is not fulfilled (i.e., at the time of the mode A), the control unit 11 awaits until when the braking deceleration switch has a value of "1." If it is determined at step S115$a$ of FIG. 39 that this switch has the value of "1," the control unit 11 causes a timer TG to start (step S115$b$), and determines whether or not a time period counted by the timer TG has reached a predetermined time period a4, e.g., six seconds (step S115$c$). If the determination result is negative, the unit 11 sequentially determines whether or not gear-changing for speed change is being carried out, whether or not the weight and gradient resistance is not negative, whether or not the throttle opening is not small, and whether or not the absolute value of steering handle angle is large (steps S115$d$ through S115$g$). If any one of results of these determinations is affirmative, then the timer TG is caused to be reset at step S115$h$, and the subroutine is finished.

On the other hand, if all of the determination results of steps S115$d$ through S115$g$ are negative, the control unit 11 calculates a braking time TBR (step S115$i$), and the program returns to step S115$c$.

Figure 44:
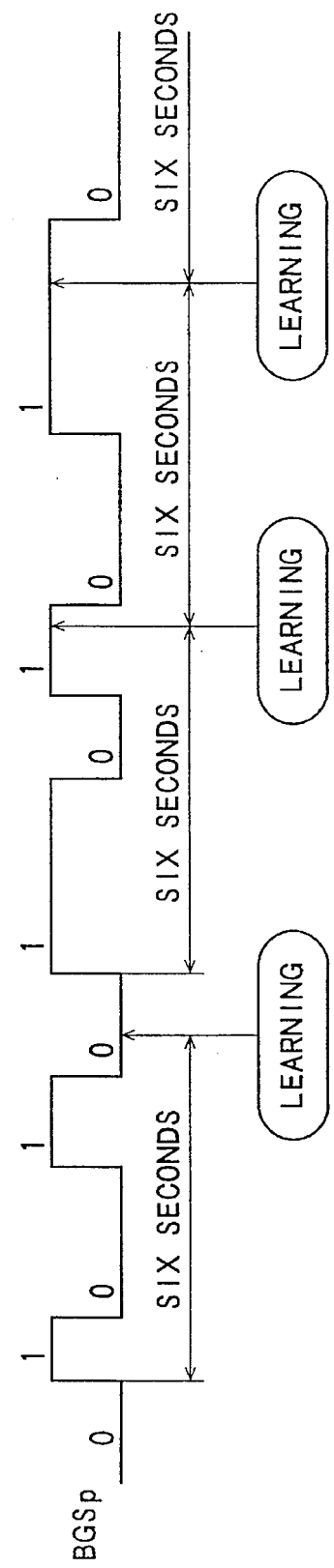
FIG. 44 is a view showing still another learning correction timing determination procedure.

Thereafter, when it is determined at step S115$c$ that the time period counted by the timer TG has reached the predetermined time period a4 (FIG. 44), the control unit 11 calculates a braking deceleration time ratio BR (step S115$j$), and determines whether or not the present gearshift position SHIFT1 is the gearshift position for the fourth speed (step S115$k$). If the determination result is affirmative, the control unit 11 determines whether or not the following G2'th rule is satisfied (step S115*l*).

[G2'th rule] If BR>BRB, then engine braking is deficient.

When determining at step S115*l* that the determination condition for the G2'th rule is satisfied, the control unit 11 determines deficiency in engine braking, and subtracts the minute amount EP from the threshold value EB43 for the engine braking conformity degree, to thereby decreasingly correct the threshold value EB43 (step S115*m*). Further, the timer TG is reset at step S115*n*, and the subroutine is finished.

On the other hand, if it is determined at step S115*k* that the present gearshift position is not the gearshift position for the fourth speed, the control unit 11 further determines whether or not the present gearshift position is the gearshift position for the third speed (step S115*o*). If the determination result is affirmative, the control unit 11 further determines whether or not the G2'th rule is fulfilled (step S115*p*). If the determination result is affirmative, the threshold value EB32 of the engine braking conformity degree is decreasingly corrected by the minute amount EP (step S115*q*), and the timer TG is reset (step S115*r*). Whereupon, the subroutine is completed.

If any one of the determination results of steps S115*l*, S115*o*, and S115*q* is negative, then the subroutine is completed immediately.

According to the aforementioned learning correction, based on the throttle operation (accelerator pedal operation) indicative of an acceleration demand from the driver and braking manipulation indicative of a deceleration demand from the driver, excessive engine braking is determined if the acceleration demand is found, whereas deficient engine braking is determined if the deceleration demand is found. Further, in accordance with this determination result, the threshold value of the engine braking conformity degree is increasingly or decreasingly corrected. For instance, when it is determined after a downshift is carried out that the braking deceleration is small and the throttle opening is large, or when it is determined again after an upshift is made that a downshift is required, the threshold value of the engine braking conformity degree (i.e., a determination reference value for the determination of necessity and unnecessariness of downshift) is subject to the learning correction, so as to be changed to the direction of suppressing a subsequent downshift. On the other hand, the determination reference value is subject to the learning correction, so as to be changed to the direction of promoting a subsequent downshift, if a predetermined time period has elapsed from the time when the braking deceleration switch was shifted to an ON state, with no speed change command generated. As a result, the downshift condition varying in dependence on a driver's preference is learned. Thus, the driver's liking is reflected on the downshift control at the time of vehicle running on descending roads. This thereby improves drive feelings at the time when the vehicle runs on descending roads. In addition, the learning correction is carried out after a downshift and after an upshift, and is carried out at intervals of a fixed time in case that no speed change is conducted. Thus, the learning is frequently carried out, so that convergence of learning can be achieved earlier.

The present embodiment may be modified in various manners.

For instance, although a case wherein the present invention is applied to a four-speed transmission has been explained in the preferred embodiment, this embodiment may be modified for applying the present invention to a five-speed transmission and the like. Although a speed change control suitable to an engine of a type controlled by means of a mass flow system has been explained in the embodiment, the present invention is also applicable to a speed change control for an engine of a speed density type. In this case, instead of the engine intake air amount, the negative pressure in an intake pipe of an engine is used as an input parameter.

Further, in the foregoing embodiment, a vehicle with a steering handle angle sensor has been assumed. However, the embodiment may be modified so as to be applied to a speed change control for a vehicle not provided with this kind of sensor. The sensor system of the embodiment is constructed such that the engine rotational speed sensor 21 is connected to the electronic control unit 11 for speed change control through a control unit for engine control, and the vehicle speed is determined from the output N0 of the T/M output rotational speed sensor 23. However, the sensor system may be modified in various manners, such that the sensor 21 is directly connected to the electronic control unit 11 and a vehicle speed sensor is employed.

Figure 23:
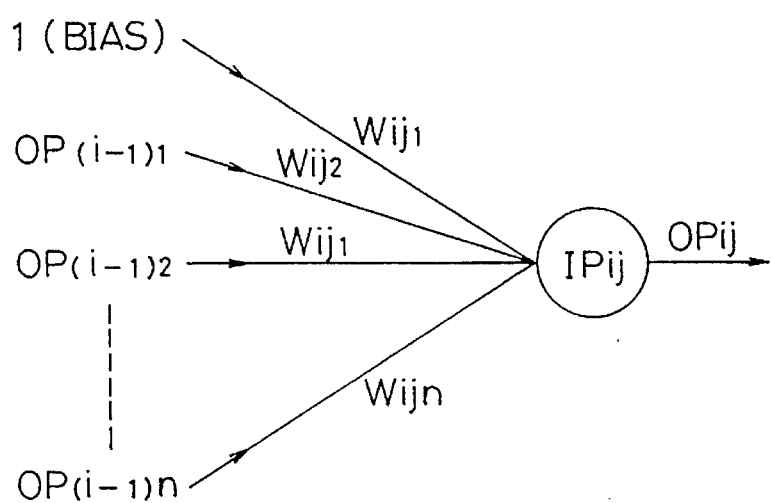
FIG. 23 is a schematic view showing an input-output relation of a respective cell of the neural network shown in FIG. 22.

In the foregoing embodiment, the four input variables X1 through X4 respectively associated with gradient, braking force, steering handle angle, and vehicle speed are input to the neural network shown in FIGS. 22 and 23, to thereby determine the engine brake conformity degree NN indicative of the necessity degree of engine braking. Alternatively, the engine brake conformity degree may be calculated based only on input variables associated with gradient and vehicle speed. Further, in place of an input variable associated with steering handle angle, an input variable associated with lateral acceleration, longitudinal acceleration, or brake oil pressure may be employed.

Furthermore, it is not inevitably necessary to use a neural network. The necessity degree of engine braking may be determined by means of fuzzy inference. As fuzzy inference, there is a variety of techniques such as "MIN-MAX center of gravity method," "algebraic product-addition-center of gravity method," "simplification method." For the determination of the necessity degree of engine braking, any kind of fuzzy inference may be applied. In the following, fuzzy rules for calculating the necessity degree of engine braking are shown by way of example. Also, membership functions indicative of fuzzy subsets S through B with respect to input variables X1 through X4 and an output y are shown by way of example in FIGS. 45A through 45E.

| | |
|---|---|
| [First rule] | X1 = B, X2 = B, X3 = B, and X4 = B, then y = MB. |
| [Second rule] | X1 = B, X2 = B, X3 = B, and X4 = S, then y = B. |
| [Third rule] | X1 = B, X2 = B, X3 = S, and X4 = B, then y = M. |
| [Fourth rule] | X1 = B, X2 = B, X3 = S, and X4 = S, then y = MB. |
| [Fifth rule] | X1 = B, X2 = S, X3 = B, and X4 = B, then y = M. |
| [Sixth rule] | X1 = B, X2 = S, X3 = B, and X4 = S, then y = MB. |
| [Seventh rule] | X1 = B, X2 = S, X3 = S, and X4 = B, then y = MS. |
| [Eighth rule] | X1 = B, X2 = S, X3 = S, and X4 = S, then y = M. |
| [Ninth rule] | X1 = S, X2 = B, X3 = B, and X4 = B, then y = M. |
| [Tenth rule] | X1 = S, X2 = B, X3 = B, and X4 = S, then y = MB. |
| [Eleventh rule] | X1 = S, X2 = B, X3 = S, and X4 = B, then y = MS. |
| [Twelfth rule] | X1 = S, X2 = B, X3 = S, and X4 = S, then y = M. |

| [Thirteenth rule] | X1 = S, X2 = S, X3 = B, and X4 = B, then y = MS. |
| [Fourteenth rule] | X1 = S, X2 = S, X3 = B, and X4 = S, then y = M. |
| [Fifteenth rule] | X1 = S, X2 = S, X3 = S, and X4 = B, then y = S. |
| [Sixteenth rule] | X1 = S, X2 = S, X3 = S, and X4 = S, then y = MS. |

Alternatively, the necessity degree of engine braking may be determined with use of a predetermined function. This function may be one having such an output characteristic as represents a demanded engine braking degree. An example of the function is given hereinbelow, where symbols a1 through a4 are coefficients which are set beforehand so as to provide an output characteristic to produce an output y which is close to demanded engine braking.

$$y=1/[1+e-(a0+a1\times1+a2\times2+a3\times3+a4\times4)]$$

In the embodiment, the vehicle deceleration is detected based on braking manipulation and longitudinal acceleration with use of the input parameter calculation section 111 which responds to outputs from the stop lamp switch 25 and the T/M output rotational speed sensor 21 and which functions as braking manipulation detecting means and longitudinal acceleration detecting means. However, the deceleration may be detected based on either one of braking manipulation and longitudinal acceleration.

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A speed change control method for controlling changeover between gearshift positions of an automotive automatic transmission provided with a plurality of gearshift positions, comprising the steps of:

(a) detecting a value of at least one parameter indicative of a running condition of a vehicle;

(b) comparing the detected at least one parameter value with a predetermined determination reference value, to thereby determine one of an excess and deficiency in engine braking;

(c) effecting a learning correction of the predetermined determination reference value based on the at least one detected parameter value; and (d) outputting a speed change command based on the vehicle running condition, wherein said step (a) includes detecting a braking manipulation state and an engine load after completion of a downshift conducted in the automatic transmission in response to the speed change command, and wherein said step (c) includes effecting the learning correction of the predetermined determination reference value based on at least one of the detected braking manipulation state and the detected engine load.

2. The speed change control method according to claim 1, wherein said step (a) includes detecting a state of a road on which the vehicle runs.

3. The speed change control method according to claim 1, wherein said step (c) includes effecting the learning correction of the predetermined determination reference value such that, when it is determined based on at least one of the braking manipulation state and the engine load that further deceleration is demanded by a driver after completion of the downshift, a subsequent downshift is promoted.

4. The speed change control method according to claim 3, wherein said step (a) includes detecting deceleration of the vehicle caused by braking manipulation after completion of the downshift.

5. The speed change control method according to claim 3, wherein said step (a) includes detecting a frequency of braking manipulation after completion of the downshift.

6. The speed change control method according to claim 1, said step (c) includes effecting the learning correction of the predetermined determination reference value such that, when it is determined based on at least one of the braking manipulation state and the engine load that acceleration is demanded by a driver after completion of the downshift, a subsequent downshift is suppressed.

7. The speed change control method according to claim 1, wherein said step (b) includes using predetermined determination reference values which are set so as to respectively correspond to downshifts achievable among the plurality of gearshift positions.

8. The speed change control method according to claim 1, wherein said step (c) includes using, in the learning correction of the predetermined determination reference value, a correction amount for which a predetermined limit is set.

9. The speed change control method according to claim 1, wherein said step (c) is carried out after an upshift or a downshift effected in response to the speed change command is completed, or each time a predetermined time period elapses without the speed change command being output.

10. The speed change control method according to claim 9, wherein said step (b) includes the substeps of:

(b1) presetting membership functions so as to respectively correspond to parameters indicative of the vehicle running condition;

(b2) presetting a predetermined control rule; and (b3) performing fuzzy inference based on the at least one parameter value detected in said step (a) and the preset membership functions in accordance with the predetermined control rule, to thereby determine the excess or deficiency in engine braking.

11. The speed change control method according to claim 1, further including the step of:

(e) determining one of a necessity and unnecessariness for the learning correction of the predetermined determination reference value.

12. The speed change control method according to claim 11, wherein said step (e) includes the substeps of:

(e1) presetting membership functions so as to respectively correspond to parameters indicative of the vehicle running condition;

(e2) presetting a predetermined control rule; and (e3) effecting fuzzy inference based on the at least one parameter value detected in said step (a) and the preset membership functions in accordance with the predetermined control rule, to thereby determine one of a necessity and unnecessariness for the learning correction.

13. The speed change control method of claim 1, wherein changeover between the fourth and third gearshift positions and the third and second gearshift positions is controlled.

14. The speed change control method of claim 1, wherein learning correction of the predetermined determination reference value in said step (c) is effected based on both the detected braking manipulation state and the detected engine load.

15. The speed change control method according to claim 14, wherein said step (a) includes detecting deceleration of the vehicle caused by braking manipulation after completion of the downshift.

16. The speed change control method of claim 15, wherein said step (a) includes detecting throttle opening.

17. The speed change control method according to claim 14, wherein said step (a) includes detecting a frequency of braking manipulation after completion of the downshift.

18. The speed change control method of claim 17, wherein said step (a) includes detecting throttle opening.

19. The speed change control method of claim 1, wherein said step (a) includes detecting throttle opening.

* * * * *